(12) United States Patent
Doi et al.

(10) Patent No.: US 9,569,038 B2
(45) Date of Patent: Feb. 14, 2017

(54) DISPLAY DEVICE

(75) Inventors: Koji Doi, Chiba (JP); Koji Nagata, Hachioji (JP)

(73) Assignee: Japan Display Inc., Tokyo (JP)

( * ) Notice: Subject to any disclaimer, the term of this patent is extended or adjusted under 35 U.S.C. 154(b) by 897 days.

(21) Appl. No.: 13/240,170

(22) Filed: Sep. 22, 2011

(65) Prior Publication Data

US 2012/0075243 A1    Mar. 29, 2012

(30) Foreign Application Priority Data

Sep. 24, 2010  (JP) ................................. 2010-213065

(51) Int. Cl.
G06F 3/044 (2006.01)
G06F 3/041 (2006.01)

(52) U.S. Cl.
CPC ............. *G06F 3/044* (2013.01); *G06F 3/0416* (2013.01)

(58) Field of Classification Search
CPC .................................. G06F 3/041; G06F 3/044
USPC .................................................. 345/173, 174
See application file for complete search history.

(56) References Cited

U.S. PATENT DOCUMENTS

| 5,825,352 | A | * | 10/1998 | Bisset | ..................... | G06F 3/044 345/157 |
| 6,002,389 | A |   | 12/1999 | Kasser |  |  |
| 6,323,846 | B1 | * | 11/2001 | Westerman | ........... | G06F 3/0235 345/173 |
| 7,030,860 | B1 |   | 4/2006 | Hsu et al. |  |  |
| 8,400,421 | B2 | * | 3/2013 | Chen | ..................... | G06F 3/0416 345/173 |
| 8,482,536 | B1 | * | 7/2013 | Young | ..................... | G06F 3/044 178/18.03 |
| 8,525,799 | B1 | * | 9/2013 | Grivna | .................. | G06F 3/0416 345/173 |

(Continued)

FOREIGN PATENT DOCUMENTS

DE   202008005343 U1   9/2008
JP       08179871          7/1996

(Continued)

OTHER PUBLICATIONS

Mouton, Benjamin; Extended European Search Report, including Partial European Search Report and European Search Opinion, issued in related European Patent Application No. EP11182194.8; Jan. 15, 2015; 7 pages.

*Primary Examiner* — Claire X Pappas
*Assistant Examiner* — Benjamin Casarez
(74) *Attorney, Agent, or Firm* — Ulmer & Berne LLP

(57) ABSTRACT

A touch panel of capacitance type includes plural X-electrodes, plural Y-electrodes, and a Z-electrode. Each of the X-electrode and the Y-electrode is formed to have pad portions and thin line portions alternately arranged in an extending direction. The pad portion of the X-electrode and the pad portion of the Y-electrode are arranged without being overlapped in a planar view. The Z-electrode is electrically in a floating state, and formed to be overlapped with both the adjacent X-electrode and the Y-electrode in a planar view. The touched position is calculated based on a local minimal point as an intersection with the interelectrode capacitance value that is equal to or smaller than each of the interelectrode capacitance values of four peripheral intersections among those at the intersections between the plural X-electrodes and the plural Y-electrodes.

4 Claims, 45 Drawing Sheets

(56) References Cited

U.S. PATENT DOCUMENTS

| | | | |
|---|---|---|---|
| 8,564,546 B1* | 10/2013 | Birch | G06F 3/0416 178/18.01 |
| 8,692,795 B1* | 4/2014 | Kremin | G06F 3/044 345/173 |
| 9,383,855 B2* | 7/2016 | Westerman | G06F 3/0235 |
| 2009/0256821 A1* | 10/2009 | Mamba | G06F 3/044 345/174 |
| 2009/0283342 A1* | 11/2009 | Schediwy | G06F 3/044 178/19.03 |
| 2009/0284490 A1* | 11/2009 | Chen | G06F 3/0418 345/174 |
| 2009/0315858 A1 | 12/2009 | Sato et al. | |
| 2010/0020032 A1* | 1/2010 | Mamba | G06F 3/044 345/173 |
| 2010/0026655 A1 | 2/2010 | Harley | |
| 2010/0053091 A1* | 3/2010 | Lee | G06F 3/0416 345/173 |
| 2010/0134440 A1 | 6/2010 | Hayakawa et al. | |
| 2010/0193258 A1* | 8/2010 | Simmons | G06F 3/044 178/18.06 |
| 2011/0050615 A1* | 3/2011 | Wu | 345/173 |
| 2011/0069029 A1* | 3/2011 | Ryu | G06F 3/0416 345/173 |
| 2011/0069036 A1* | 3/2011 | Anno | 345/174 |
| 2011/0084926 A1* | 4/2011 | Chang | G01R 27/2605 345/173 |
| 2011/0157074 A1* | 6/2011 | Lin | G06F 3/044 345/174 |
| 2011/0193809 A1* | 8/2011 | Walley | G06F 3/044 345/173 |
| 2011/0310040 A1 | 12/2011 | Ben-Shalom et al. | |
| 2012/0013573 A1* | 1/2012 | Liu | G06F 3/044 345/174 |
| 2012/0038583 A1* | 2/2012 | Westhues | G06F 3/0412 345/174 |
| 2012/0062474 A1* | 3/2012 | Weishaupt | G06F 3/0416 345/173 |
| 2012/0262419 A1* | 10/2012 | Hershman | G06F 3/044 345/174 |
| 2013/0154983 A1* | 6/2013 | Christiansson | G06F 3/0416 345/173 |

FOREIGN PATENT DOCUMENTS

| | | |
|---|---|---|
| JP | 10-31545 A | 2/1998 |
| JP | 2003511799 A | 3/2003 |
| JP | 2010-079882 A | 4/2010 |
| JP | 2010-117955 A | 5/2010 |
| JP | 2010-128647 A | 6/2010 |
| KR | 10-2010-0059714 A | 6/2010 |

* cited by examiner

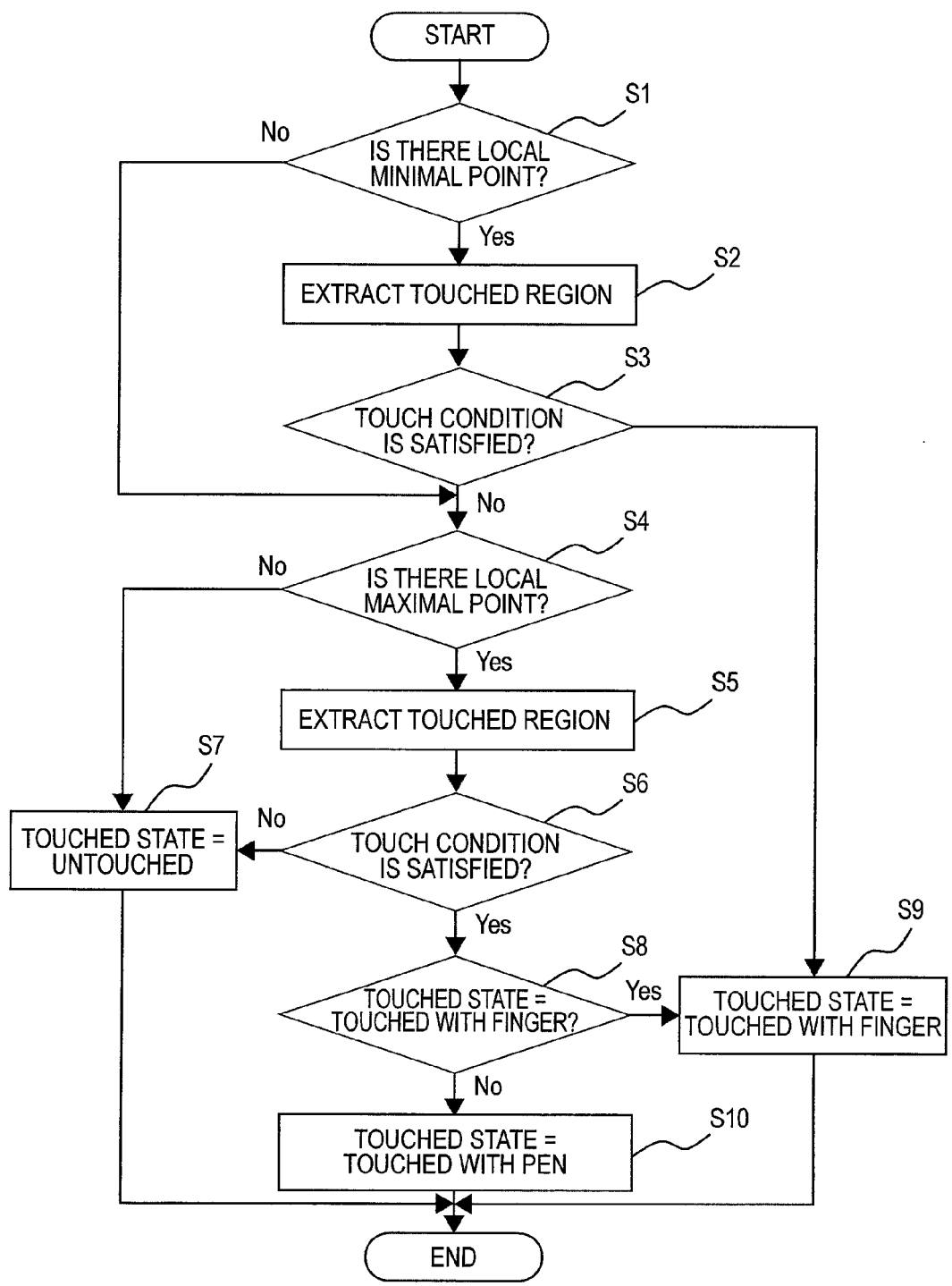

MEASUREMENT VALUE

SIGNAL VALUE

FIG. 9

|    | X1  | X2  | X3  | X4  | X5  |
|----|-----|-----|-----|-----|-----|
| Y1 | 100 | 105 | 120 | 105 | 100 |
| Y2 | 105 | 130 | 140 | 130 | 105 |
| Y3 | 120 | 140 | (150) | 140 | 120 |
| Y4 | 105 | 130 | 140 | 130 | 105 |
| Y5 | 100 | 105 | 120 | 105 | 100 |

LOCAL MAXIMAL POINT

FIG. 10A

MARK LOCAL MAXIMAL POINT

| 100 | 105 | 120 | 105 | 100 |
|-----|-----|-----|-----|-----|
| 105 | 130 | 140 | 130 | 105 |
| 120 | 140 | 150 | 140 | 120 |
| 105 | 130 | 140 | 130 | 105 |
| 100 | 105 | 120 | 105 | 100 |

FIG. 10B

REGION GROWTH 1

| 100 | 105 | 120 | 105 | 100 |
|-----|-----|-----|-----|-----|
| 105 | 130 | 140 | 130 | 105 |
| 120 | 140 | 150 | 140 | 120 |
| 105 | 130 | 140 | 130 | 105 |
| 100 | 105 | 120 | 105 | 100 |

FIG. 10C

REGION GROWTH 2

| 100 | 105 | 120 | 105 | 100 |
|-----|-----|-----|-----|-----|
| 105 | 130 | 140 | 130 | 105 |
| 120 | 140 | 150 | 140 | 120 |
| 105 | 130 | 140 | 130 | 105 |
| 100 | 105 | 120 | 105 | 100 |

FIG. 10D

REGION GROWTH 3

| 100 | 100 | 100 | 105 | 100 |
|-----|-----|-----|-----|-----|
| 105 | 100 | 100 | 100 | 105 |
| 100 | 100 | 100 | 100 | 100 |
| 105 | 100 | 100 | 100 | 105 |
| 100 | 100 | 100 | 105 | 100 |

FIG. 10E

SIGNAL VALUE CALCULATION

| 0  | 5  | 20 | 5  | 0  |
|----|----|----|----|----|
| 5  | 30 | 40 | 30 | 5  |
| 20 | 40 | 50 | 40 | 20 |
| 5  | 30 | 40 | 30 | 5  |
| 0  | 5  | 20 | 5  | 0  |

MEASUREMENT VALUE

SIGNAL VALUE

FIG. 12

|    | X1  | X2  | X3  | X4  | X5  |
|----|-----|-----|-----|-----|-----|
| Y1 | 100 | 100 | 100 | 100 | 100 |
| Y2 | 100 | 95  | 80  | 95  | 100 |
| Y3 | 100 | 80  | (70)| 80  | 100 |
| Y4 | 100 | 95  | 80  | 95  | 100 |
| Y5 | 100 | 100 | 100 | 100 | 100 |

LOCAL MINIMAL POINT

FIG. 13A

MARK LOCAL MINIMAL POINT

| 100 | 100 | 100 | 100 | 100 |
|---|---|---|---|---|
| 100 | 95 | 80 | 95 | 100 |
| 100 | 80 | 70 | 80 | 100 |
| 100 | 95 | 80 | 95 | 100 |
| 100 | 100 | 100 | 100 | 100 |

FIG. 13B

REGION GROWTH 1

| 100 | 100 | 100 | 100 | 100 |
|---|---|---|---|---|
| 100 | 95 | 80 | 95 | 100 |
| 100 | 80 | 80 | 80 | 100 |
| 100 | 95 | 80 | 95 | 100 |
| 100 | 100 | 100 | 100 | 100 |

FIG. 13C

REGION GROWTH 2

| 100 | 100 | 100 | 100 | 100 |
|---|---|---|---|---|
| 100 | 95 | 80 | 95 | 100 |
| 100 | 80 | 80 | 80 | 100 |
| 100 | 95 | 80 | 95 | 100 |
| 100 | 100 | 100 | 100 | 100 |

FIG. 13D

SIGNAL VALUE CALCULATION 1

| 0 | 0 | 0 | 0 | 0 |
|---|---|---|---|---|
| 0 | -5 | -20 | -5 | 0 |
| 0 | -20 | -30 | -20 | 0 |
| 0 | -5 | -20 | -5 | 0 |
| 0 | 0 | 0 | 0 | 0 |

FIG. 13E

SIGNAL VALUE CALCULATION 2

| 0 | 0 | 0 | 0 | 0 |
|---|---|---|---|---|
| 0 | 5 | 20 | 5 | 0 |
| 0 | 20 | 30 | 20 | 0 |
| 0 | 5 | 20 | 5 | 0 |
| 0 | 0 | 0 | 0 | 0 |

MEASUREMENT VALUE

SIGNAL VALUE

FIG. 51

|  | XP1 | XP2 | XP3 | XP4 | XP5 | XP6 |
|---|---|---|---|---|---|---|
| YP1 | 21 | 152 | 151 | 20 | 28 | 34 |
| YP2 | 28 | 148 | 144 | 150 | 35 | 37 |
| YP3 | 35 | 31 | 40 | 42 | 22 | 32 |
| YP4 | 38 | 42 | 43 | 20 | 130 | 121 |
| YP5 | 28 | 28 | 33 | 20 | 115 | 124 |

|  | XP1 | XP2 | XP3 | XP4 | XP5 | XP6 |
|---|---|---|---|---|---|---|
| YP1 | 0 | 1 | 1 | 0 | 0 | 0 |
| YP2 | 0 | 1 | 1 | 1 | 0 | 0 |
| YP3 | 0 | 0 | 0 | 0 | 0 | 0 |
| YP4 | 0 | 0 | 0 | 0 | 2 | 2 |
| YP5 | 0 | 0 | 0 | 0 | 2 | 2 |

~312

DISPLAY DEVICE

CLAIM OF PRIORITY

The present application claims priority from Japanese Patent Application JP 2010-213065 filed on Sep. 24, 2010, the content of which is hereby incorporated by reference into this application.

TECHNICAL FIELD

The present invention relates to a display device with a touch panel of capacitance type, and more particularly, to improved coordinate detection accuracy of the touch panel of capacitance type.

BACKGROUND

The display device is provided with an input device (touch sensor or touch panel) for inputting information through touching operation (contact pressing operation, which will be simply referred to as touching hereinafter) by means of a user's finger or a pen, and used for the mobile electronic device such as a PDA and a mobile terminal, various types of electric appliances, automated teller machines, and the like. There has been introduced a well known touch panel of resistance film type as described above, which detects change in the resistance value of the touched portion, the touch panel of capacitance type which detects change in the capacitance, and the touch panel of optical sensor type which detects change in light quantity.

Japanese Unexamined Patent Application Publication (Translation of PCT Application) No. 2003-511799 discloses the touch panel of capacitance type. The disclosed touch panel includes longitudinally arranged electrodes (X-electrodes) for detection and horizontally arranged electrodes (Y-electrodes) for detection, which are two-dimensionally matrix arranged in longitudinal and horizontal directions so that each electrode capacitance is detected by the input processing unit. When the touch panel surface is touched with a conductor, for example, a finger, each electrode capacitance is increased. The input processing unit then detects increase in the capacitance so that an input coordinate is calculated based on a signal of detected capacitance change of each electrode.

As disclosed in Japanese Unexamined Patent Application Publication No. 2003-511799, the touch panel of capacitance type is configured to detect the input coordinate by detecting each capacitance change of the respective electrodes for detection on condition that the conductive article is used as the input element. When the touch panel of capacitance type is touched with a nonconductive material such as a resin stylus used for the resistance film type, the capacitance of the electrode hardly changes, thus failing to detect the input coordinate.

Japanese Unexamined Patent Publication No. 8-179871 discloses a combination of touch panel and transparent digitizer as the input device which serves as the touch panel and the digitizer so as to allow touching operation of both the finger and the input pen.

The device disclosed in Japanese Unexamined Patent Publication No. 8-179871 is capable of distinguishing between the touch with the finger and the touch with the pen. The aforementioned device needs more cost and has a complicated structure, which requires use of the dedicated pen for the digitizer as the input pen since the generally employed resin pen and the metal pen are unavailable for the inputting operation.

Meanwhile, the inventors found the difference in the property of the signal to be detected between the case where the touch panel of capacitance type is touched with the finger or the conductive pen, and the case where it is touched with the insulating pen.

SUMMARY

The present invention provides a display device provided with a touch panel of capacitance type, which is capable of distinguishing between touch with the finger or the conductive pen, and the touch with the insulating pen such as the resin stylus, and improving accuracy of detecting the touched position.

The aforementioned and other objects and new characteristics will be apparent by the following description and accompanying drawings.

The representative structure of the present invention will be described hereinafter.

The present invention employs a touch panel of capacitance type which is provided with plural X-electrodes, plural Y-electrodes, and a Z-electrode which is overlapped with both the X-electrodes and the Y-electrodes. In the touch panel of capacitance type, the Z-electrode is in an electrically floating state, and configured to be overlapped with the adjacent X-electrode and Y-electrode in a planar view. As the Z-electrode is elastically deformed by the touching, each interval between the X-electrode and the Z-electrode, and between the Y-electrode and the Z-electrode changes. Accordingly, the added capacitance value between the X-electrode and Y-electrode via the Z-electrode changes. In such a case, the signal indicating the polarity which becomes different depending on the touch with the finger and the touch with the pen such as the resin stylus is detected. Then the signal is detected so as to distinguish between the touch with the finger and the touch with the pen such as the resin stylus.

Specifically, the pulse signal is sequentially applied to one of the X- and Y-electrodes, and signals are detected from the other electrode to measure the interelectrode capacitance at the respective intersections between the plural X- and Y-electrodes. The touch position on the touch panel of capacitance type is calculated based on a local minimal point as the intersection with the interelectrode capacitance value that is equal to or smaller than the interelectrode capacitance values at the four peripheral intersections, and a local maximal point as the intersection with the interelectrode capacitance value that is equal to or larger than the interelectrode capacitance values at the four peripheral intersections among the measured interelectrode capacitance values at the respective intersections between the plural the X- and the Y-electrodes. When the touched position is calculated based on the local minimal point, it is determined that the touch panel of capacitance type is touched with the user's finger or the conductive pen. When the touched position is calculated based on the local maximal point, it is determined that the touch panel of capacitance type is touched with the insulating pen.

Advantages of the representative structures according to the present invention will be described hereinafter.

The display device with a touch panel of capacitive coupling type according to the present invention is capable of distinguishing between the touch with finger or the conductive pin and the touch with the insulating pen such as the resin stylus, thus further improving detection accuracy with respect to the touched position.

BRIEF DESCRIPTION OF THE DRAWINGS

FIG. 7 is a flowchart which represents procedure of a touch detection process executed in the touch panel device according to Example 1 of the present invention;

FIG. 9 represents the process for executing step S4 in FIG. 7 when the touch panel according to Example 1 of the present invention is touched with the pen;

FIGS. 10A to 10E are views representing the process for executing step S5 in FIG. 7;

FIG. 12 represents the process for executing step S2 in FIG. 7 when the touch panel according to Example 1 of the present invention is touched with the finger (light touch with no pressing);

FIGS. 13A to 13E are views representing the process for executing step S3 in FIG. 7 when the touch panel according to Example 1 of the present invention is touched with the finger (light touch with no pressing);

FIG. 51 is a schematic view representing operations of the detection circuit in the input device according to Example 2 of the present invention;

FIG. 52 is a schematic view representing operations of the detection circuit in the input device according to Example 2 of the present invention;

DESCRIPTION OF THE PREFERRED EXAMPLES

Figure 1:
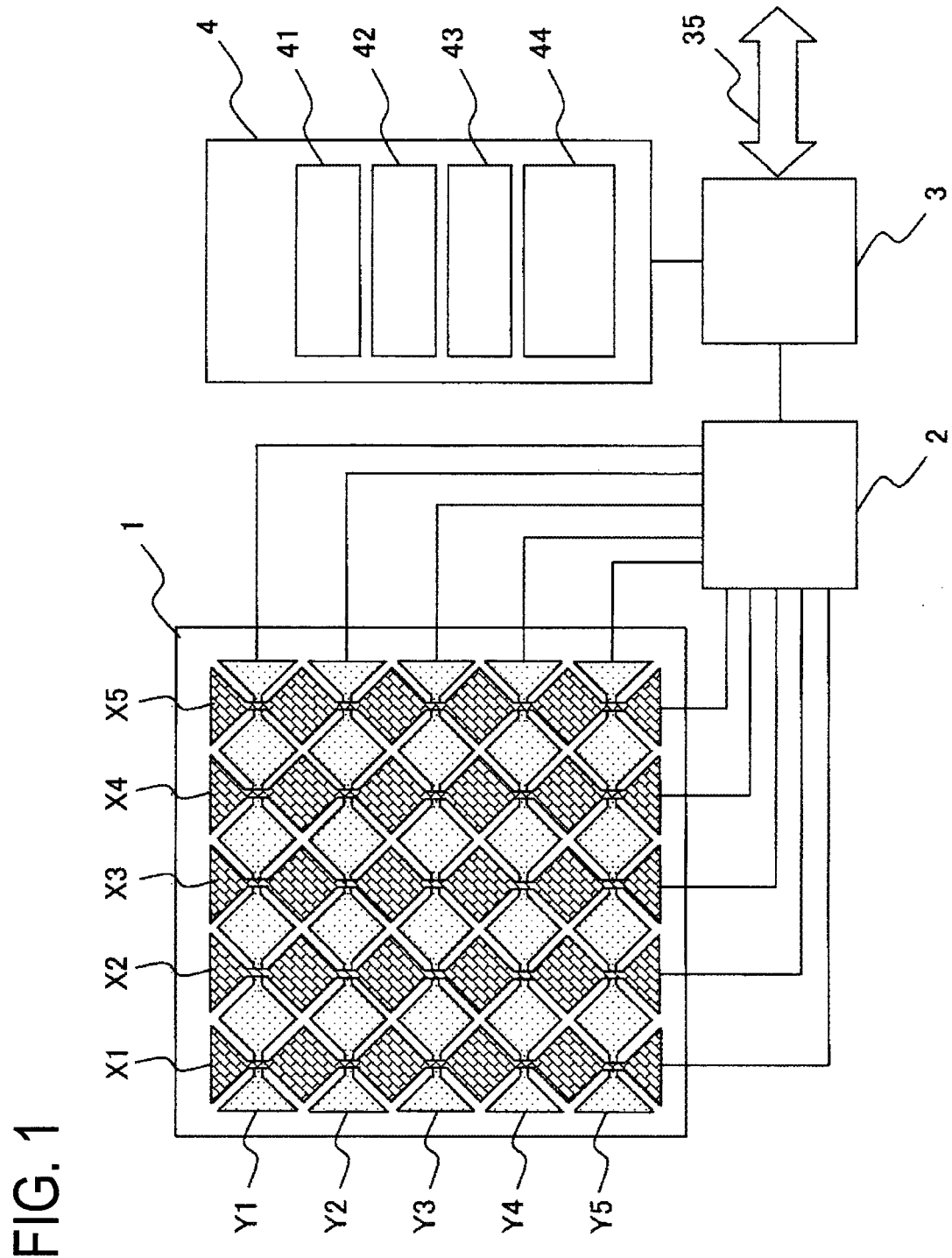
FIG. 1 is a block diagram illustrating an entire structure of a touch panel device according to Example 1 of the present invention.

Examples of the present invention will be described in detail referring to the drawings.

In all through the drawings, the elements with the same functions will be designated with the same codes, respectively and explanations thereof, thus will be omitted. The following examples are not intended to limit the aspect of the present invention.

EXAMPLES

FIG. 1 is a block diagram showing a general structure of a touch panel device according to Example 1 of the present invention.

The touch panel device according to the example includes a touch panel 1 of capacitance type, a capacitive detector 2, a control unit 3, a data storage unit 4, and a bus connection signal line 35.

The touch panel 1 includes an electrode pattern (X-electrodes X1 to X5, and Y-electrodes Y1 to Y5) as a sensor terminal for detecting touching operation of the user.

The X-electrodes X1 to X5, and Y-electrodes Y1 to Y5 are connected to the capacitive detector 2. The capacitive detector 2 performs sequential pulse application using the X-electrodes X1 to X5 as transmission electrodes (drive electrode), and measures an interelectrode capacitance (mutual capacitance) at the respective electrode intersections using the Y-electrodes Y1 to Y5 as receiving electrodes.

The control unit 3 detects touching operations based on the measurement results of the interelectrode capacitance at the respective electrode intersections, and sends the detection result to a host via the bus connection signal line 35.

The data storage unit 4 records a reference value 41, a measurement value 42, and a signal value 43 serving as working data required for the control unit 3 to execute the touch detection for each electrode intersection, and stores a touch state management table 44.

The reference value 41, the measurement value 42 and the signal value 43 are two-dimensionally arranged data having the number of the X-electrodes defined as the horizontal element count, and the number of the Y-electrodes defined as the longitudinal element count. The reference value 41 is recorded as the measurement value 42 in the untouched state, and the signal value 43 is calculated based on the measurement value 42 in the touch detection process. The touch state management table 44 contains a touch type, a touch pressure, a touch coordinate and the like at each touch point. The content of this table is sent to the host.

Figure 2:
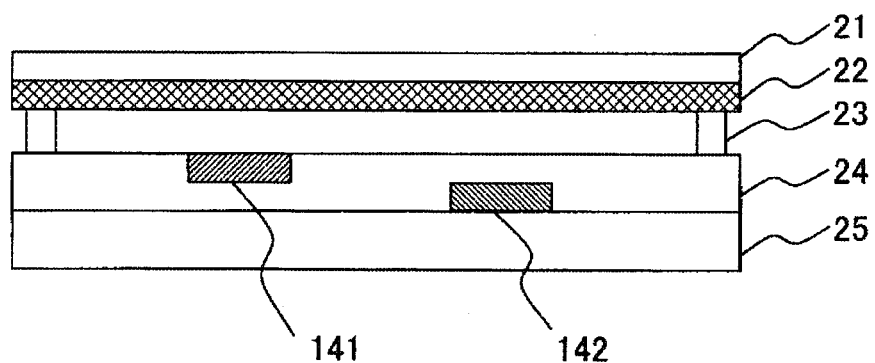
FIG. 2 is a schematic sectional view illustrating a cross-section structure of a touch panel 1 according to Example 1 of the present invention.

FIG. 2 is a schematic sectional view illustrating a cross-section structure of the touch panel 1 according to Example 1 of the present invention. FIG. 2 shows the X-electrode 141 and the Y-electrode 142.

The touch panel 1 is formed by laminating an electrode layer 24, a frame 23, an electrode film 22, and a protective layer 21 sequentially on a substrate layer 25 as a bottom surface.

The electrode layer 24 has the X-electrode 141 and the Y-electrode 142 arranged crosswise. In FIG. 2, however, they are arranged in parallel. The electrode film 22 is a conductive film with a predetermined resistance value in a floating state.

Each of the electrode film 22 and the protective layer 21 exhibits elasticity, and is deformed (deflected) under the pressure applied from above. It is clear that the touch panel 1 according to Example 1 is mounted on a display panel (for example, liquid crystal display panel, organic EL display panel and the like).

Figure 3:
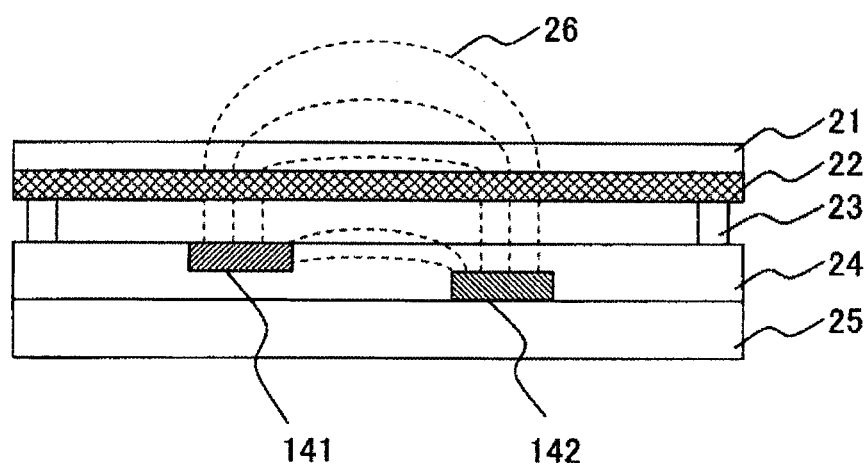
FIG. 3 is a view representing a state of a line of electric force in the structure shown in FIG. 2, which is observed when the touch panel 1 is not touched (untouched state)

FIG. 3 shows the state of electric force lines in the structure shown in FIG. 2 when the touch panel 1 is not touched (untouched state).

Referring to FIG. 3, electric field between the X-electrode 141 (transmission side) and the Y-electrode 142 (receiver side) when driving the electrode is illustrated as electric force lines 26. As the electrode film 22 exhibits the resistance value, a leaked electric field is generated up above the protective layer 21.

Figure 4:
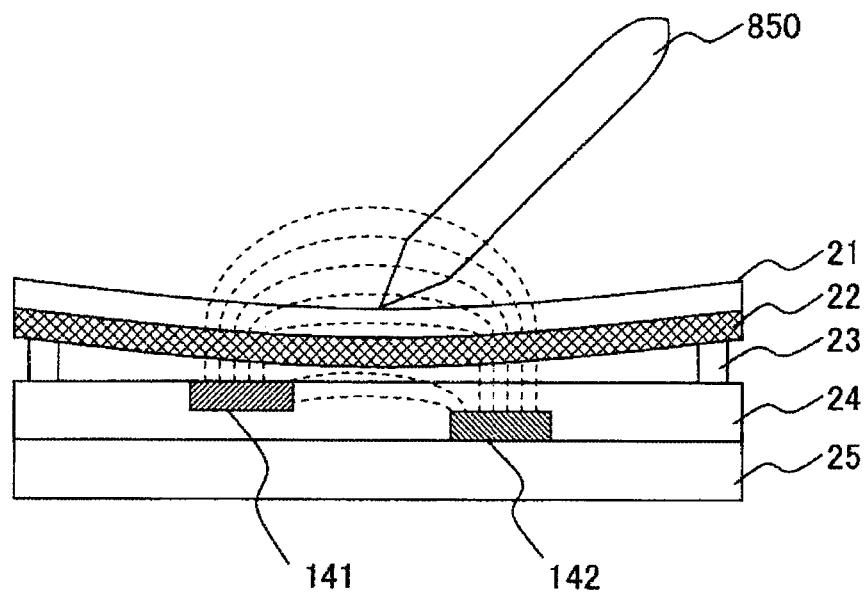
FIG. 4 is a view representing a state of a line of electric force in the structure shown in FIG. 2, which is observed when the touch panel 1 is touched with a pen (for example, resin stylus)

FIG. 4 represents the electric force lines in the state where the touch panel 1 according to the structure shown in FIG. 2 is touched with an insulating pen (for example, resin stylus) 850.

When the touch panel is touched with the insulating pen 850, the electrode film 22 deflects so that the distance between the electrode film 22 and the X-electrode 141 (and the Y-electrode 142) is reduced, and the capacitance value therebetween is increased. This may increase the interelectrode capacitance value (mutual capacitance value) between the X-electrode 141 and the Y-electrode 142.

Figure 5:
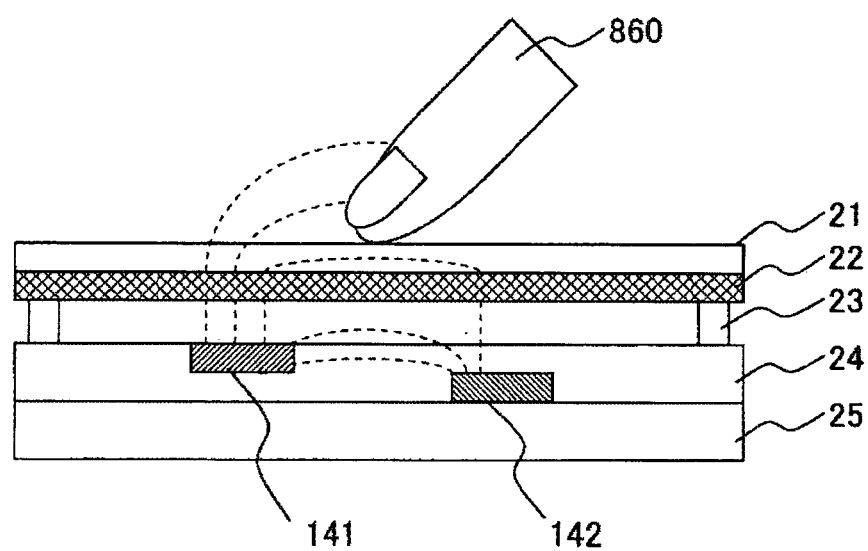
FIG. 5 is a view representing a state of a line of electric force in the structure shown in FIG. 2, which is observed when the touch panel is touched with finger.

FIG. 5 represents the electric force lines in the state where the touch panel 1 according to the structure shown in FIG. 2 is touched with a finger 860.

The finger (pseudo-grounded conductor) 860 serves as a shielding to prevent the electric force line 26, which reduces the interelectrode capacitance value (mutual capacitance value) between the X-electrode 141 and the Y-electrode 142.

Figure 6A:
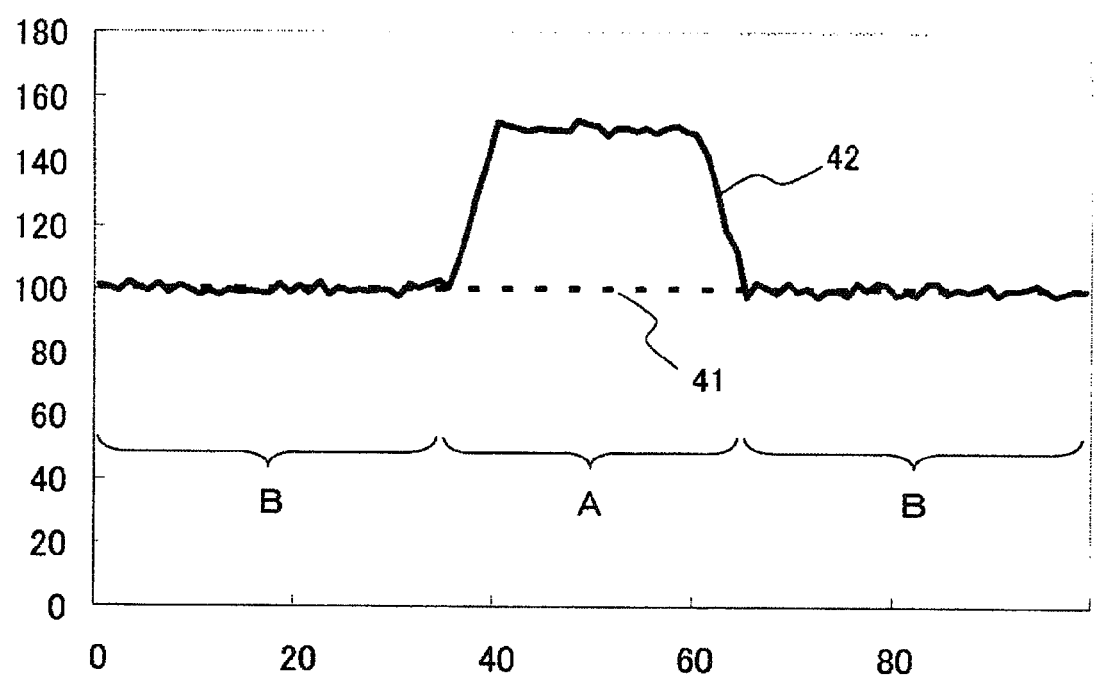
FIGS. 6A and 6B are graphs each showing change in the measurement values over time at touched points of the touch panel according to Example 1 of the present invention.

FIGS. 6A and 68 represent the change in measurement values at touched points on the touch panel 1 according to Example 1 over time.

Figure 6B:
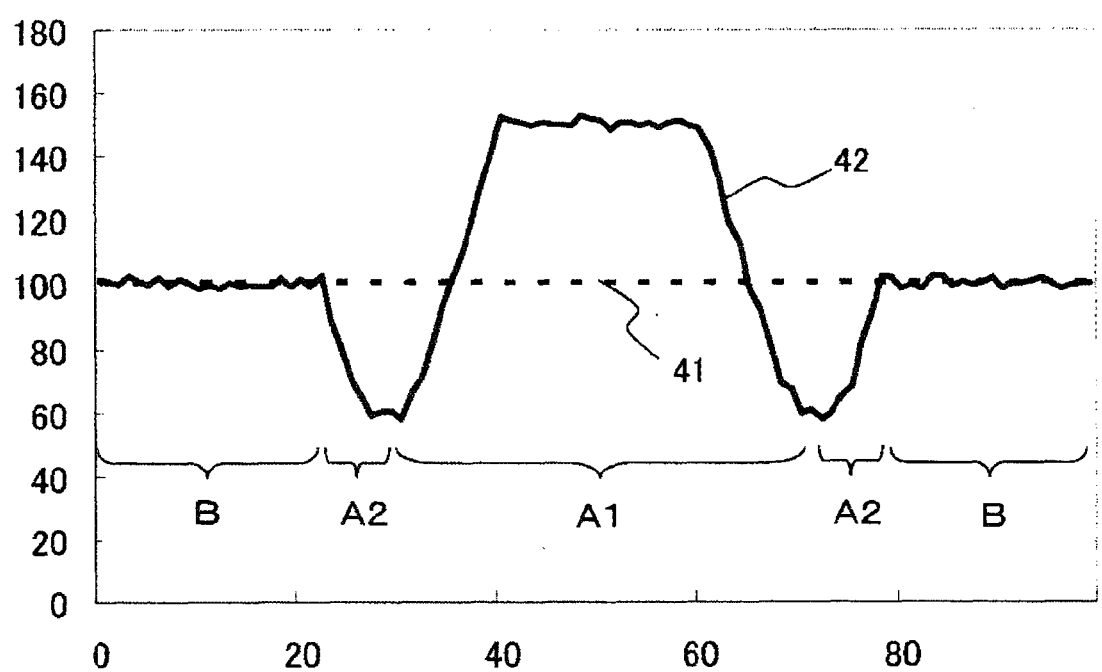

FIGS. 6A and 6B represent change in the mutual capacitance values at an arbitrary electrode intersection on the touch panel 1 subjected to a series of operations including keeping untouched state, touching, and keeping untouched state.

Referring to FIGS. 6A and 6B, an x-axis denotes a time, and a y-axis denotes results of the measurement values (digital values obtained by AD converting the interelectrode capacitance values (mutual capacitance values)). Referring to FIGS. 6A and 6B, a range A represents the touched state, a range A1 represents a strongly touched state, a range A2 represents a lightly touched state, and a range B represents an untouched state.

FIG. 6A represents the touching operation using the insulating pen 850. Owing to the reason as described referring to FIG. 4, the measurement value 42 is simply increased as a result of the touching operation.

FIG. 6B represents the touching operation using the finger 860. For the "light touching" (no pressing), the measurement value 42 is decreased owing to the reason as described referring to FIG. 5. When the pressure is gradually applied to press the protective film 21 to make a transition to the "strong touching", the phenomenon described referring to FIG. 4 becomes more dominant than the one as described referring to FIG. 5. The measurement value 42 becomes larger than the value obtained in the untouched state (=reference value 41).

When the pressure is reduced to make a transition from the "light touched state" to "untouched state", the measurement value changes reversely from the case as described above.

The touch panel device according to the example is configured to repeat the processing cycle including (1) detection of capacitance, (2) detection of absence/presence of touching operation, and (3) touch coordinate calculation (if the touching is detected).

FIG. 7 is a flowchart representing the procedure of touch detection process performed in the touch panel device according to Example 1. The process is executed by the control unit 3.

It is determined whether or not there is a local minimal point (step S1). If No is obtained in step S1, the process proceeds to step S4.

If Yes is obtained in step S1, the touch region is extracted (step S2). It is then determined whether or not the touch condition is satisfied (step S3). If Yes is obtained in step S3, it is determined that the touched state is established by the finger (step S9), and the process ends.

If No is obtained in step S3, the process proceeds to step S4.

In step S4, it is determined whether or not there is a local maximal point. If No is obtained in step S4, it is determined that the touched state is not established, that is, untouched state (step S7), and the process ends.

If Yes is obtained in step S4, the touched region is extracted (step S5). It is then determined whether or not the touch condition is satisfied (step S6).

If No is obtained in step S6, the process proceeds to step S7 where it is determined that the touched state is not established, that is, untouched state. The process then ends.

If Yes is obtained in step S6, it is determined whether or not the touched state is established by using the finger in reference to the touched state management table 44 of the data storage unit 4 (step S8). If Yes is obtained in step S8, the process proceeds to step S9 where it is determined that the touched state is established by using the finger. The process then ends.

If No is obtained in step S8, the process proceeds to step S10 where it is determined that the touched state is established by using the pen. The process then ends.

The touch detection process will be described in reference to the following examples of the touched state.

A touched state example 1 represents an example of touching operation using the pen, that is, the insulating pen 850. It is assumed that the touched state is changed from the untouched state to the touched state example 1.

Touched state examples 2 to 4 represent the touching operation using the finger 860. It is assumed that the touched state is changed in order of untouched state, touched state example 2, touched state example 3, and touched state example 4.

Touched State Example 1

Figure 8A:
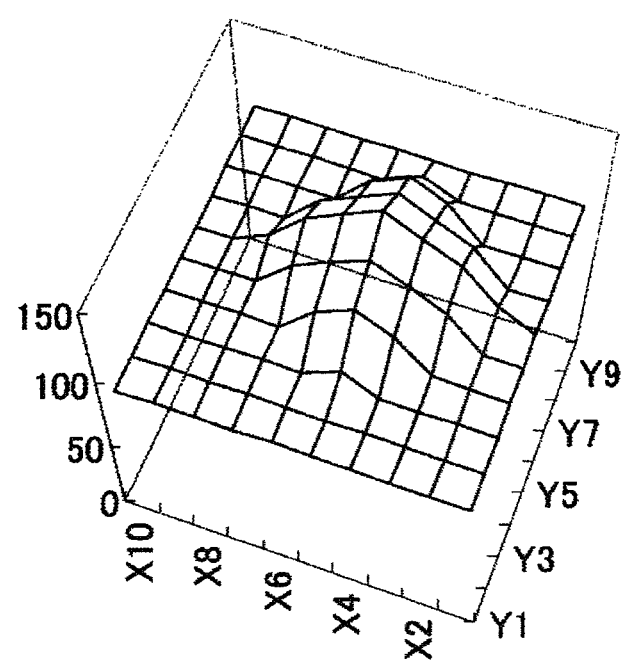
FIGS. 8A and 8B are graphs representing measurement values and signal values at electrode intersections in a certain range when the touch panel according to Example 1 of the present invention is touched with the pen.
Figure 8B:
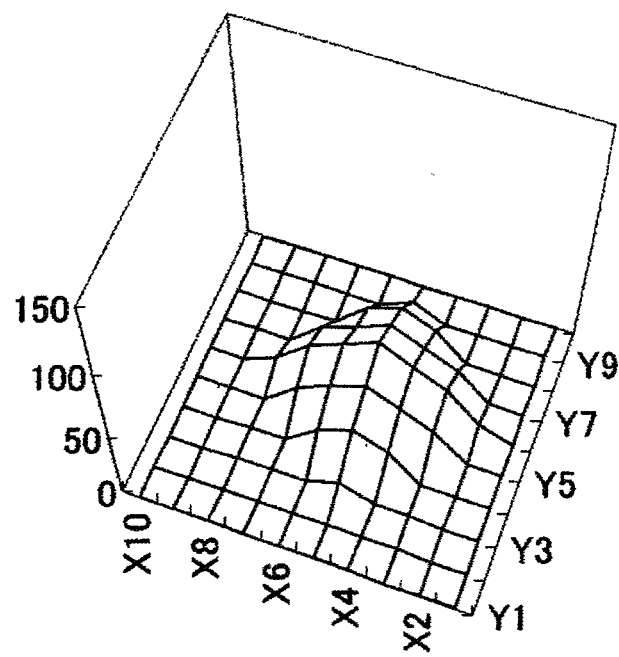

FIGS. 8A and 8B are graphs representing measurement values and signal values at the electrode intersection in a certain range when the touch panel 1 according to Example 1 is touched with the insulating pen 850. Specifically, FIG. 8A shows the measurement values, and FIG. 8B shows the signal values.

FIG. 9 is an explanatory view of the process executed in step S4 shown in FIG. 7 when the touch panel 1 according to Example 1 is touched with the insulating pen 850.

The local maximal point denotes a data position with the value that is equal to or larger than four adjacent values (up, down, left, right) among the reference values 42 (two-dimensionally arranged data). Referring to FIG. 9, the electrode intersection (X3, Y3) is determined as the local maximal point.

FIGS. 10A to 10S are explanatory views of the process executed in step S5 shown in FIG. 7.

Referring to FIGS. 10A to 10D, the local maximal point is set as the starting point, and data positions adjacent to data in four directions are sequentially searched downward from the current position. If the difference in the measurement values is equal to or larger than a predetermined value (10 in FIG. 10) at a downward pitch, the values are contained in the region.

Referring to FIG. 10E, the difference value in reference to the measurement value adjacent to the touched region is obtained, and stored in the data storage unit 4 as the signal value 43.

If the signal value satisfies the touch condition (maximum value is equal to or larger than the threshold value), it is determined in step 36 that the "touched state is established".

Touched State Example 2

Figure 11A:
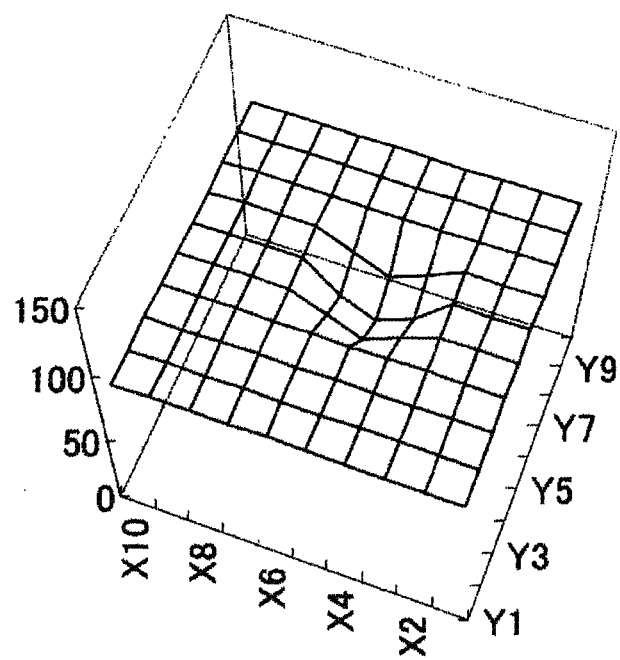
FIGS. 11A and 11B are graphs representing measurement values and signal values at electrode intersections in a certain range when the touch panel according to Example 1 of the present invention is touched with the finger (light touch with no pressing)
Figure 11B:
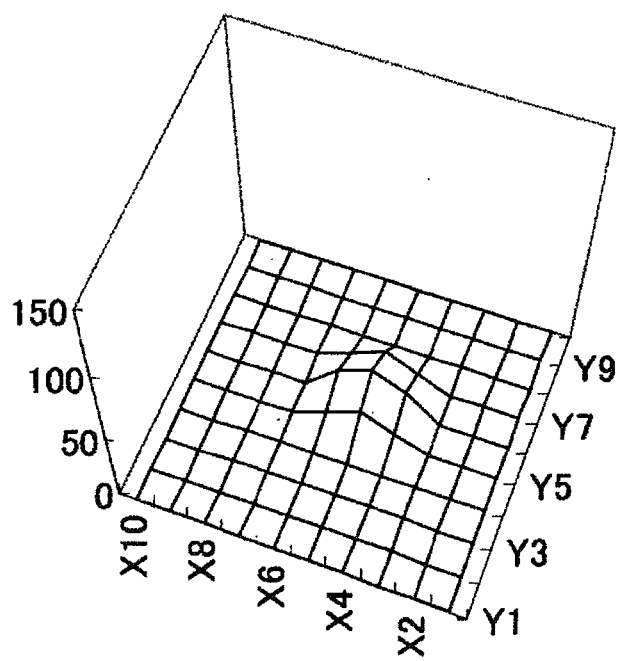

FIGS. 11A and 11B are graphs representing measurement values and signal values at the respective electrode intersections in a certain range when the touch panel 1 according to Example 1 is touched with the finger (light touch with no pressing). FIG. 11A shows the measurement values, and FIG. 11B shows the signal values.

FIG. 12 is an explanatory view of the process executed in step S2 shown in FIG. 7 when the touch panel 1 according to Example 1 is touched with the finger (light touch with no pressing).

The local minimal point denotes a data position with the value equal to or smaller than four adjacent values (up, down, left, right) among the measurement values (two-dimensionally arranged data). Referring to FIG. 12, the electrode intersection (X3, Y3) is determined as the local minimal point.

FIGS. 13A to 13E are explanatory views of the process executed in step S3 shown in FIG. 7 when the touch panel 1 according to Example 1 is touched with the finger (light touch with no pressing).

The touched region is extracted by searching adjacent data positions in four directions from the local minimal point as the start point, and adding the data to the region when the difference in the measurement value at an upward pitch is equal to or larger than a predetermined value (10 in FIG. 13) as shown in FIGS. 13A to 13C.

Referring to FIG. 13D, the difference between the measurement value and the one at the periphery of the touched region is obtained. Referring to FIG. 13E, the sign of the obtained difference value is inverted, and stored as the signal value 43 in the data storage unit 4.

When the signal value satisfies the touch condition (maximum value is equal to or larger than the threshold value), it is determined as being "touched" in step S3.

Touched State Example 3

Figure 14A:
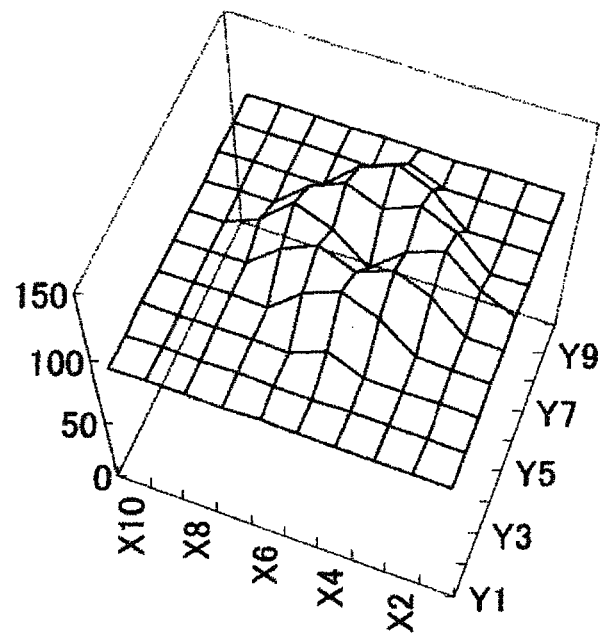
FIGS. 14A and 14B are graphs representing measurement values and signal values obtained when the touch panel according to Example 1 of the present invention is touched with the finger (strong touch with pressing)
Figure 14B:
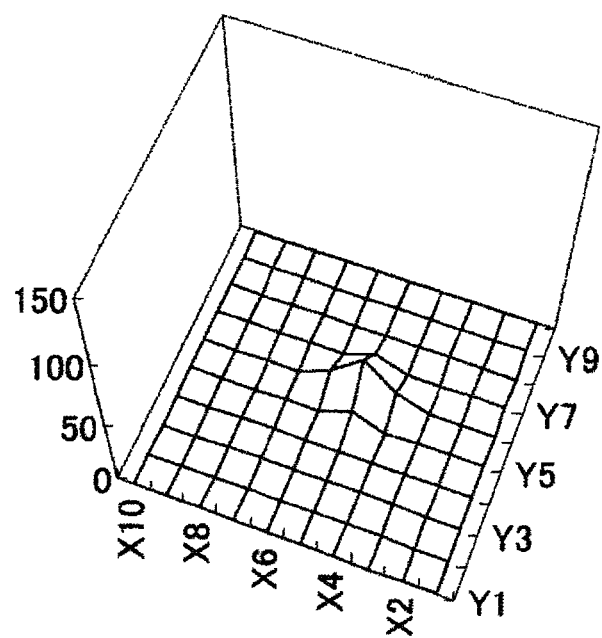

FIGS. 14A and 14B are graphs representing the measurement values and the signal values obtained when the touch panel 1 according to Example 1 is touched with the finger (strong touch with pressing). Specifically, FIG. 14A shows the measurement values, and FIG. 14B shows the signal values.

The process executed in step S2 shown in FIG. 7 is the same as the one in the touched state example 2.

Touched State Example 4

Figure 15A:
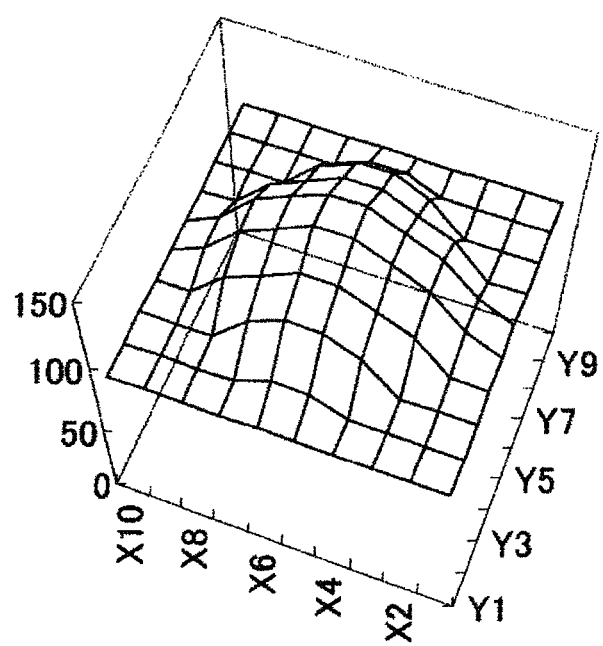
FIGS. 15A and 15B are graphs representing measurement values and signal values obtained when the touch panel according to Example 1 of the present invention is touched with the finger (strong touch with maximum pressing)
Figure 15B:
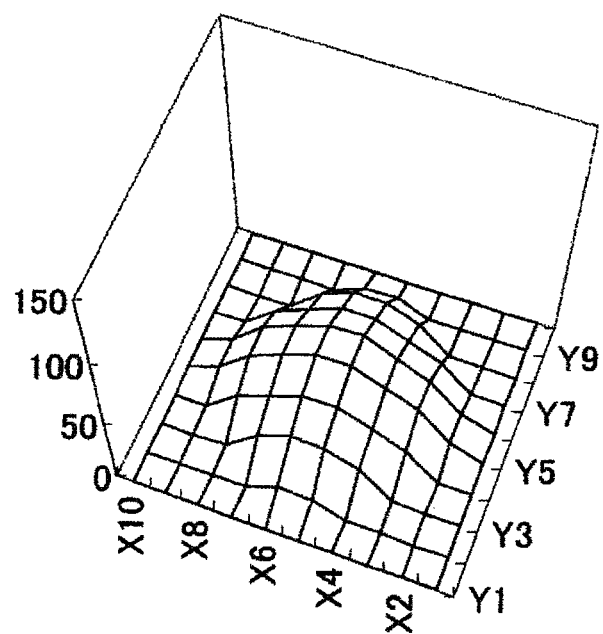

FIGS. 15A and 15B are graphs of the measurement values and the signal values obtained when the touch panel 1 according to Example 1 is touched with the finger (strong touch with maximum pressing). Specifically, FIG. 15A shows the measurement values, and FIG. 15B shows the signal values.

Referring to FIGS. 15A and 15B, the touching under the strong pressure extinguishes a depression at the center of the touched portion represented by the measurement values. It is determined that no local minimal point exists in the touch detection process as described above. However, the touched state which has been detected last time is recorded as being touched with "finger" within a predetermined range from the local maximal point detected at the present time, which is stored as being touched with "finger" in the touched state management table 44 of the data storage unit 4. Then in step S8, it is determined as the "touched with finger" in reference to the measurement value.

The touched area may be contained in the touch detection result stored in the touched state management table 44. The touched area denotes the number of the electrode intersections contained in the touched region extracted in step S2 or step S5. FIG. 10E shows that the touched area is set to 21, and FIG. 13E shows that the touched area is set to 13.

Use of the touched area enables the determination that the capacitance change resulting from the contact of user's palm with the touch panel is not regarded as the finger touch. Specifically, when the touched area of the detected touch is equal to or larger than a predetermined threshold value, and the touch type is determined as the finger (conductive), it is determined that the touch panel is touched by user's palm. The aforementioned determination is recorded as added information with respect to the touch type, and is further sent to the host.

In the case where the insulating pen 850 is held by the user's hand, and the touch panel is touched with the pen while having the hand kept in contact with the touch panel, the touch with the pen may only be detected as the touch point while invalidating the touch with the user's palm. If the touch with palm is detected, all the detected finger touching operations are invalidated so as to regard the pen touching as being only valid.

When using the single touch detection method according to the example, signals with different polarities depending on the finger and the pen (for example, resin stylus) are detected. So the signal processing is executed based on the obtained measurement data so as to allow detection with respect to the touch type whether the finger 860 or the insulating pen (for example, resin stylus) 850.

The touch panel device according to the example provides the touched state of the user in more detail than the generally employed structure. This makes it possible to provide an easy-to-use user interface for the device with the touch panel. For example, the detected touch type may be distinguished between the finger touch and the pen touch (for example, resin stylus) by changing color on the display panel provided with the touch panel 1. Alternatively, the distinction may be made by drawing the line on the display panel provided with the touch panel 1 when the detected touch type is the pen (resin stylus), and displaying an eraser icon on the display panel provided with the touch panel 1 to erase the displayed line when the detected touch type is the finger.

Figure 16:
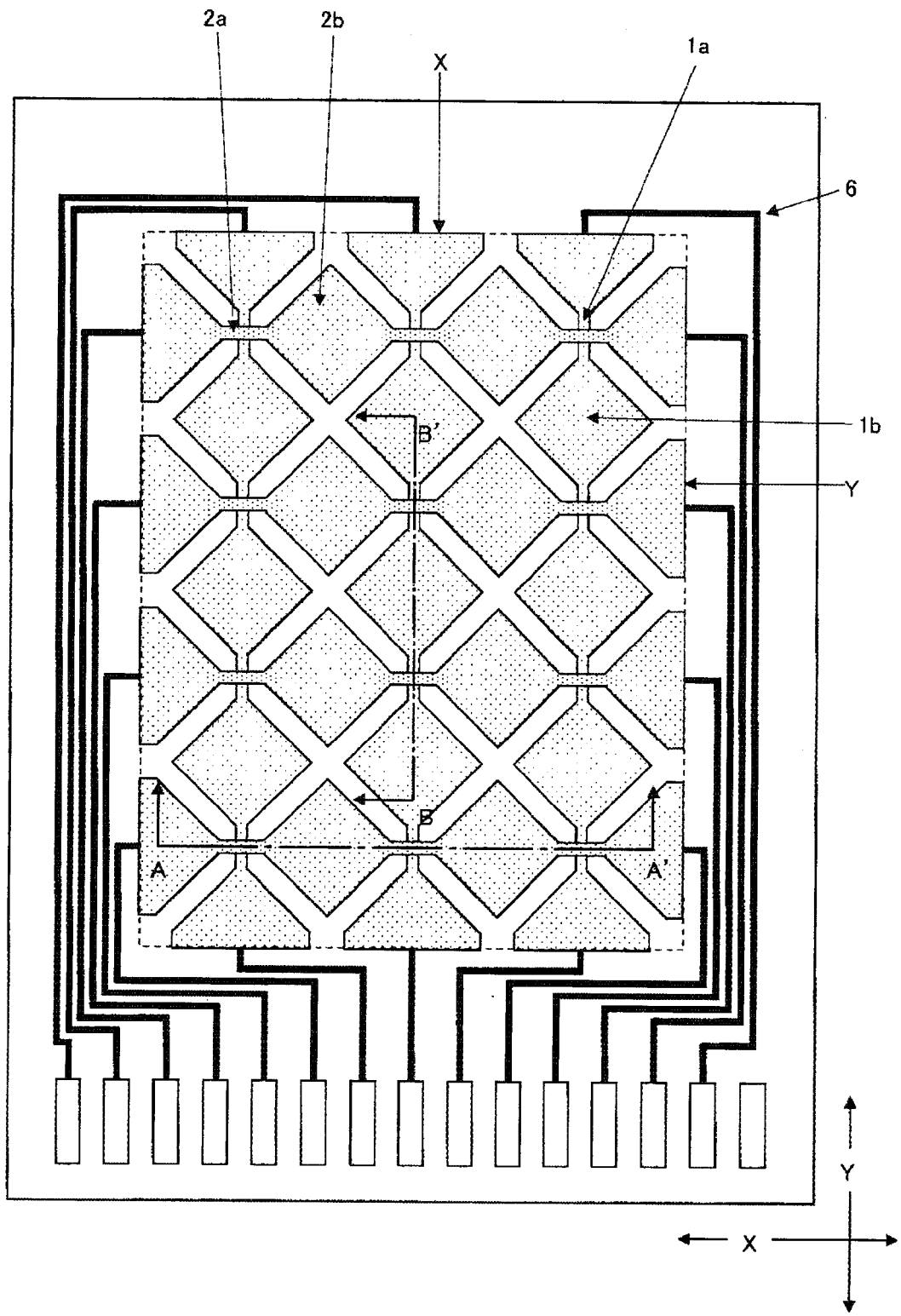
FIG. 16 is a plan view which illustrates an electrode pattern on the touch panel of capacitance type as shown in FIG. 1.

FIG. 16 is a plan view illustrating an electrode pattern of the touch panel of capacitance type shown in FIG. 1.

Figure 17:
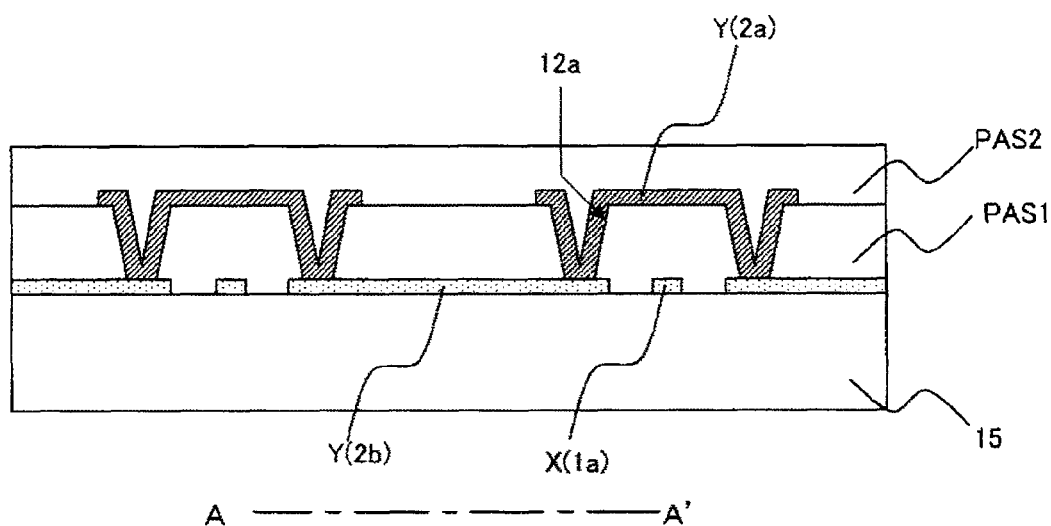
FIG. 17 is a sectional view showing a cross-section structure taken along line A-A' of FIG. 16.
Figure 18:
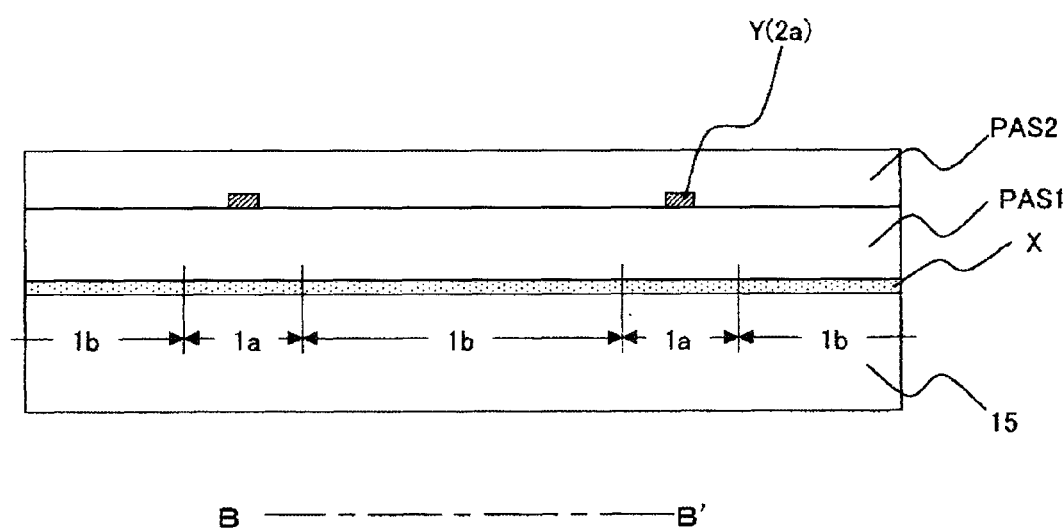
FIG. 18 is a sectional view showing a cross-section structure taken along line B-B' of FIG. 16.

FIG. 17 is a sectional view taken along line A-A' of FIG. 16, illustrating a cross-section structure. FIG. 18 is a sectional view taken along line B-B' of FIG. 16, illustrating a cross-section structure.

The touch panel of capacitance type as shown in FIG. 1 includes plural X-electrodes which extend in a second direction (for example, Y direction) and are arranged in parallel at predetermined pitches in a first direction (for example, x-direction) intersecting with the second direction, and plural Y-electrodes which extend in the first direction intersecting the plural X-electrodes, and are arranged in parallel at predetermined pitches in the second direction in the plane of a substrate 15 for touch panel at an observer's side. A transparent insulating substrate, for example, a glass and the like may be used for forming the substrate 15 for the touch panel.

Each of the plural X-electrodes is formed as an electrode pattern which includes thin line portions 1a and pad portions 1b each with wider width than that of the thin line portion 1a, which are alternately arranged in the second direction. Each of the plural Y-electrodes is formed as an electrode pattern which includes thin line portions 2a and pad portions 2b each with wider width than that of the thin line portion 2a, which are alternately arranged in the first direction.

The region having the plural Y-electrodes and the X-electrodes arranged is an input region. Referring to FIG. 16, plural wirings 6 are provided at peripheries of the input region, and are electrically coupled with the plural Y-electrodes and the plural X-electrodes, respectively.

The plural X-electrodes are arranged on the surface of the touch panel substrate 15 at the observer side. The pad portions 2b of the plural Y-electrodes are formed on the surface of the touch panel substrate 15 while being separated from the X-electrodes.

The thin line portions 2a of the plural Y-electrodes are arranged on an insulating film (PAS 1) formed on the surface of the touch panel substrate 15 at the observer side, and covered with a protective film (PAS 2) formed as the upper layer of the insulating film.

The thin line portion 2a of the Y-electrode intersects with the thin line portion 1a of the X-electrode in a planar view, and is electrically coupled with two adjacent pad portions 2b interposing the thin line portion 2a, respectively via contact holes 12a formed in the insulating film (PAS 1) as the interlayer insulating film between the thin line portion 2a of the Y-electrode and the thin line portion 1a of the X-electrode.

In a planar view, the pad portion 2b of the Y-electrode is provided between two adjacent thin line portions 1a of the X-electrode, and the pad portion 1b of the X-electrode is provided between two adjacent thin line portions 2a of the Y-electrode.

Each of the plurality of X-electrodes and Y-electrodes is formed of a material with high transparency, for example, transparent conductive material such as ITO (Indium Tin Oxide). The wiring 6 includes the transparent conductive layer as the lower layer formed of the transparent conductive material such as ITO, and a metal layer as an upper layer formed of a silver alloy material.

Figure 19:
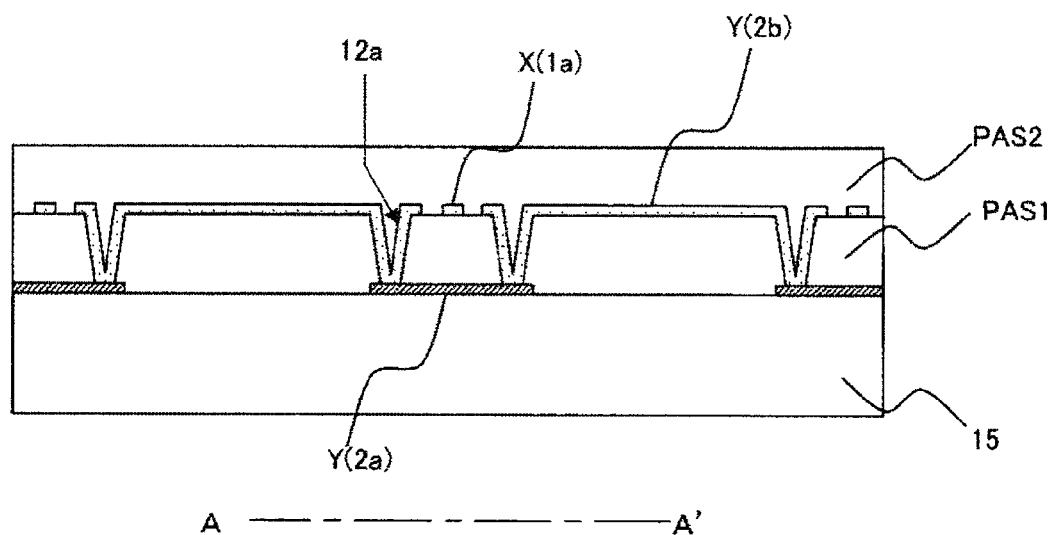
FIG. 19 is a sectional view showing a cross-section structure of another example of the touch panel of capacitance type as shown in FIG. 1, taken along line A-A' of FIG. 16.
Figure 20:
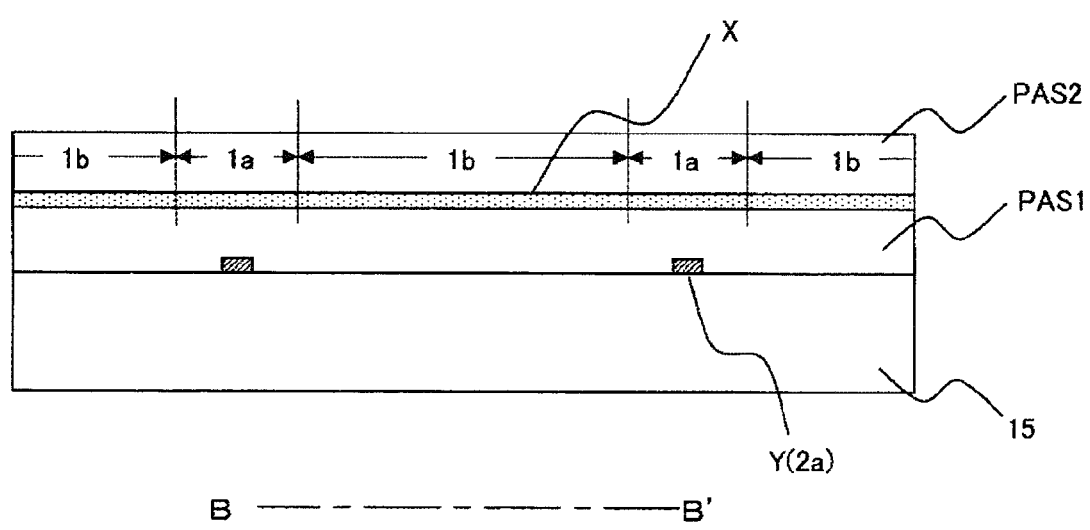
FIG. 20 is a sectional view showing a cross-section structure of another example of the touch panel of capacitance type shown in FIG. 1, taken along line B-B' of FIG. 16.

FIGS. 19 and 20 are sectional views each representing a cross-section structure of another example of the touch panel of capacitance type as shown in FIG. 1. FIG. 19 is a sectional view taken along line A-A' of FIG. 16, and FIG. 20 is a sectional view taken along line B-B' of FIG. 16, respectively.

The touch panel of capacitance type shown in FIGS. 19 and 20 has the thin line portions 2a of the plural Y-electrodes formed on the surface of the touch panel substrate 15 at the observer side. The thin line portions 1a and the pad portions 1b of the plural X-electrodes, and the pad portions 2b of the plural Y-electrodes are formed on the insulating film (PAS 1). The thin line portions 1a and the pad portions 1b of the plural X-electrodes, and the pad portions 2b of the plural Y-electrodes are covered with the protective film (PAS 2) as the upper layer.

The thin line portion 2a of the Y-electrode intersects with the thin line portion 1a of the X-electrode in the planar view, and is electrically coupled with the two adjacent pad portions 2b interposing the thin line portion 2a via the contact hole 12a formed in the insulating film (PAS 1) as the interlayer insulating film between the thin line portion 2a of the Y-electrode and the thin line portion 1a of the X-electrode.

As a planar view, the pad portion 2b of the Y-electrode is provided between the two adjacent thin line portions 1a of the X-electrode, and the pad portion 1b of the X-electrode is provided between the two adjacent thin line portions 2a of the Y-electrode.

Each of the plural X-electrodes and Y-electrodes is formed of a material with high transparency, for example, transparent conductive material such as ITO (Indium Tin Oxide). The wiring 6 includes the transparent conductive layer as the lower layer formed of the transparent conductive material such as ITO, and a metal layer as an upper layer formed of a silver alloy material.

Figure 21:
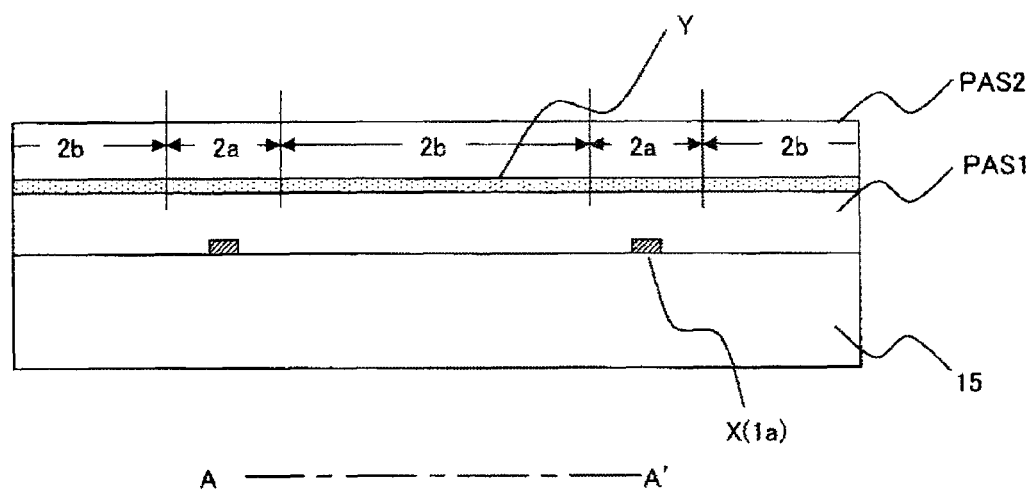
FIG. 21 is a sectional view showing a cross-section structure of another example of the touch panel of capacitance type shown in FIG. 1, taken along line A-A' of FIG. 16.
Figure 22:
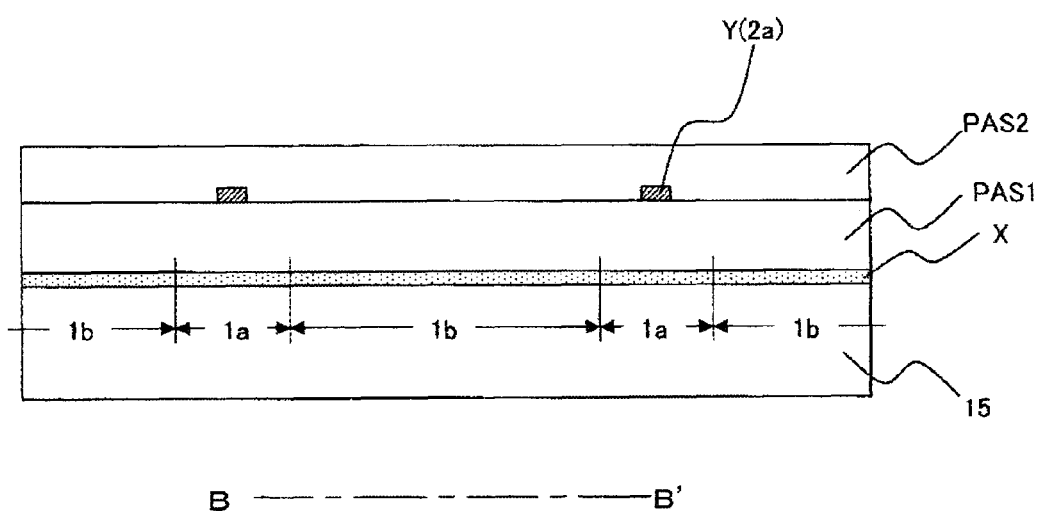
FIG. 22 is a sectional view showing a cross-section structure of another example of the touch panel of capacitance type shown in FIG. 1, taken along line B-B' of FIG. 16.

FIGS. 21 and 22 are sectional views each representing a cross-section structure of another example of the touch panel of capacitance type as shown in FIG. 1. FIG. 21 is a sectional view showing the cross-section structure taken along line A-A' of FIG. 16, and FIG. 22 is a sectional view showing the cross-section structure taken along line B-B' of FIG. 16, respectively.

The touch panel of capacitance type shown in FIGS. 21 and 22 has the thin line portions 1a and the pad portions 1b of the plural X-electrodes formed on the surface of the touch panel substrate 15 at the observer side. The thin line portions 2a and the pad portions 2b of the plural Y-electrodes are formed on the insulating film (PAS 1). The thin line portions 2a and the pad portions 2b of the plural Y-electrodes are covered with the protective film (PAS 2) as the upper layer.

The X-electrodes and the Y-electrodes of the touch panel of capacitance type shown in FIGS. 21 and 22 are formed on different layers, respectively. The thin line portion 2a of the Y-electrode intersects with the thin line portion 1a of the X-electrode in the planar view.

As a planar view, the pad portion 2b of the Y-electrode is provided between the two adjacent thin line portions 1a of the X-electrode, and the pad portion 1b of the X-electrode is provided between the two adjacent thin line portions 2a of the Y-electrode.

Each of the plural X-electrodes and Y-electrodes is formed of a material with high transparency, for example, transparent conductive material such as ITO (Indium Tin Oxide). The wiring 6 includes the transparent conductive layer as the lower layer formed of the transparent conductive material such as ITO, and a metal layer as the upper layer formed of a silver alloy material.

Example 2

Figure 23:
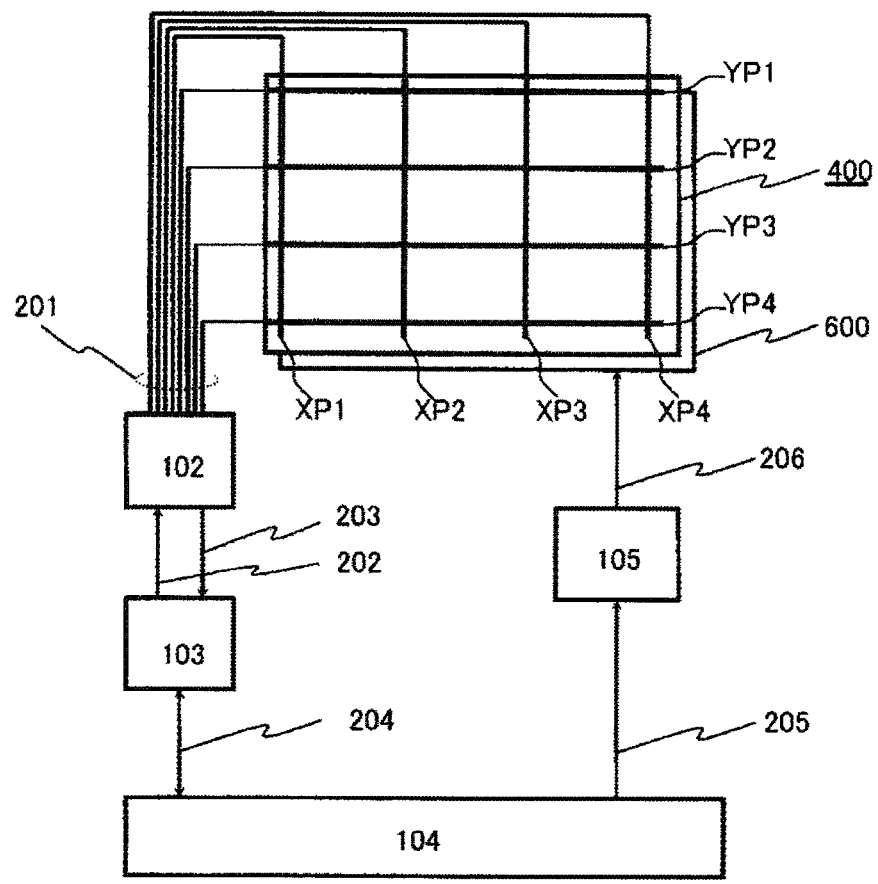
FIG. 23 is a schematic view of a display device provided with an input device according to Example 2 of the present invention.

FIG. 23 illustrates a schematic structure of an input device (touch panel) according to Example 2 of the present invention, and a display device equipped with the input device. FIG. 23 shows a touch panel 400 according to Example 2. The touch panel 400 includes X-electrodes XP and Y-electrodes YP for detecting capacitance. The drawing shows four. X-electrodes (XP1 to XP4), and four Y-electrodes (YP1 to YP4). However, the number of the electrodes is not limited to the aforementioned value.

The touch panel 400 is attached to a front surface of a display device 600. Preferably, the touch panel 400 has high optical transmittance because the displayed image has to transmit the touch panel 400 for allowing the user to see the image displayed on the display device 600.

The X-electrodes and the Y-electrodes of the touch panel 400 are connected to a capacitive detector 102 through detection wirings 201. The capacitive detector 102 is controlled based on a detection control signal 202 output from a control unit 103 to detect each interelectrode capacitance between the respective electrodes (X-electrode, Y-electrode) contained in the touch panel, and to further output a capacitance detection signal 203 which changes in accordance with the capacitance value of the electrode to the control unit 103. The control unit 103 not shown in the drawing includes the data storage unit 4 shown in FIG. 1.

The control unit 103 calculates each interelectrode capacitance between the respective electrodes based on the capacitance detection signal 203 of the respective electrodes, and obtains an input coordinate through arithmetic operation from the interelectrode capacitance between the electrodes. The control unit 103 transfers the input coordinate to a system control unit 104 using an I/F signal 204.

Upon reception of the input coordinate transferred from the touch panel 400 through touching operation, the system control unit 104 generates a display image in accordance with the touching operation, and transfers the display image to a display control circuit 105 as a display control signal 205.

The display control circuit 105 generates a display signal 206 based on the display image transferred as the display control signal 205, and displays the image on the display device 600.

Figure 24:
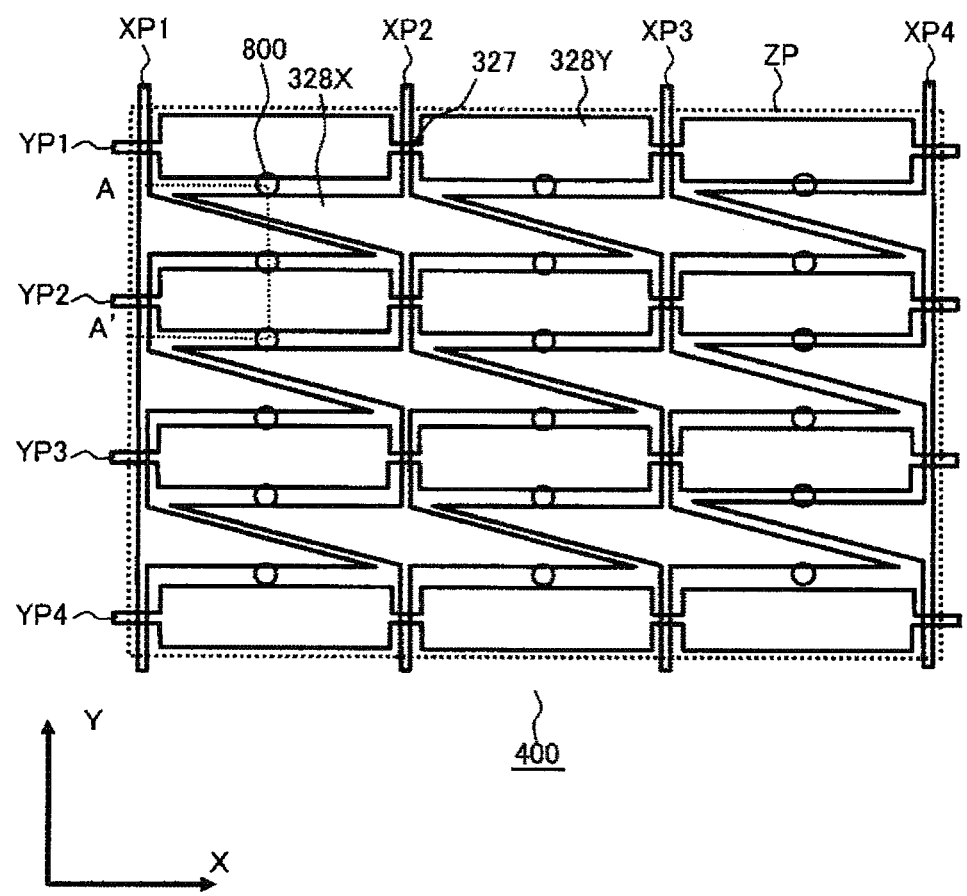
FIG. 24 is a schematic plan view illustrating electrodes of the input device according to Example 2 of the present invention.

FIG. 24 illustrates electrode patterns of the X-electrodes XP, Y-electrodes YP and Z-electrodes ZP for detecting capacitance of the touch panel 400 shown in FIG. 23. As for the X-electrode XP and the Y-electrode YP, the X-electrode XP is connected to the capacitive detector 102 through the detection wiring 201, for example. Meanwhile, a pulse signal is applied to the Y-electrode YP at a predetermined timing and voltage in a set time period through the detection wiring 201. The Z-electrode ZP is kept in a floating state, not in an electrically coupled state. The Z-electrode ZP corresponds to the electrode film 22 shown in FIG. 2.

Referring to FIG. 24, the Y-electrode YP extends in a horizontal direction of the touch panel 400 (in x-direction shown in the drawing), and plural Y-electrodes YP are arranged in a longitudinal direction (in y-direction shown in the drawing). At the intersection between the Y-electrode YP and the X-electrode XP, each electrode width of the Y-electrode YP and the X-electrode XP is reduced so as to decrease the intersection capacitance between the electrodes. The thus narrowed portion is referred to as a thin line portion 327. The Y-electrode YP is configured to arrange the thin line portions 327 and electrode portions (hereinafter referred to as the pat portion or the individual electrode) 328Y interposed between the thin line portions 327 alternately in the extending direction.

The X-electrode XP is provided between the adjacent Y-electrodes YP. The X-electrode XP extends in a longitudinal direction of the touch panel 400. Plural X-electrodes XP are horizontally arranged in plural lines. Likewise the Y-electrode YP, the X-electrode XP is configured to have the thin line portions 327 and the pad portions 328X alternately arranged in the extending direction.

Referring to FIG. 24, the pad portion 328X of the X-electrode XP has a rhombic shape. It is assumed that the wiring position (or thin line portion 327 of the X-electrode XP) for connecting the X-electrode XP to the detection wiring is set to the horizontal center of the X-electrode XP for the purpose of explaining the shape of the pad portion 328X of the X-electrode XP. The pad portion 328X of the X-electrode XP is configured to have the area reduced as it becomes closer to the center of the other adjacent X-electrode XP, and increased as it becomes closer to the center of the X-electrode XP.

For the area of the X-electrode XP between two adjacent X-electrodes XP, for example, the X-electrodes XP1 and XP2, the area (electrode width) of the pad portion 328X of the X-electrode XP1 around the center of the X-electrode XP1 is maximized, and the area (electrode width) of the pad portion 328X of the X-electrode XP2 is minimized. Meanwhile, the area (electrode width) of the pad portion 328X of the X-electrode XP1 around the center of the X-electrode XP2 is minimized, and the area (electrode width) of the pad portion 328X of the X-electrode X22 is maximized. The pad portion 328X between the two adjacent X-electrodes XP has a convex shape toward the adjacent X-electrode XP.

FIG. 24 shows the X-electrode XP with convex shape with respect to its horizontal direction. However, such shape is not limited to the one as shown in the drawing. For example, the left side of the electrode of the pad portion 328X of the X-electrode XP may have the convex shape, and the right side of the electrode may have the concave shape. Alternatively, the right side of the electrode of the X-electrode XP may have the convex shape, and the left side of the electrode may have the concave shape. Both left and right sides of the electrodes of the X-electrode XP may have the convex shapes, and the adjacent X-electrode XP may have the concave shape. The Z-electrode ZP is arranged to be overlapped with the Y-electrodes YP and the X-electrodes XP.

FIG. 24 shows the Z-electrodes ZP and spacers 800. The spacer 800 is formed to retain each distance between the X-electrode XP and the Z-electrode ZP, and the Y-electrode YP and the Z-electrode ZP. The Z-electrode ZP and the spacer 800 will be described in more detail later.

Figure 25:
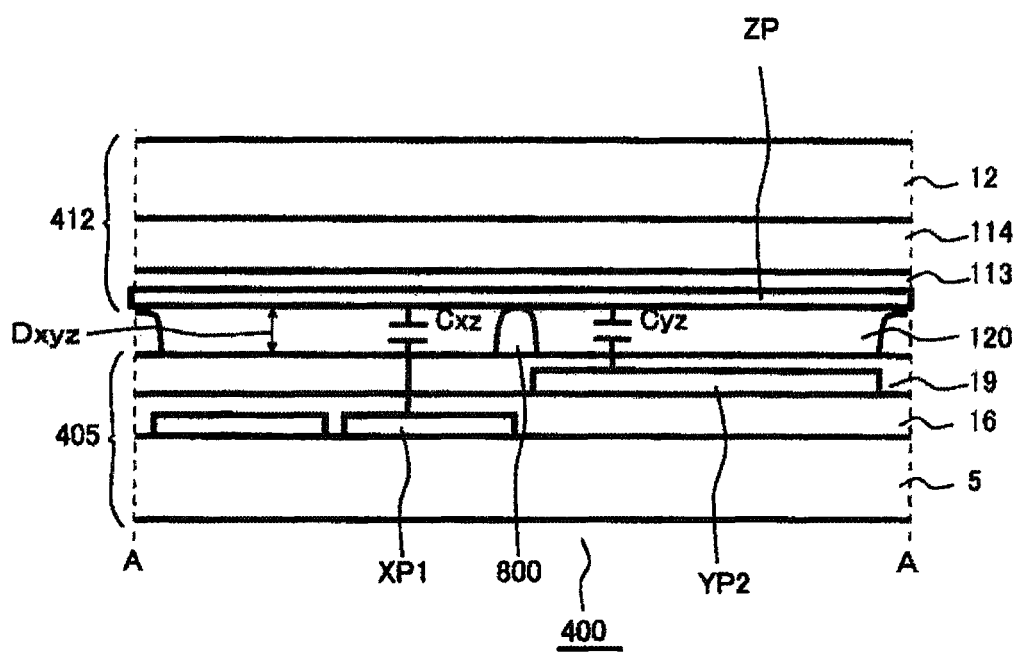
FIG. 25 is a schematic sectional view of an electrode portion of the input device according to Example 2 of the present invention.

FIG. 25 is a schematic sectional view taken along line A-A' of FIG. 24 showing a cross-section structure. The sectional view of FIG. 25 only shows the layer that is necessary for explaining the touch panel operation.

The touch panel of capacitance type is configured to detect change in the value of capacitance generated between the X-electrode XP and the Y-electrode YP. Unlike the related art which sufficiently works with an XY-electrode substrate 405 at the lower portion as shown in the drawing, a Z-electrode substrate 412 at the upper portion is newly added to the touch panel 400 for the purpose of improving detection accuracy.

Each electrode of the XY-electrode substrate 405 of the touch panel 400 is formed on a first transparent substrate 5. The X-electrode XP is formed at a position close to the first transparent substrate 5, and then a first insulating film 16 is formed for insulating between the X-electrode and the Y-electrode. The Y-electrode YP is then formed. At this point, order for forming the X-electrode XP and the Y-electrode YP may be inverted. A second insulating film 19 is formed on the Y-electrode YP so as to cover the Y-electrode YP and the first insulating film 16.

As described above, the spacer 800 is provided between the XY-electrode substrate 405 and the Z-electrode substrate 412 so as to retain the interval therebetween. Frame-like seal materials (not shown) are provided around the outer circumference of both the substrates so as to fix the XY-electrode substrate 405 and the Z-electrode substrate 412 together. A detection insulating layer 120 is provided between the XY-electrode substrate 405 and the Z-electrode substrate 412.

A transparent elastic layer 114, a support layer 113, and the Z-electrode ZP are sequentially formed on the second transparent substrate 12 of the Z-electrode substrate 412 from above. The transparent elastic layer 114 with lower rigidity than that of the second transparent substrate 12 is used.

The detection insulating layer 120 between the XY-electrode substrate 405 and the Z-electrode substrate 412 may be formed of an arbitrary insulating material which is transparent and changes its film thickness under pressure resulting from the touching operation. For example, the detection insulating layer 120 may be formed of such material as the elastic insulating material. It is preferable to use gas having its volume variable under air pressure. When using gas, the spacers 800 have to be provided between the Z-electrode ZP and the X-electrode XP, and between the Z-electrode ZP and the Y-electrode YP, respectively for the purpose of keeping thickness of the detection insulating layer 120 constant in the untouched state.

As the material for forming the Z-electrode ZP, an organic conductive material such as a polythiophene conductive material, a sulfonated polyanin, and polypyrrole, or conductive microparticles (for example, ITO microparticle) dispersion synthetic resin may be employed. Likewise, flexible synthetic resin may be employed for forming the transparent elastic layer 114 and the support layer 113.

In this example, the spacers 800 are provided between the Z-electrode ZP and the X-electrode XP, and between the Z-electrode ZP and the Y-electrode YP. A large number of spacers 800 disperse in the display screen. In the case where the spacer 800 is formed of the transparent or pale-colored material, focusing or light scattering may occur around the spacers 800 and peripheral area to deteriorate display quality, thus causing secondary problem.

A deep black- or blue-colored material (optical density (OD) value is at least 2 or higher, and preferably, 3 or higher) is used for forming the spacer 800 to address the aforementioned secondary problem. Assuming that the transmission rate is defined as T (%), the optical density (OD) value may be derived from the equation of $CD=\log(1/T)$.

Besides the pigment agent dispersion acrylic resin, such acrylic resin as color resist film is employed for forming the spacer 800. When using the conductive material for forming the spacer 800, it has to be subjected to the insulation (high resistance) process such as coating process.

Capacitance change which occurs when touching the touch panel 400 will be described. Referring to FIG. 25, capacitances Cxz and Cyz are formed between the X-electrode XP and the Y-electrode YP via the Z-electrode ZP. In the state where the signal is supplied from the X-electrode XP, the Y-electrode YP is connected to the ground potential, and the Z-electrode ZP is brought into the floating state, connection states of the capacitances Cxz and Cyz may be expressed by the circuit diagram as shown in FIG. 26.

Figure 26:
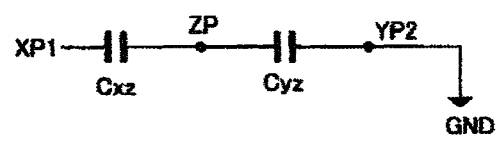
FIG. 26 is a schematic circuit diagram of the input device according to Example 2 of the present invention.

Referring to the circuit diagram shown in FIG. 26, a composite capacitance value Cxy of the capacitances Cxz and Cyz is expressed by the equation of $Cxy=Cxz \times Cyz/(Cxz+cyz)$. Touching operation changes the distance between the X-electrode XP and the Z-electrode ZP. Likewise, as the distance between the Y-electrode YP and the Z-electrode ZP changes, the composite capacitance value Cxy changes as well.

It is assumed that each change in thickness of the first insulating layer 16 and the second insulating film 19 upon touching is negligible. Each distance between the X-electrode XP and the Z-electrode ZP, and the Y-electrode YP and the Z-electrode ZP, which may change the capacitance value Cxy will be defined as the distance Dxyz. Each of actual distances between the X-electrode XP and the Z-electrode ZP, and the Y-electrode YP and the Z-electrode ZP is different from the distance Dxyz. However, as the capacitance Cxy changes in accordance with the change in the thickness of the detection insulating layer 120, the distance Dxyz will be used for simplifying the explanation. The distance Dxyz corresponds to the thickness of the detection insulating layer 120. It may be expressed as the distance between the Z-electrode ZP and the second insulating film 19.

Figure 27:
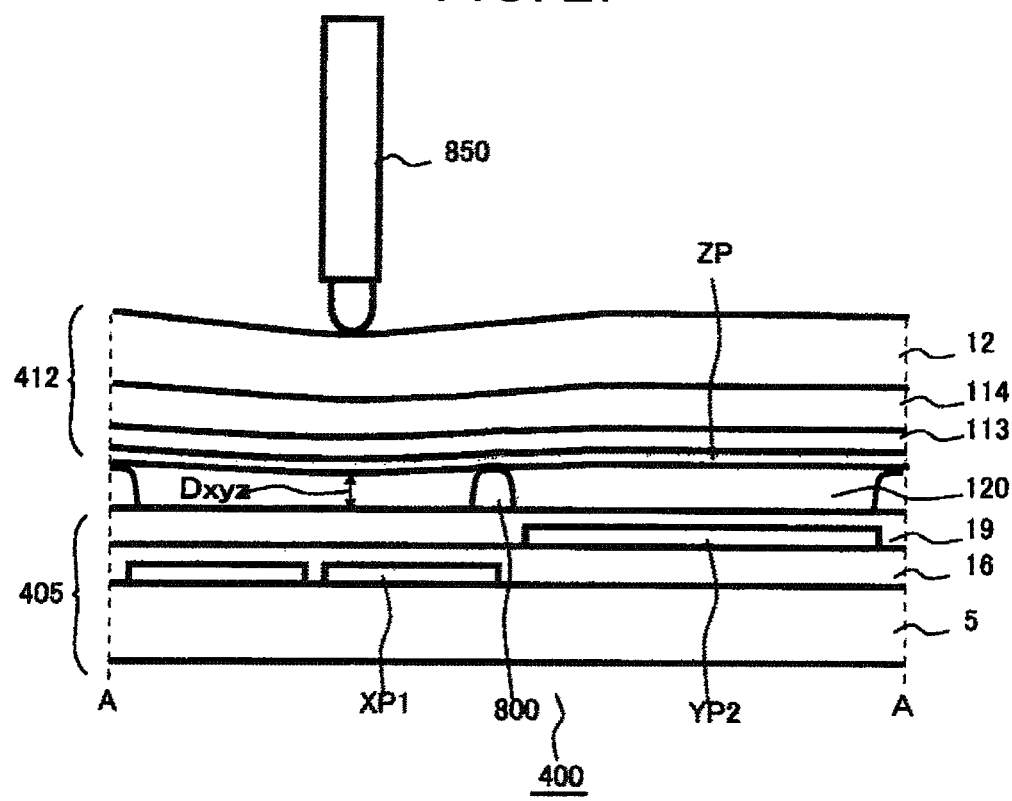
FIG. 27 is a schematic sectional view of the electrode portion of the input device according to Example 2 of the present invention.

FIG. 27 represents the touched state using the nonconductive pen 850 and the like. As the nonconductive pen 850 does not carry electric current, the capacitance change resulting from touching of the touch panel 400 with the nonconductive pen 850 may be negligible. It is therefore difficult to detect the capacitance change resulting from touching of the generally employed touch panel of capacitance type when using the nonconductive pen 850.

Then the Z-electrode ZP is used for detecting the touch with the nonconductive pen 850. In the case where the spacer 800 and the Z-electrode ZP are too hard to be deformed even if they are pressed with the pen 850, the Z-electrode ZP is pushed back by the spacer 800 to make the change in the distance Dxyz negligible. It is therefore difficult to detect the capacitance change because of very small change in the composite capacitance Cxy as described above.

Figure 28:
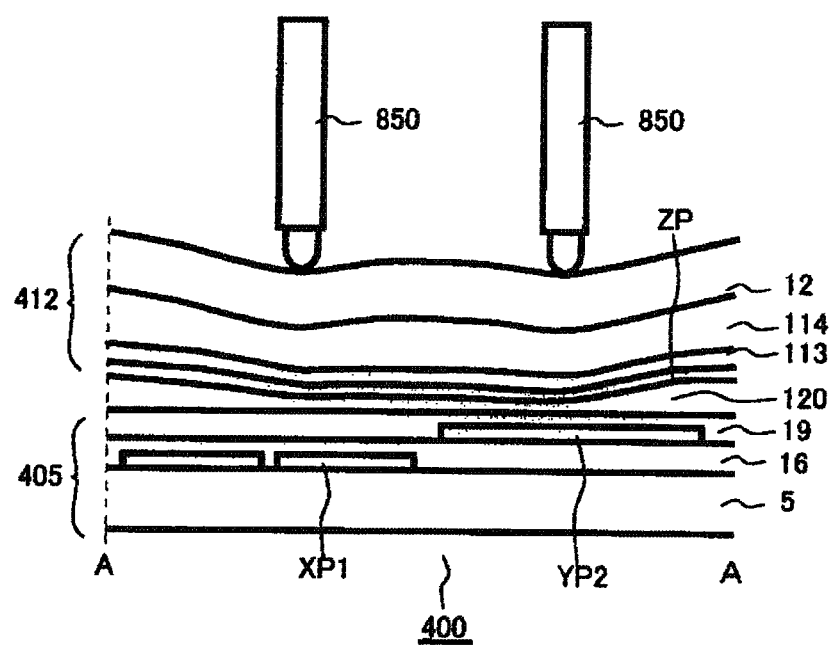
FIG. 28 is a schematic sectional view of the electrode portion of the input device according to Example 2 of the present invention.

FIG. 28 represents the case of no spacer 800 for avoiding its restrictive action. In this case, no push-back action of the spacer 800 occurs, and the change in the distance Dxyz is governed by the member with high rigidity. Generally, as the second transparent substrate 12 has higher rigidity, the position of the Z-electrode ZP changes depending on a deflection amount of the second transparent substrate 12 that is pressed with the pen 850.

In the aforementioned case, when two adjacent points are depressed as shown in FIG. 28, it is difficult to detect those points separately. As described above, the change caused by depression with the pen 850 corresponds to the change in the second transparent substrate 12 with high rigidity. If the distance between the two points which are simultaneously depressed is small with respect to the distance from the point (position of the seal material) at which the second transparent substrate 12 is fixed, the amount of deflection at the fixed point as the supporting point becomes larger than the deflection amount between the two points. It is therefore difficult to detect the amount of change between the two points.

Figure 29:
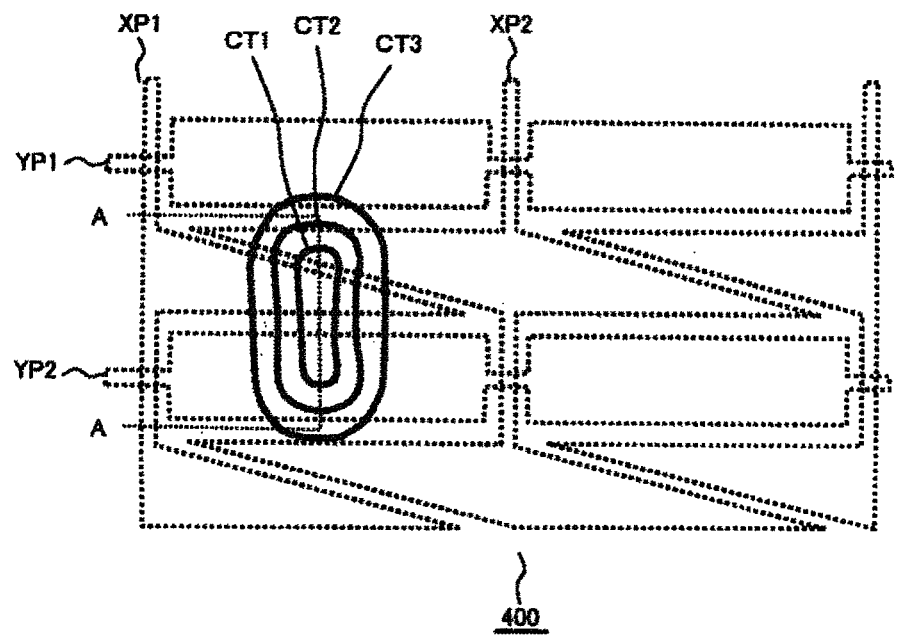
FIG. 29 is a schematic plan view representing detected intensity of the electrode portion of the input device according to Example 2 of the present invention.

FIG. 29 represents detected intensity with respect to the capacitance Cxy when two adjacent points are depressed. Referring to FIG. 29, each of lines CT1 to CT3 is formed by connecting positions with the same detected intensity. As shown in FIG. 29, those lines CT1 to CT3 are continuous between the two points. It is therefore difficult to separately detect the two points based on the capacitance change.

Figure 30:
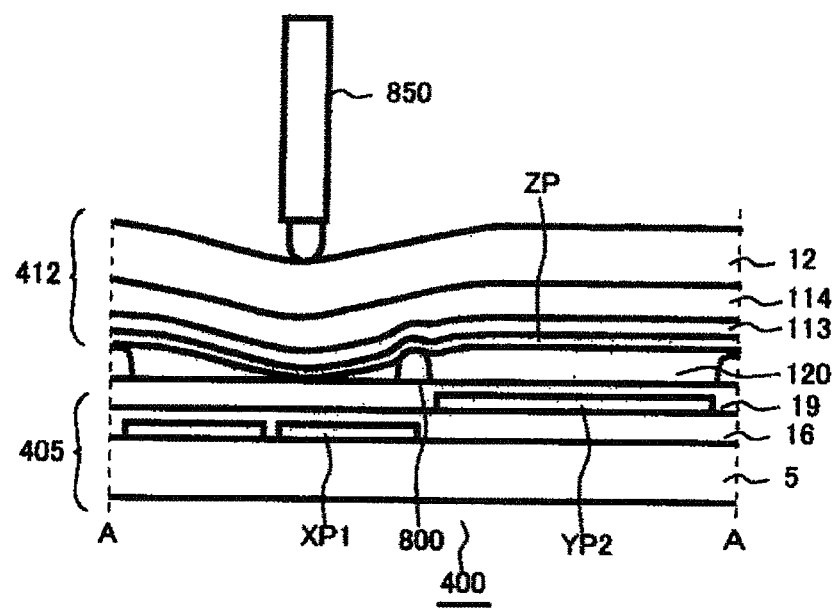
FIG. 30 is a schematic sectional view of the electrode portion of the input device according to Example 2 of the present invention.

Referring to FIG. 30, the Z-electrode ZP is formed of a flexible material which elastically deforms such as the organic conductive film. Each of the transparent elastic layer 114 and the support layer 113 which are laminated on the Z-electrode ZP is also formed of the flexible material. When the touch panel is touched with the pen 850, the second transparent substrate 12 deflects, and accordingly, the Z-electrode ZP moves to reduce the distance Dxyz.

When the Z-electrode ZP is in contact with the spacer 800, it is elastically deformed as it is more flexible than the spacer 800. The distance Dxyz may be reduced to the degree which allows detection of the change amount of the capacitance Cxy without restriction of displacement of the Z-electrode ZP by the spacer 800. Furthermore, as the flexible material is used for forming both the transparent elastic layer 114 and the support layer 113, the spacer 800 is brought into the embedded state in the Z-electrode ZP. This makes it possible to easily reduce the distance Dxyz.

The above-described elastic deformation of the Z-electrode ZP refers not only to deformation of the Z-electrode ZP but also to deformation of both the laminated transparent elastic layer 114 and the support layer 113 to the degree which allows detection of the change amount of the capacitance Cxy. In other words, the elastic deformation refers to the state where the film thickness of any one of the Z-electrode ZP, the transparent elastic layer 114, and the support layer 113 which will be pushed back by the spacer 800 upon touching operation is reduced under pressure. FIG. 30 corresponds to the "touched state example 1" of Example 1 as described above.

Figure 31:
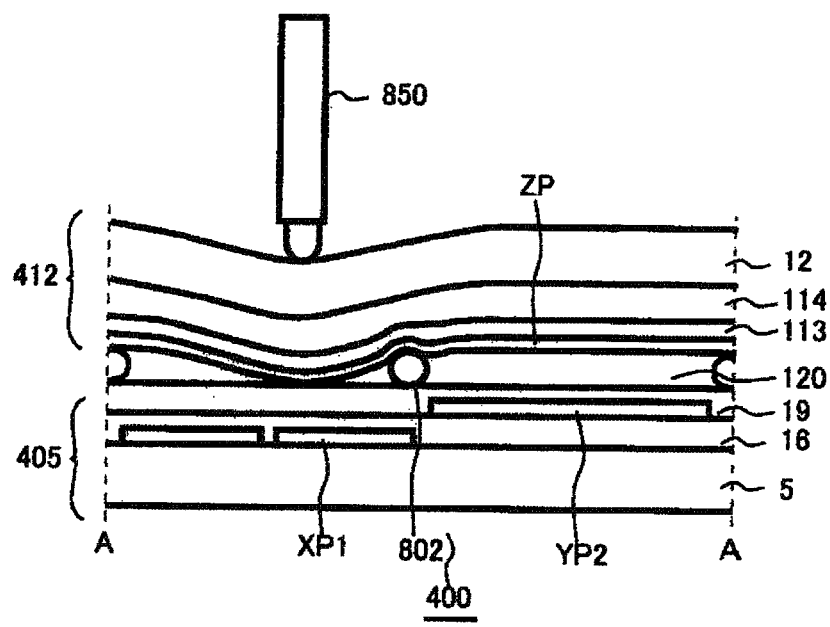
FIG. 31 is a schematic sectional view of the electrode portion of the input device according to Example 2 of the present invention.

FIG. 31 shows a granular spacer 802 instead of using the spacer 800. The granular spacer 802 is formed by fixing appropriately dispersed polymer beads, glass beads and the like each with uniform size on the second insulating film 19.

Each of the Z-electrode ZP, the transparent elastic layer 114, and the support layer 113 is more flexible than the granular spacer 802 shown in FIG. 31. Then the Z-electrode ZP elastically deforms, and the distance Dxyz is reduced to the degree which allows detection of the change amount of the capacitance Cxy. Each of the transparent elastic layer 114 and the support layer 113 is formed of the flexible material so that the granular spacer 802 is also brought into the embedded state in the Z-electrode ZP.

Figure 32:
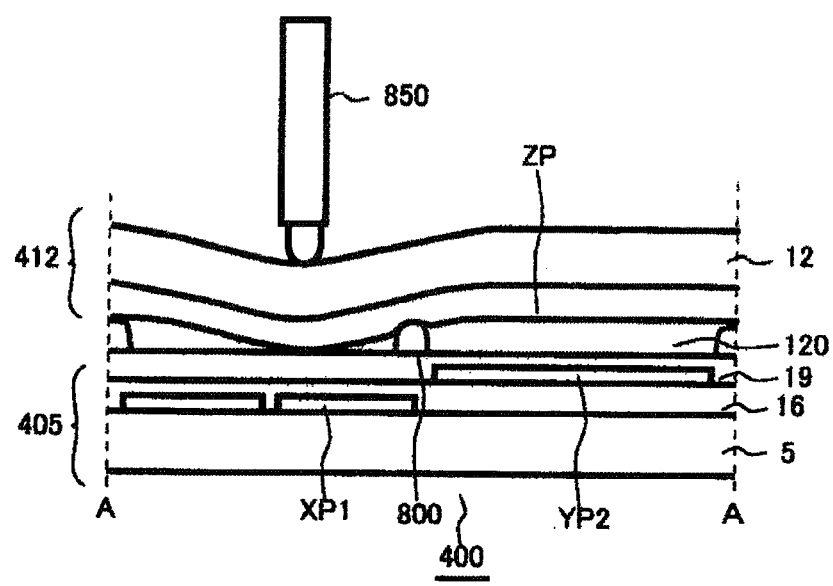
FIG. 32 is a schematic sectional view of the electrode portion of the input device according to Example 2 of the present invention.

Referring to FIG. 32, the Z-electrode ZP is formed of the transparent elastic film with conductivity. As FIG. 32 shows, the Z-electrode ZP is formed of the layer that is as thick and flexible as the above-described transparent elastic layer 114 so that the resultant layer is sufficiently deformable under pressure. Specifically, the transparent elastic layer 114 is required to be sufficiently thick to cope with the displacement upon touching as it is impossible to shrink beyond its thickness.

Figure 33:
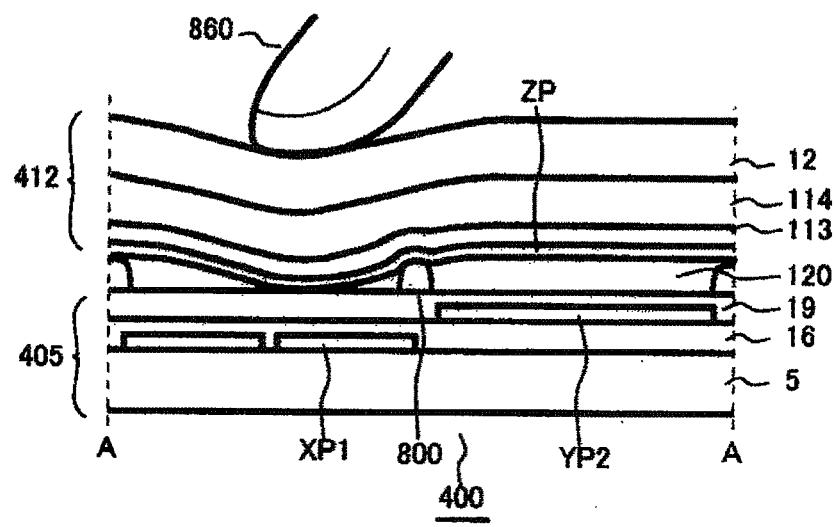
FIG. 33 is a schematic sectional view of the electrode portion of the input device according to Example 2 of the present invention.

FIG. 33 represents the finger 860 as the input element. Upon touching with the finger 860, the Z-electrode ZP is elastically deformed to reduce the distance Dxyz to the degree which allows detection of amount of change in the capacitance Cxy. FIG. 33 represents the state which has been changed from the untouched state, the touched state example 2, the touched state example 3, and the touched state example 4, sequentially as described in Example 1.

Figure 34:
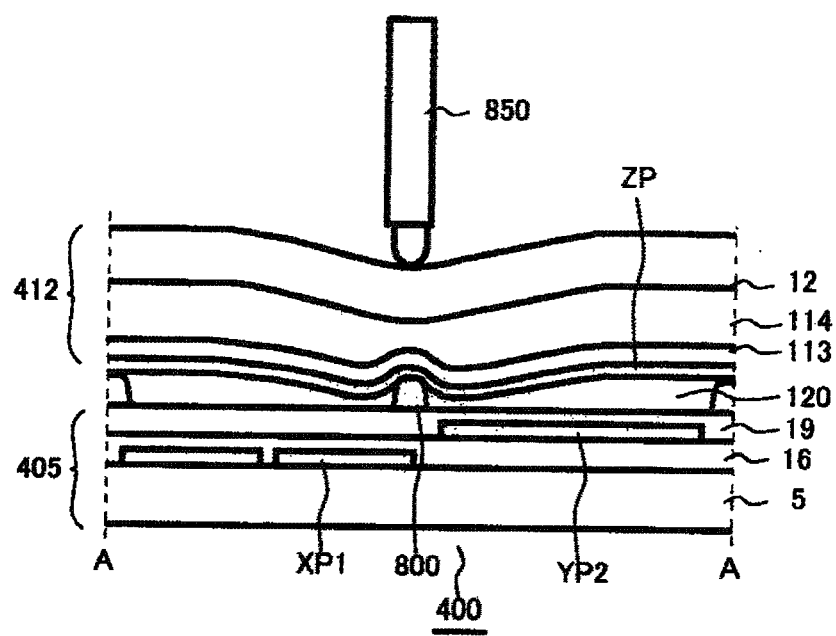
FIG. 34 is a schematic sectional view of the electrode portion of the input device according to Example 2 of the present invention.

FIG. 34 represents the state where the portion just above the spacer 800 is touched with the pen 850. The second transparent substrate 12 is deflected by touching to bring the Z-electrode ZP into contact with the spacer 800. In this case, the Z-electrode ZP, the transparent elastic layer 114, and the support layer 113 are more flexible than the spacer 800, and the Z-electrode ZP is deformed to bring the spacer 800 into the embedded state. That is, the Z-electrode ZP on the straight line that connects the spacer 800 and the pen 850 is depressed. Meanwhile, the Z-electrode ZP around the spacer 800 is deformed to surround the spacer 800. So the distance Dxyz around the spacer 800 is also reduced to the degree which allows detection of amount of change in the capacitance Cxy. Compared to the related art, the structure according to the example allows highly accurate position detection at the position around the spacer 800.

Figure 35:
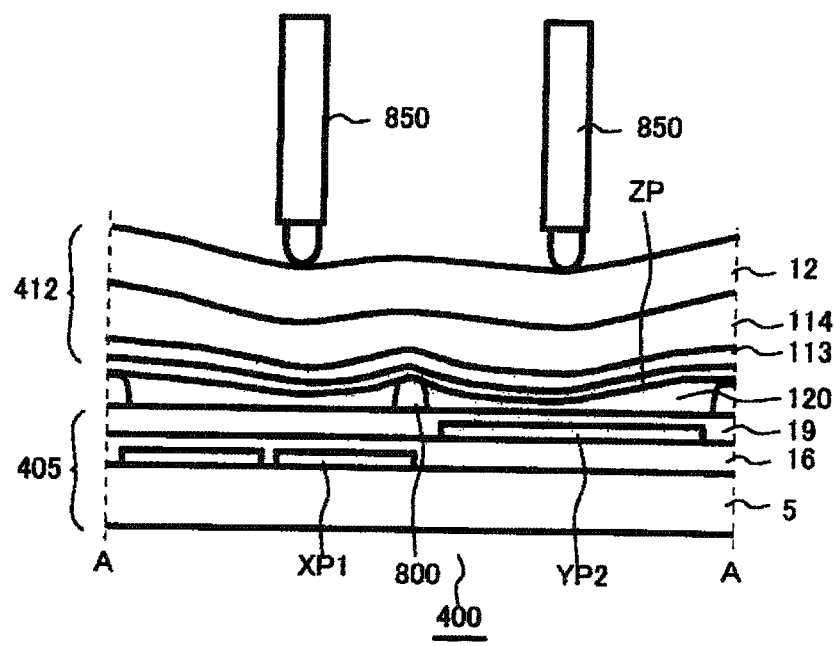
FIG. 35 is a schematic sectional view of the electrode portion of the input device according to Example 2 of the present invention.

Referring to FIG. 35, the spacer 800 is positioned between the two simultaneously touched points. In this case, the second transparent substrate 12 is deflected by touching. However, at the position of the spacer 800, the distance Dxyz is held thereby, and kept unchanged. At the portion around the spacer 800, the Z-electrode ZP displaces with respect to the spacer 800 as the support point so that the amount of change in the capacitance Cxy for each of the two points is detectable.

Figure 36:
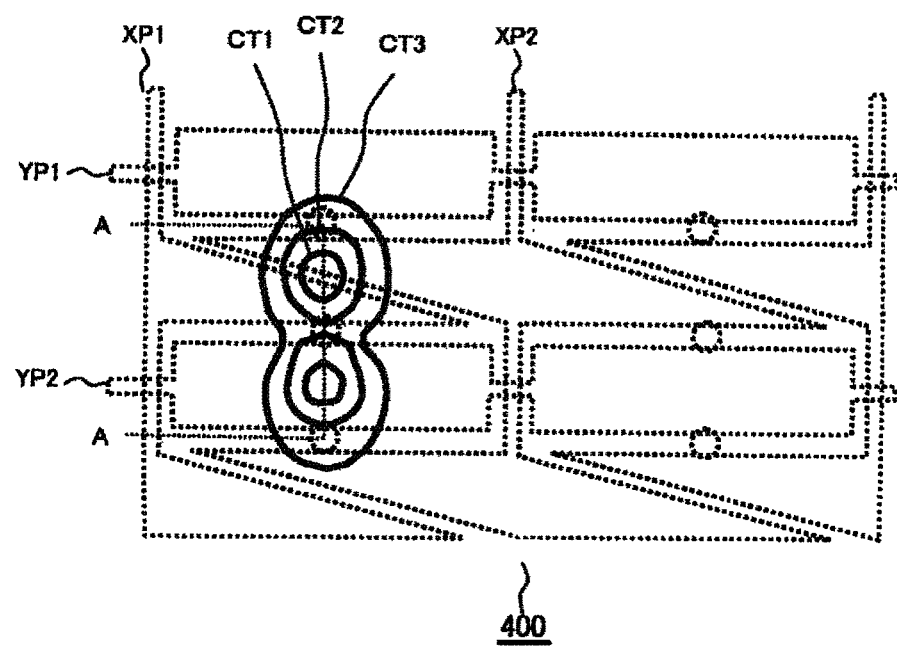
FIG. 36 is a schematic plan view representing detected intensity of the electrode portion of the input device according to Example 2 of the present invention.

FIG. 36 represents the amount of change in the capacitance Cxy (detected intensity) when the spacer 800 is positioned between the two adjacent depressed points. Referring to FIG. 36, lines CT1 and CT2 each indicating the same capacitance value are separated between those points. This makes it possible to separately detect those two points based on the capacitance change.

Besides existence of the spacer 800, each of the Z-electrode ZP, the transparent elastic layer 114, and the support layer 113 is formed of the flexible material so as to cope with the problem caused by the function of the spacer 800 for holding the distance Dxyz. In other words, as each thickness of the Z-electrode ZP, the transparent elastic layer 114, and the support layer 113 is reduced through depression, the force of the spacer 800 for restricting displacement of the second transparent substrate 12 is absorbed at the position of the spacer 800. The distance Dxyz around the spacer 800 is changeable to the degree which allows detection of the amount of change in the capacitance Cxy. This makes it possible to detect each of those two depressed points.

If the spacer 800 is not positioned on the line which connects the two points, the spacer 800 exists between the XY-electrode substrate 405 and the Z-electrode substrate 412 as the support point, and accordingly, depressed state of the two positions may be detected.

Figure 37:
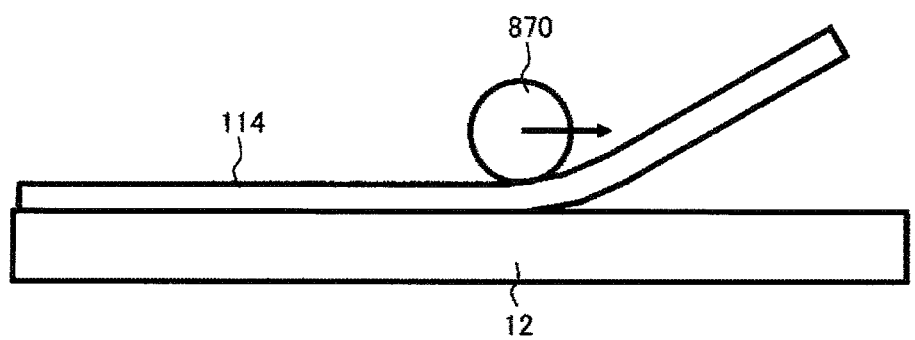
FIG. 37 is a schematic sectional view representing a method of manufacturing the electrode portion of the input device according to Example 2 of the present invention.
Figure 38:
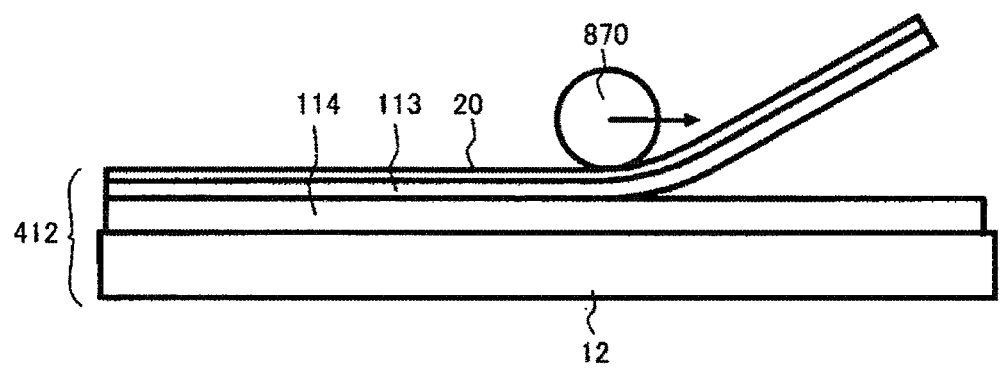
FIG. 38 is a schematic sectional view representing a method of manufacturing the electrode portion of the input device according to Example 2 of the present invention.

FIGS. 37 and 38 illustrate the method of manufacturing the Z-electrode substrate 412. FIG. 37 represents the method of forming the transparent elastic layer 114 on the second transparent substrate 12. Referring to the drawing, the second transparent substrate 12 is prepared. Then the sheet-like transparent elastic layer 114 is applied to the second transparent substrate 12 from one end while being pressed with a roller 870. Application of the flexible sheet-like material allows formation of the uniform layer using simple apparatus and method.

Referring to FIG. 38, a separately prepared sheet material obtained by forming the elastic conductive film 20 on the support layer 113 is applied to the structure obtained by applying the transparent elastic layer 114 to the second transparent substrate 12 from one end while being pressed with the roller 870. The elastic conductive film 20 is used as the Z-electrode ZP as described above.

A large-sized substrate is prepared as the second transparent substrate 12 so that plural touch panels are obtained. The transparent elastic layer 114, the support layer 113, and the elastic conductive film 20 which have large-sized sheet-like structures are applied to the thus prepared substrate. This makes it possible to manufacture a large number of touch panels at a time. If the elastic conductive film 20 may be applied to the transparent elastic layer 114 without using the support layer 113, or if the support layer 113 may be easily removed after applying the elastic conductive film 20, the support layer 113 does not have to be left in the touch panel 400.

Figure 39:
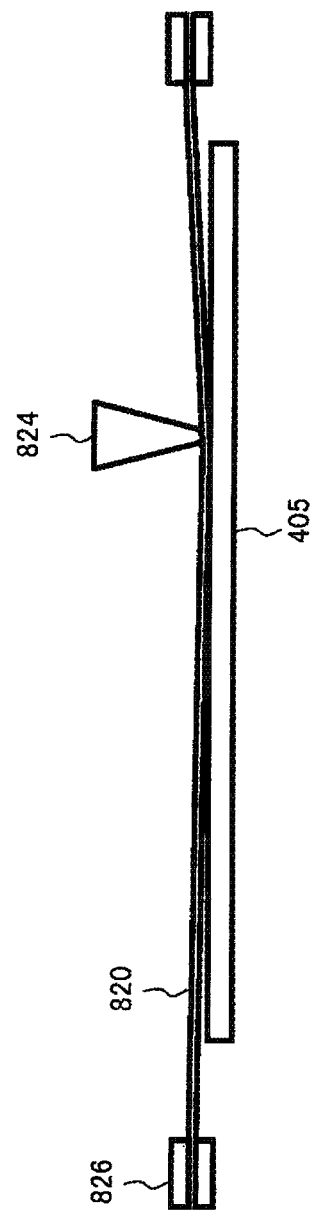
FIG. 39 schematically shows a configuration representing a method of manufacturing a seal material for the input device according to Example 2 of the present invention.
Figure 40:
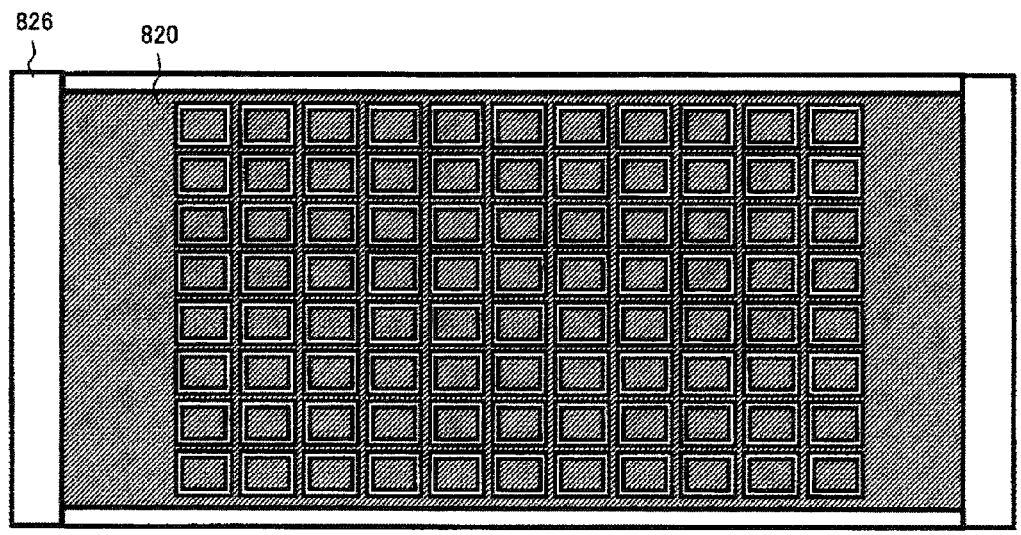
FIG. 40 is a schematic plan view of a printing plate of the seal material for the input device according to Example 2 of the present invention.

FIG. 39 represents the method of manufacturing the spacer 800 and the seal material 810. The spacer 800 and the seal material 810 may be formed by screen printing using a screen printing plate 820 as shown in FIG. 40. The screen printing plate 820 has holes in shapes of the spacer 800 (not shown in FIG. 40), and the seal material 810. The screen printing plate 820 is subjected to tension using a plate frame 826, and the material for forming the spacer 800 and the seal material 810 is extruded from the holes using a squeegee 824. Then the spacer 800 and the seal material 810 are transferred onto the XY-electrode substrate 405.

It is possible to form the spacer 800 only on the XY-electrode substrate 405, and to use the double-sided tape as the seal material 810. It is also possible to form the spacer 800 at the side of the XY-electrode substrate 405, and to form the seal material 810 at the side of the Z-electrode substrate 412.

Figure 41:
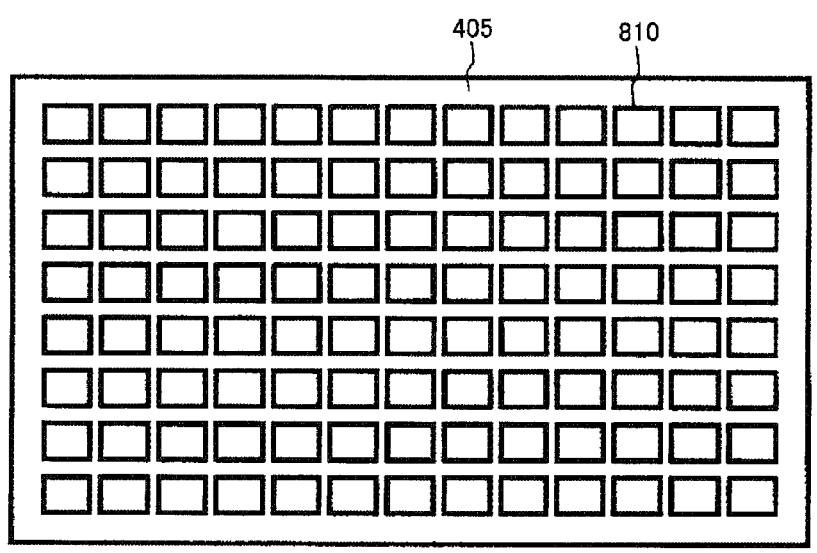
FIG. 41 is a schematic plan view representing the seal material for the input device according to Example 2 of the present invention.

FIG. 41 illustrates the seal materials 810 applied on the XY-electrode substrate 405. FIG. 41 represents manufacturing of plural touch panels 400 simultaneously. It is assumed that the spacers 800 which are not shown in the drawing are also formed. After transferring the spacers 800 and the seal materials 810, the spacers 800 are exposed to ultraviolet radiation or heating so as to be cured to a certain degree.

Figure 42:
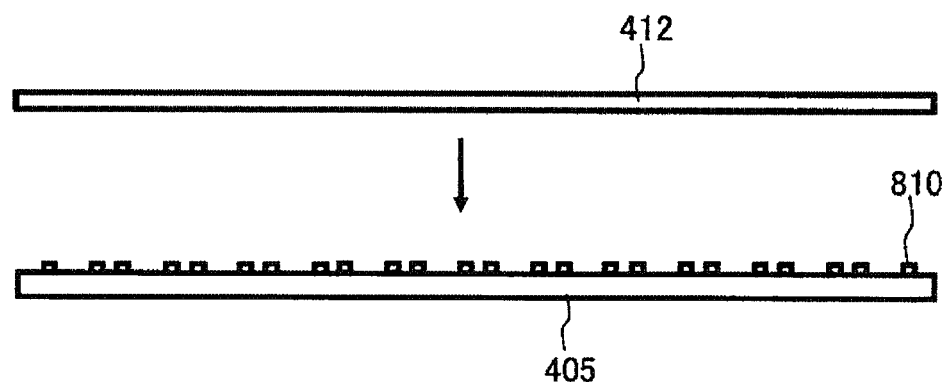
FIG. 42 is a schematic sectional view representing a method for manufacturing the input device according to Example 2 of the present invention.

Referring to FIG. 42, the Z-electrode substrate 412 is laminated on the XY-electrode substrate 405 on which the spacers 800 and the seal materials 810 are formed. The entire surface of the laminated structure is exposed to the ultraviolet radiation or heating so as to fix the substrates with the seal material 810. The spacers 800 are preliminarily cured so as not to be crushed by the Z-electrode substrate 412 which is laminated on the XY-electrode substrate 405. After fixing the substrates together, the touch panels 400 are individually cut out.

Figure 43:
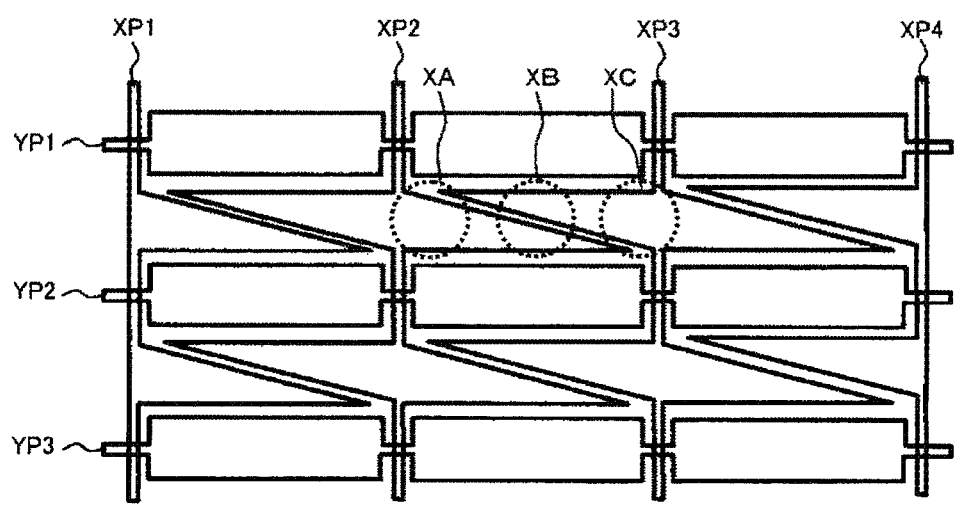
FIG. 43 is a schematic plan view of the electrode portion of the input device according to Example 2 of the present invention.

FIG. 43 represents each signal component of the respective electrodes upon horizontal change in the contact position in the case where the contact surface is small such as the pen 850.

As described referring to FIG. 26, the capacitance Cxy changes dependent on the area of the portion having the distance Dxyz reduced. The area of the portion having the distance Dxyz reduced will be referred to as a detection area. FIG. 43 shows circles XA, XB, and XC each as the detection area as an example. If the area of the overlapped portion between the detection area and the X-electrode XP, or the Y-electrode YP is large, the signal component becomes large. If the area of the overlapped portion is small, the signal component becomes small.

FIG. 43 shows that the position of the contact point changes between two adjacent X-electrodes of XP2 and XP3. The circle XA is located near the center of the X-electrode XP2, the circle XB is located at an intermediate position between the X-electrodes XP2 and XP3, and the circle XC is located near the center of the X-electrode XP3. FIG. 43 does not show the Z-electrode ZP and the spacer 800 for simplifying the drawing.

At the position of the detection area XA, the overlapped part between the detection area XA and the X-electrode XP2 becomes large, and the detection area XA is hardly overlapped with the X-electrode XP3 at the position of the detection area XA. Then the signal component of the X-electrode XP2 becomes large, and the signal component of the X-electrode XP3 becomes small.

At the position of the detection area XB, the area of the overlapped part between the X-electrode XP2 and XB is substantially the same as that of the overlapped part between the XP3 and XB. So the calculated signal component of the X-electrode XP2 becomes substantially the same as that of the XP3.

At the position of the detection area XC, the overlapped part between the detection area XC and the X-electrode XP3 becomes large, and the detection area XC is hardly overlapped with the X-electrode XP2. The signal component of the X-electrode XP3 becomes large, and the signal component of the X-electrode XP2 becomes small.

The control unit 103 executes centroid computation using the signal components of the respective electrodes so as to calculate the input coordinate at which the pen 850 is touched.

In the case where the signal component of the X-electrode XP2 is substantially the same as that of the XP3 like the detection area XB, the center of gravity is intermediately positioned between the X-electrodes XP2 and XP3. This makes it possible to calculate the input coordinate. Meanwhile, the signal component of one of the X-electrodes is significantly large like the detection areas XA and XC, the center of gravity is positioned around the X-electrode at which the large signal component is detected. This also makes it possible to calculate the input coordinate.

As described above, the X-electrode has a tapered shape toward the adjacent electrode. This makes it possible to execute centroid computation in spite of the wider interval between the X-electrodes than the detection area, thus allowing detection of the position with high accuracy. Widening of the interval between the X-electrodes than the detection area makes it possible to reduce more number of the electrodes than the generally employed electrode patterns. When each configuration of the X-electrodes is discrete while having the Y-electrode interposed therebetween, the Z-electrode ZP in the electrically floating state may be arranged to cross over the X-electrode XP and the Y-electrode YP. This makes it possible to detect the input coordinate in the X direction over the entire surface of the touch panel with high accuracy.

Figure 44:
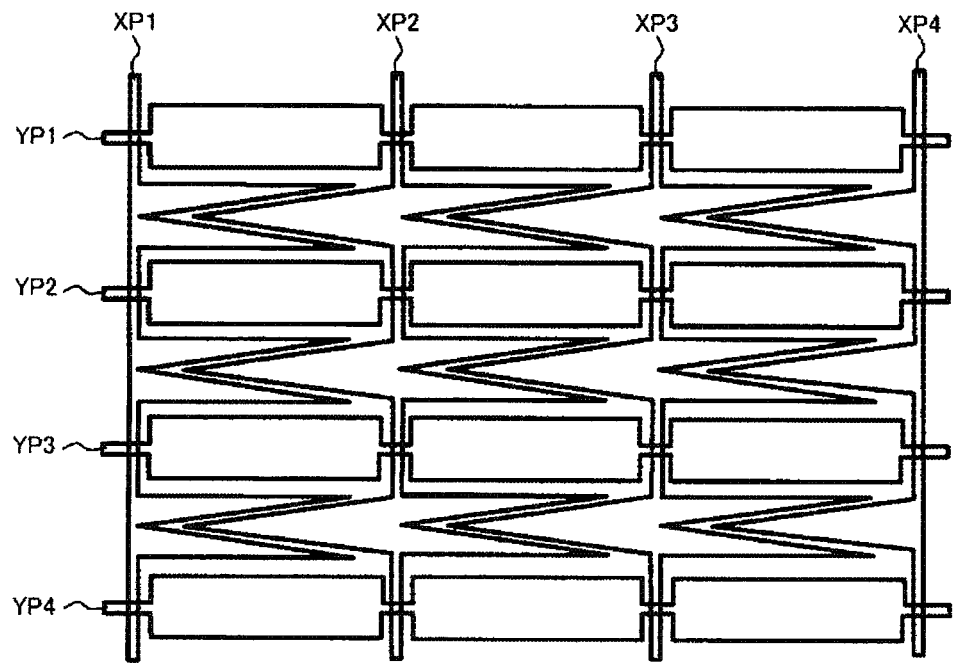
FIG. 44 is a schematic plan view of the electrode portion of the input device according to Example 2 of the present invention.

FIG. 44 illustrates the X-electrode XP with changed shape. The shape of the Y-electrode YP is kept unchanged in FIGS. 24, 43 and 44. FIG. 43 shows that the X-electrode X2 has a convex-like shape toward left and right sides. The X-electrode XP2 in FIG. 44 has a convex-like shape toward the adjacent X-electrodes XP1, and has a concave-like shape toward the other adjacent X-electrode XP3.

FIGS. 24, 43 and 44 show the same characteristic that the area is reduced as it is brought into closer to the center of the adjacent X-electrode XP, and the area is increased as it is brought into closer to the center of the X-electrode XP. This makes it possible to provide the effect derived from the X-electrode XP shown in FIG. 44 similar to the one derived from the X-electrode XP shown in FIG. 43. The shape of the X-electrode is not limited to those shown in FIGS. 43 and 44 so long as the area is reduced as it is brought into closer to the center of the adjacent X-electrode, and the area is increased as it is brought into closer to the center of the X-electrode.

Figure 46:
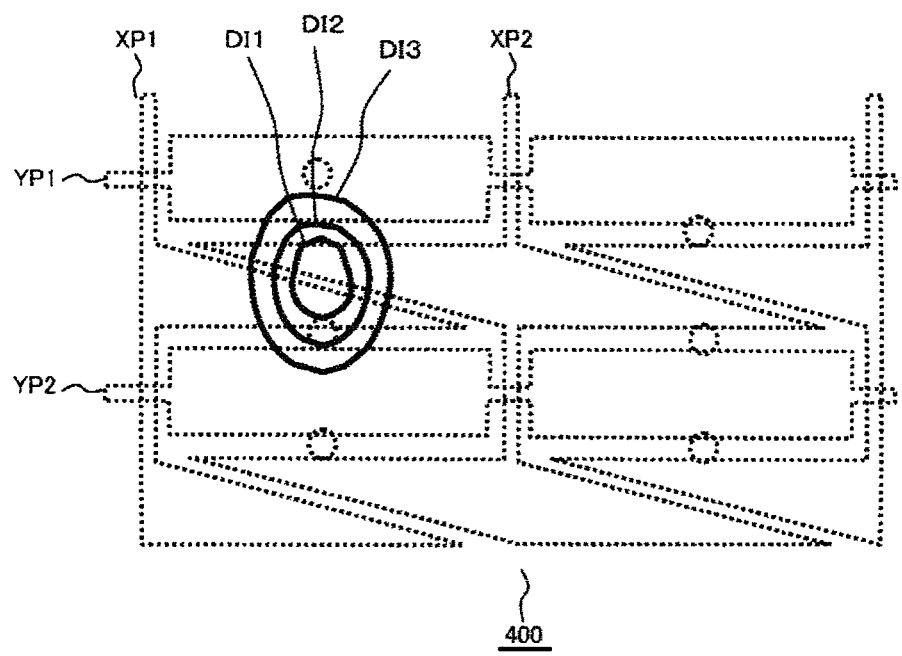
FIG. 46 is a schematic plan view of the detected intensity of the electrode portion of the input device according to Example 2 of the present invention.
Figure 47:
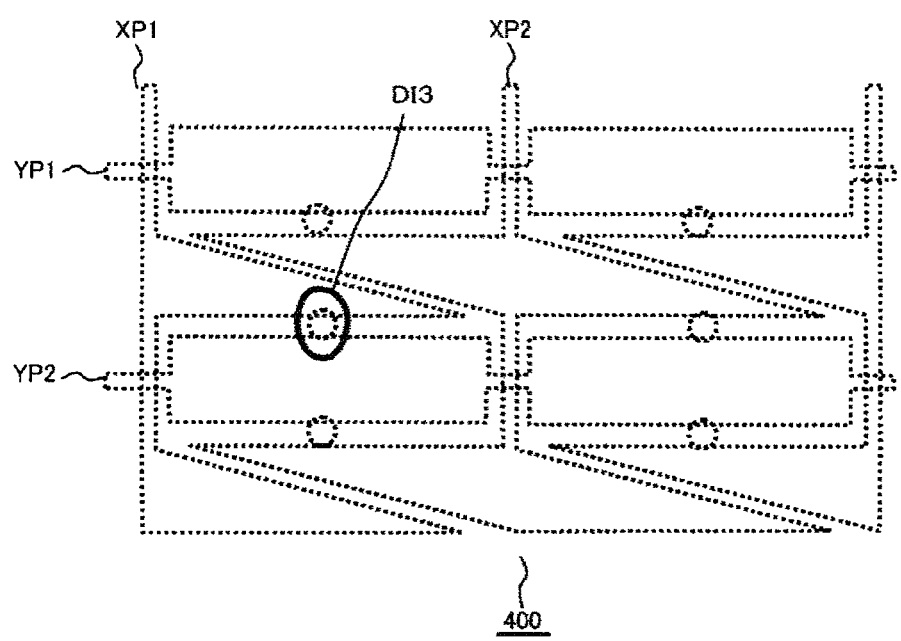
FIG. 47 is a schematic plan view of the detected intensity of the electrode portion of the input device according to Example 2 of the present invention.

Change in the detection area with respect to the resistance value of the Z-electrode ZP will be described. It is assumed that the Z-electrode ZP laminated on the X-electrode XP and the Y-electrode YP (solid electrode) as shown in FIGS. 45 to 47.

Figure 45:
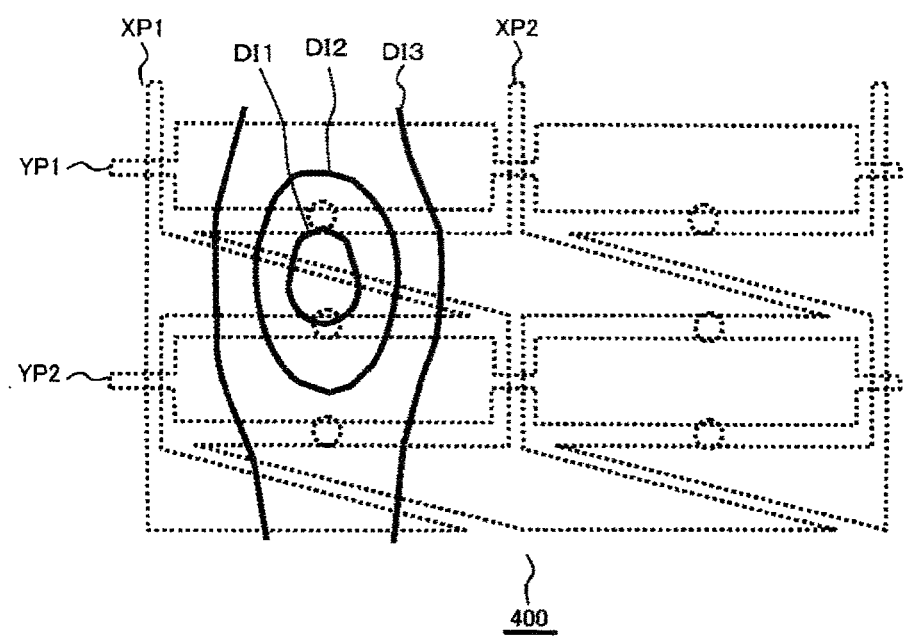
FIG. 45 is a schematic plan view of the detected intensity of the electrode portion of the input device according to Example 2 of the present invention.

FIG. 45 represents the detected intensity when the sheet resistance value of the Z-electrode ZP is low. FIG. 46 represents that both the sheet resistance value of the Z-electrode ZP and the detection area are adequately set. FIG. 47 represents the detected intensity when the sheet resistance value of the Z-electrode ZP is high.

Referring to FIG. 45, the detected intensity values DI1 to DI3 are obtained when the sheet resistance value of the Z-electrode ZP is equal to $1.0\times10^3\Omega/\square$. The respective detected intensity values have the relationship of DI1>DI2>DI3.

Each area of the detected intensities DI1 and DI2 is expanded, and the area of the detected intensity DI3 extends over the adjacent Y-electrode YP1. It is therefore difficult to detect the position with high accuracy.

FIG. 46 represents the detected intensity when the sheet resistance value of the Z-electrode ZP is $1.0\times10^5\Omega/\square$. The area with the detected intensity equal to or larger than DI3 that is effective as the detection area is overlapped with the adjacent electrode. It is therefore possible to detect the position with high accuracy.

FIG. 47 represents the detected intensity when the sheet resistance value of the Z-electrode ZP is $1.0\times10^7\Omega/\square$. Ranges which indicate the detected intensities DI1 and DI2 are disappeared. The area with the detected intensity equal to or larger than DI3 that is effective as the detection area is not sufficiently overlapped with the adjacent electrode. It is therefore difficult to detect the position with high accuracy.

In the case where the sheet resistance value of the ITO film for forming the X-electrode XP and the Y-electrode YP is approximately $1.0\times10^3\Omega/\square$, each overlapped distance between the X-electrode XP and the Y-electrode YP, and the Z-electrode ZP is small with respect to each distance for routing the X-electrode XP and the Y-electrode YP. It is thought that the detection area may be expanded when the sheet resistance value of the Z-electrode ZP is substantially the same.

If the sheet resistance value of the Z-electrode ZP exceeds the value of $1.0\times10^7\Omega/\square$, the Z-electrode ZP is no longer sufficient conductive member for the detection circuit, resulting in extreme decrease in the effective detected intensity.

Figure 48:
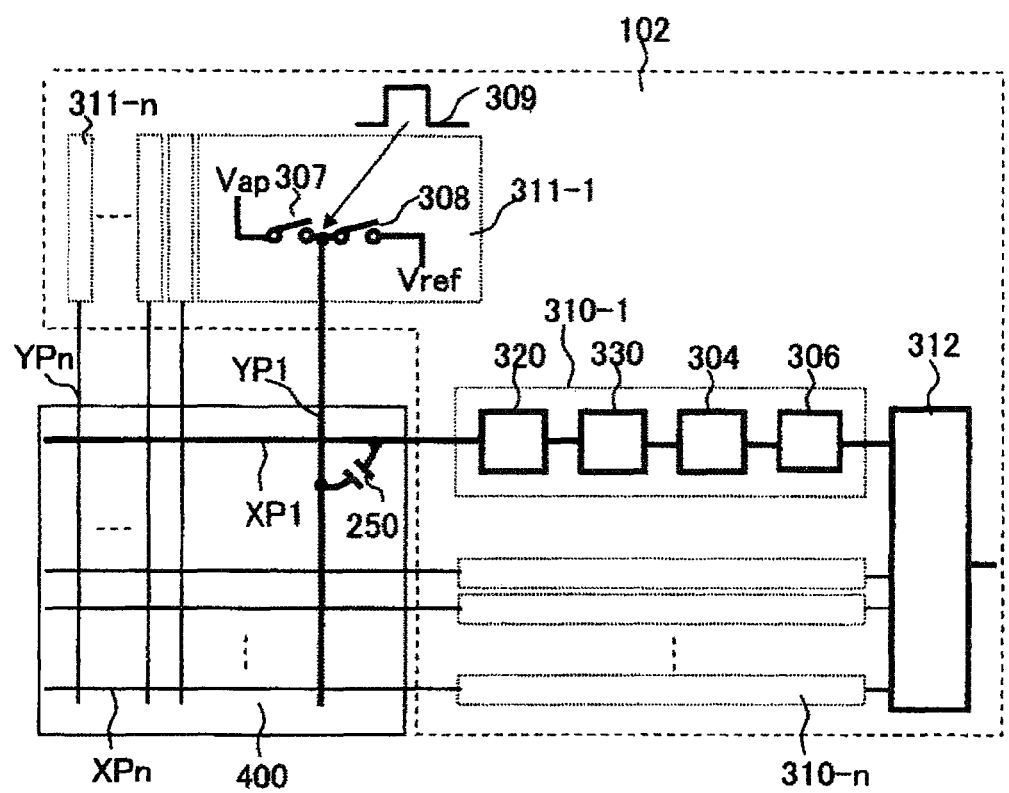
FIG. 48 is a schematic circuit diagram of a detection circuit of the input device according to Example 2 of the present invention.
Figure 49:
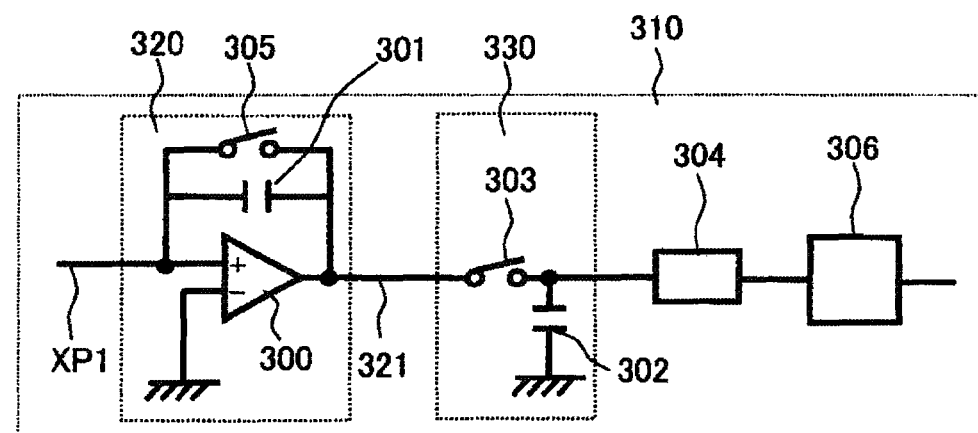
FIG. 49 is a schematic circuit diagram of a detection circuit of the input device according to Example 2 of the present invention.

The detection method will be described. FIG. 48 is a schematic block diagram of the circuit structure of the capacitive detector 102. FIG. 49 schematically shows a structure of a signal reading unit 310. The capacitive detector 102 includes a signal input device 311 for inputting the signal to the Y-electrode YP, a signal reading unit 310 for reading the signal from the X-electrode XP, and a memory unit 312.

FIG. 48 shows the circuit structure only of a pair of the X-electrode XP1 and the Y-electrode YP1. It is assumed that the signal reading unit 310-n and the signal input unit 311-n each with the same structure are connected to the corresponding X-electrode XP and the corresponding Y-electrode YP formed on the touch panel 400, respectively.

The signal input unit 311 applies voltage to the Y-electrode YP at reference potential Vap or Vref by selecting between switches 307 and 308 as shown by a waveform 309. The signal reading unit 310 includes an integrating circuit 320 that is formed of an operating amplifier 300, an integral capacitance 301 and a reset switch 305, a sample hold circuit 330 that is formed of a sample switch 303 and a hold capacitance 302, a voltage buffer 304, and an analog-digital converter 306.

Operations of the capacitive detector 102 will be briefly explained. It is assumed that the integral capacitance 301 is not fully charged in the initial state of the capacitive detector 102. In the initial state, the switch 307 is turned ON so that the signal input unit 311 applies voltage to the Y-electrode YP1. A coupling capacitance 250 (corresponding to the composite capacitance Cxyz) between the X-electrode and the Y-electrode is charged until the Y-electrode YP1 reaches the applied voltage Vap.

At this time, the X-electrode XP1 is constantly fixed to the ground potential by negative feedback action of the operating amplifier 300. So the charging current is applied to an output terminal 321 of the operating amplifier 300 via the integral capacitance 301.

Assuming that the voltage of the output terminal 321 of an integrating circuit 320 is set to Vo, the capacitance of the coupling capacitance 250 is set to Cdv, and the capacitance of the integral capacitance 301 is set to Cr, the relationship of Vo=−Vap (Cdv/Cr) is established. It is dependent on the capacitance Cdv of the coupling capacitance 250 between the X-electrode and the Y-electrode. As described in the example, the capacitive detector 102 is capable of measuring the capacitance between the electrodes at the respective electrode intersections (mutual capacitance).

The determined output potential Vo of the integrating circuit 320 determined by the operation is held in the sample hold circuit 330. The sample hold circuit 330 turns the sample switch 303 ON, and then turns it OFF after an elapse of a predetermined time to hold the output potential Vo in the hold capacitance 302. The potential Vo held in the hold capacitance 302 is input to the analog-digital converter 306 via the voltage buffer 304, and converted into digital data. It is configured to input the voltage held in the sample hold circuit 330 into the analog-digital converter 306 by the voltage buffer 304. The voltage buffer 304 may be configured to exhibit the voltage amplification ratio.

As for the X-electrode other than the aforementioned X-electrode XP1, the connected signal reading unit operates in the same manner as the signal reading unit 310 connected to the X-electrode XP1, and the integrating circuit output potential based on the input signal from the Y-electrode YP1 is read simultaneously with the X-electrode XP1.

The output from the signal reading unit 310 connected to the respective X-electrodes XP is input to the memory unit 312 to hold the output data. The retained data are sent or received between the memory unit 312 and the control unit 103 as shown in FIG. 23.

Signals 309 are sequentially sent to the Y-electrode YP so that the voltage is sequentially applied to the Y-electrode YP for detecting capacitance. The signal reading unit 310 is controlled to turn the reset switch 305 ON prior to detection of the capacitance, and then to turn OFF to reset the integrating capacitance 301 of each of the integrating circuits. The similar operations are repeatedly executed.

The timing for applying the signal 309 to the arbitrary Y-electrode YP is set. The signal with specific term pulse is applied to the specific Y-electrode YP so that it is possible to identify the Y-electrodes YP which outputs the signal corresponding to the X-electrode XP based on the count such as the reference clock.

Figure 50:
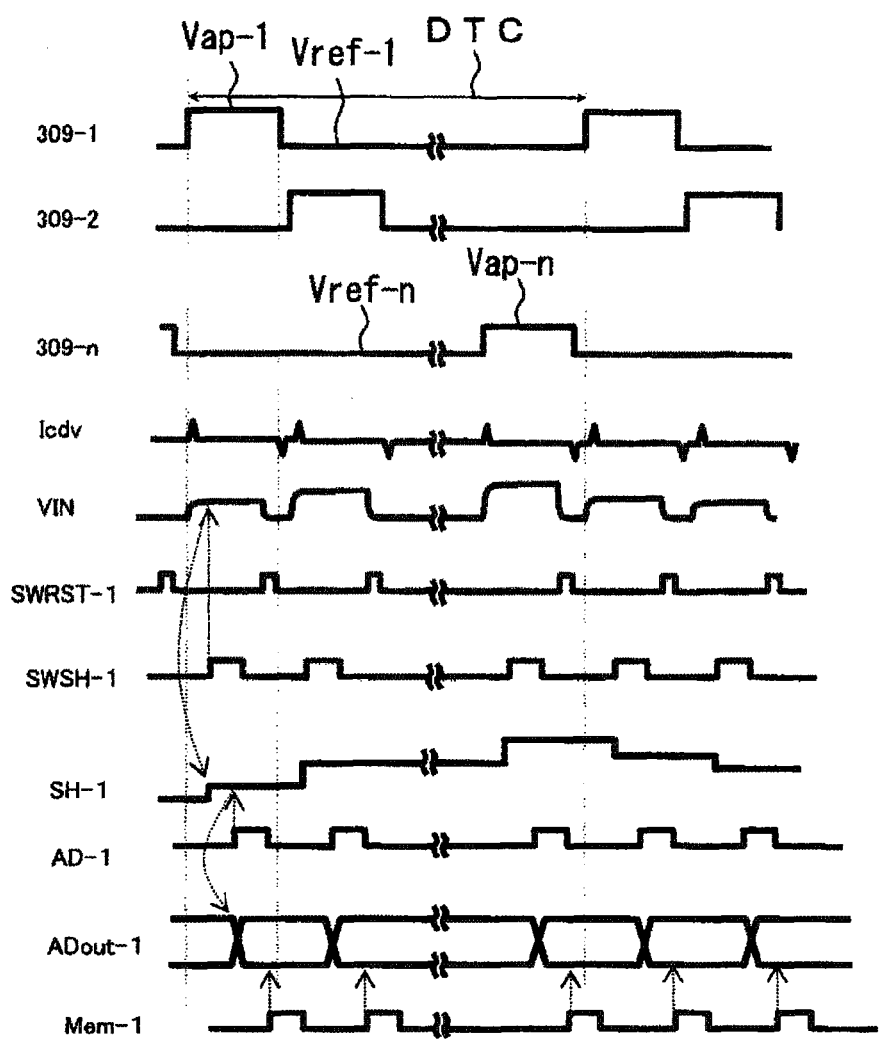
FIG. 50 is a timing chart indicating operations of the detection circuit in the input device according to Example 2 of the present invention.

FIG. 50 is a timing chart which represents operations of the capacitive detector 102 shown in FIG. 48. Signals 309-1 to 309-n represent actuating signal waveforms of signal input units 311-1 to 311-n, respectively, which output signals 309 sequentially to the Y-electrodes YP1 to YPn in a detection cycle DTC. The signal 309 will be referred to as a pulse signal.

A waveform Icdv is a current waveform which flows into the coupling capacitance 250 (Cdv) between the X- and Y-electrodes as shown in FIG. 48. Upon rise in potential of the Y-electrode YP in response to the signals input by the signal input unit 311, the current transiently flows. Upon drop in potential of the Y-electrode YP, the current transiently flows as well.

The waveform VIN is a voltage Vo of the output terminal 321 in the above-described integrating circuit 320 corresponding to an output waveform thereof as shown in FIG. 48, that is, each of the pulse signals 309. The waveform SWRST-1 represents the control signal waveform of the reset switch 305 shown in FIG. 49.

Upon rise in the reset switch control signal SWRST-1, the integrating circuit 320 is reset, and the waveform VIN rises up so that the signal reading unit 310 is brought into the initial state. Then the pulse signal 309 is input from the signal input unit 311, and the output waveform VIN of the integrating circuit 320 rises up again. The aforementioned operations are repeatedly executed. In this example, amplitude of the waveform VIN changes, which means magnitude of capacitance detected every time when the Y-electrode to which the signal is input is changed. In other words, if the touch panel 400 is in contact with the object to be detected, the signal VIN which reflects the capacitance change locally varies for indicating the contact point.

The waveform SWSH-1 denotes a signal for controlling the sampling switch 303 of the sample hold circuit 330 shown in FIG. 48. The waveform SH-1 denotes an output signal of the sample hold circuit 330. Within the time zone when the signal SWSH-1 rises up, the sampling switch 303 is turned ON, and the input potential to the sample hold circuit 330, that is, output potential (waveform VIN) of the integrating circuit 320 is applied to the hold capacitance 302. When the signal SWSH-1 drops, the sampling switch 303 is brought into OFF state, and the applied voltage is held by the hold capacitance 302. As the waveform SH-1 shows, the output of the sample hold circuit 330 is updated for each sampling operation.

The waveform AD-1 denotes the signal for controlling the analog-digital converter 306 shown in FIG. 48, and the waveform ADout-1 denotes the output signal of the analog-digital converter 306. For each update of the output waveform SH-1 of the sample hold circuit, the signal AD-1 is issued with a predetermined time lag. Upon output of the signal AD-1, the analog-digital converter 306 outputs the input voltage as the digital data ADout-1 with predetermined resolution.

The waveform Mem-1 denotes the writing control signal to the memory unit 312 as shown in FIG. 48. For each update of the signal ADout-1, the signal Mem-1 is issued with a predetermined time lag. Upon issuance of the signal Mem-1, the digital data ADout-1 are written into the memory unit 312.

Change in the signal waveform accompanied with operation of the capacitive detector 102 has been described focusing on the signal reading unit 310 as shown in FIG. 48. The signal reading unit (310-n) connected to the other X-electrode may provide the similar operations and change the waveform.

Referring to FIG. 51, detection values stored in the memory unit 312 shown in FIG. 48 are distinguished based on the timing for taking, and correlated to the coordinate defined by the X- and Y-electrodes. Each square denotes the position at which the respective electrodes on the x-axis and the y-axis intersect. The numerical number in the square denotes the value which reflects each capacitance value of the intersections obtained during the detection process. As the numerical value becomes large, the capacitance value is increased. Determination is made with respect to contact between the touch panel 400 and the object to be detected based on the numerical value, or the threshold value.

Referring to FIG. 52, the determination is made with respect to the state shown in FIG. 50 based on the threshold value. Specifically, it is determined that the contact occurs when the numerical value exceeds 100. As the drawing shows, the determination results are grouped, and the common number is assigned to the same group. Thereafter, the signal intensity distribution is analyzed for each group, and the analytical results are converted into the coordinate with respect to the contact between the touch panel 400 and the object to be detected.

A known labeling process may be performed for the grouping process. However, it is not limited to the process as described above. It is clear that an arbitrary method may be used besides the method of calculating the coordinate with respect to the contact between the touch panel 400 and the object to be detected using the data derived from the capacitive detection process as shown in FIG. 51. The operating method as described in Example 1 may be employed.

Figure 53:
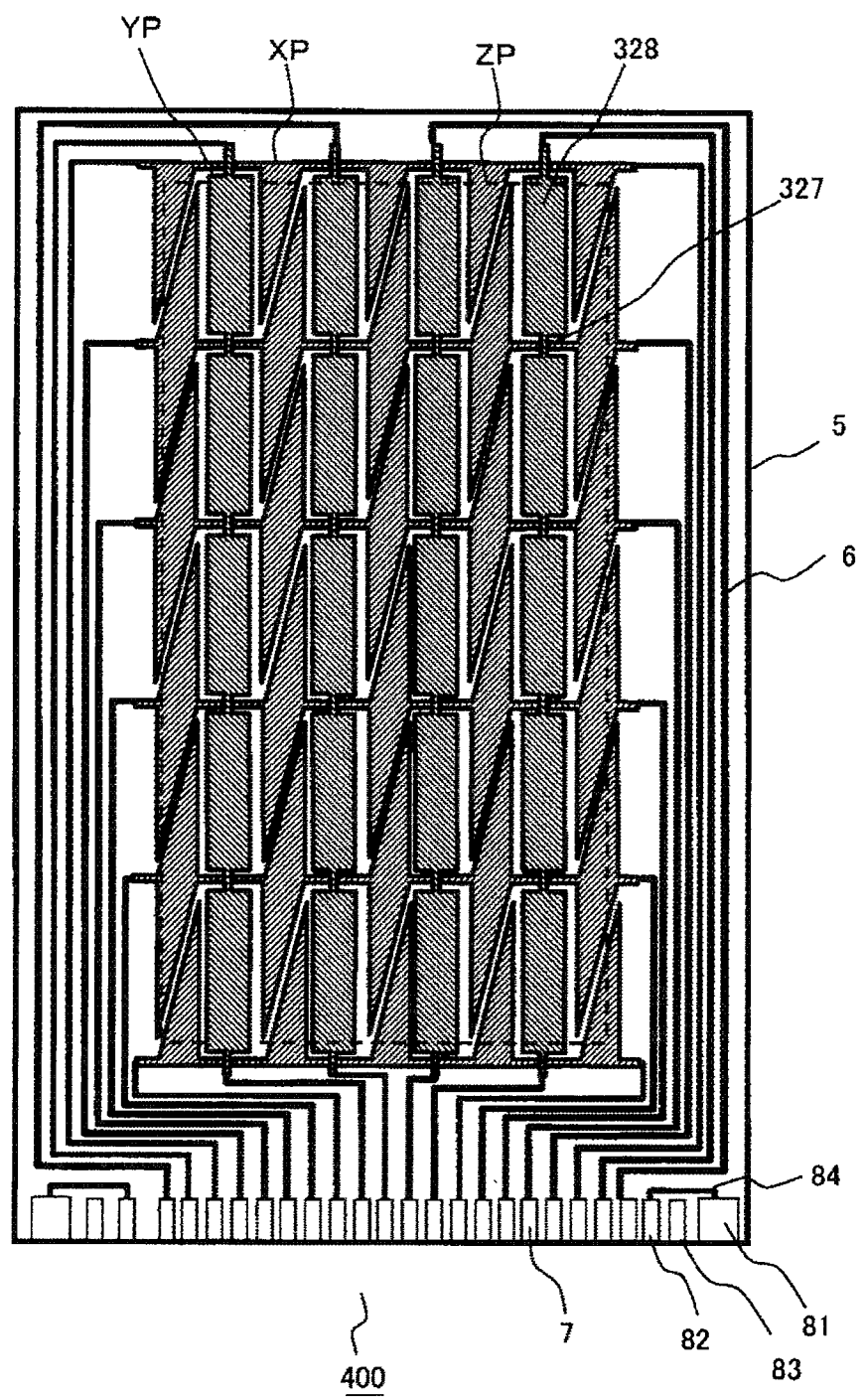
FIG. 53 is a schematic plan view of the input device according to Example 2 of the present invention.

FIG. 53 is a schematic plan view of the touch panel 400. FIG. 53 represents use of the touch panel 40 in a longitudinal direction. As described above, the X-electrodes XP, the Y-electrodes YP, and the Z-electrodes ZP are formed on the transparent substrate 5. In FIG. 53, the Z-electrode ZP is shown by a dashed line.

The X-electrodes XP and the Y-electrodes YP are arranged so that the individual electrodes (pad portions) 328 are alternately arranged. The X-electrode XP and the Y-electrode YP intersect at the thin line portion 327 between the individual electrodes 328. The X-electrode XP and the Y-electrode YP intersect at the intersection via the insulating film. The thin line portion 327 has its width reduced so as to decrease the capacitance generated at the intersection.

The wirings 6 are provided at the periphery of the touch panel 400 so that signals are supplied to the respective electrodes. The wirings 6 are connected to connection terminals 7 formed on one side of the touch panel 400. An external device is electrically coupled with the connection terminal 7. Back surface connecting pads 81 are formed along with the connection terminals 7. A back surface transparent conductive film is formed on the back surface of the first transparent substrate for noise reduction. The back surface connecting pad 81 is formed to supply voltage to the back surface transparent conductive film. Compared to the connection terminal 7, the back surface connecting pad 81 is formed to have a large area so that connection to the back surface transparent conductive film is easily performed. A connection terminal 82 for the back surface connecting pad 81 is connected to the back surface connecting pad 81 through a wiring 84. A reference code 83 denotes a dummy terminal.

The wiring 6 is formed to ensure supply of the signal from both upper and lower ends of the X-electrode XP, and from both left and right ends of the Y-electrode YP, respectively. As the wiring 6 for supplying the signal to the Y-electrode YP is drawn for a long distance from the end portion at which the connection terminal 7 is formed to the opposite end portion, it is preferable to use the low-resistive member for forming the wiring 6.

Figure 54:
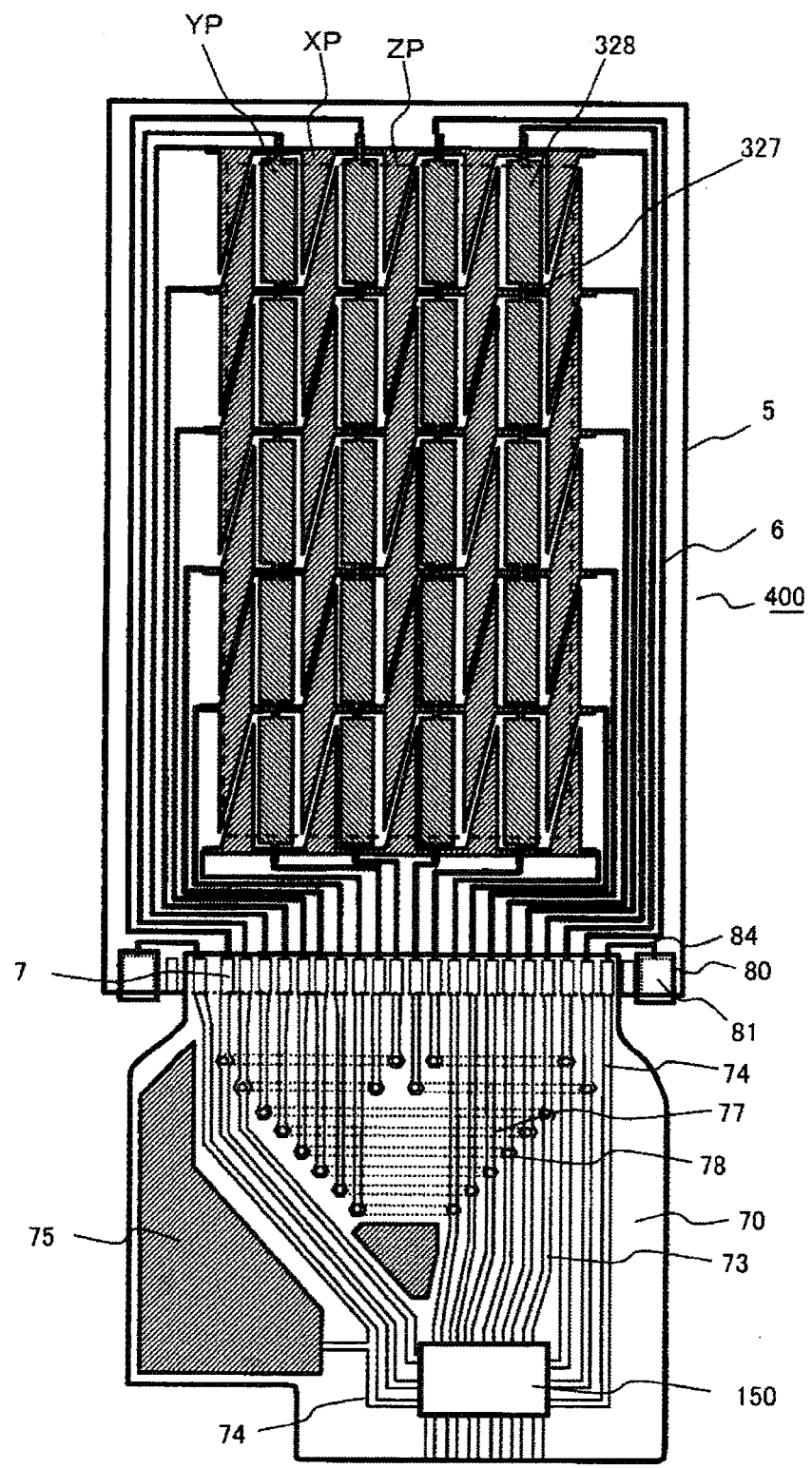
FIG. 54 is a schematic plan view of the input device according to Example 2 of the present invention.

Referring to FIG. 54, a flexible printed substrate 70 is connected to the touch panel 400. A drive circuit 150 is mounted on the flexible printed substrate 70. The signal output from the drive circuit 150 is supplied to the touch panel 400 via the flexible printed substrate 70. The circuit as shown in FIG. 48 is formed in the drive circuit 150.

The signal output from the drive circuit 150 is supplied to a wiring 73 on the flexible printed substrate 70. Through holes 78 are formed in the wiring 73, through which an intersection wiring 77 on the back surface is electrically coupled with the wiring 73.

The intersection wiring 77 intersects many wirings 73, and is connected thereto again via the through holes 78 formed in the other end portion. The intersection wiring 77 intersects with the wiring 73 at right angles so that the overlapped area is as small as possible. The ground potential is supplied to the wiring 74 through the wiring for supplying voltage to the back surface connecting pads 81.

The back surface connecting pad 81 is connected to a conductive member 80 which serves to supply voltage to the back surface transparent conductive film from the back surface connecting pad 81. It is also possible to supply the ground potential to a shield pattern 75 via the wiring 74.

Figure 55:
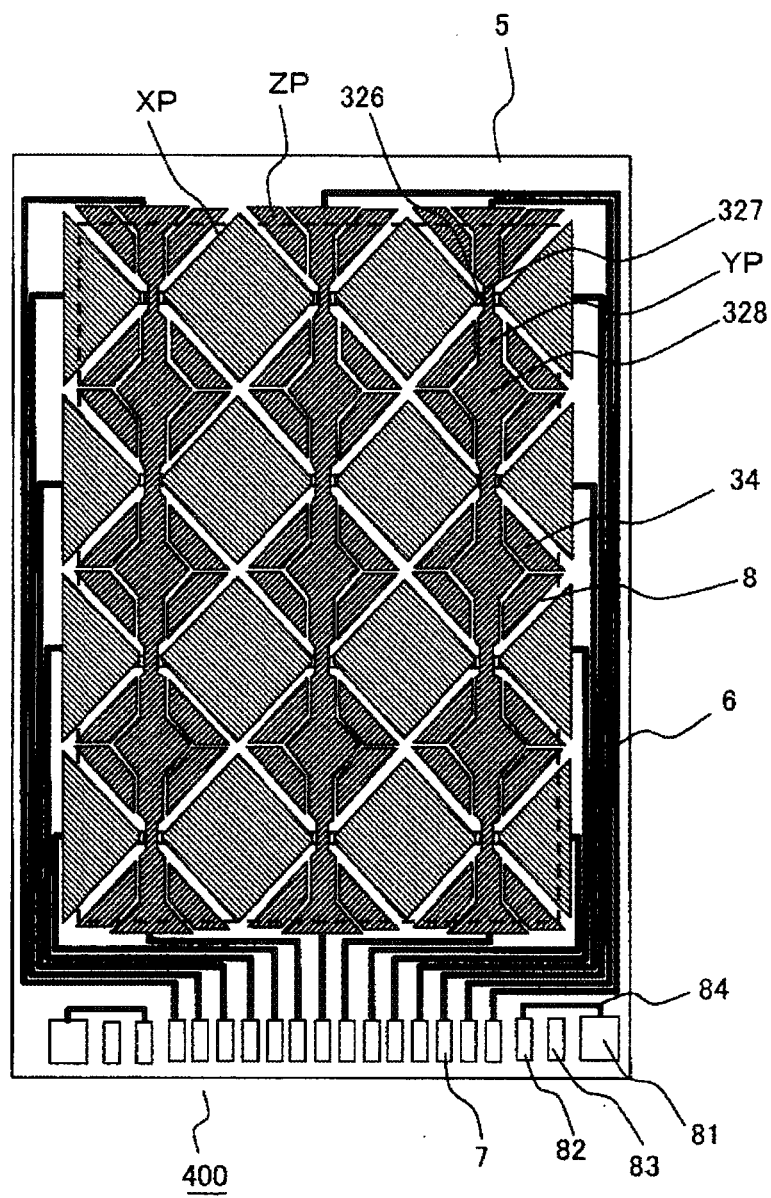
FIG. 55 is a schematic plan view of a modified example of the input device according to Example 2 of the present invention.

A modified example of the X-electrode XP and the Y-electrode YP will be described referring to FIG. 55. Referring to FIG. 55, the touch panel 400 is provided with a floating electrode 34 in order to make the total area of the X-electrodes XP the same as that of the Y-electrodes YP. Difference in the area between the X-electrodes XPs and the Y-electrodes YP may cause the problem of difference in the noise intensity between the X-electrode XP and the Y-electrode YP. When reducing the size of the Y-electrodes YP with a larger number of individual electrodes 328, a distance 8 between the X-electrode XP and the Y-electrode YP is increased.

As described above, each of the Y-electrode YP and the X-electrode XP is formed of the ITO film (transparent conductive film). The insulating film and the transparent substrate are formed in the distance 8, resulting in the region with no transparent conductive film. There may be a difference between the portion with the transparent conductive film and the portion without the transparent conductive film with respect to the transmission factor, reflection rate, and chromaticity of the reflected light. As a result, the distance 8 is visible to the naked eye, thus deteriorating quality of the displayed image.

According to examination results, the distance 8 is lightly observed when it is 30 μm, and it becomes substantially invisible when it, is 20 μm. When the distance 8 is 10 μm, it is completely invisible. As the distance 8 is reduced, capacitance between the Y-electrode YP and the X-electrode XP which are adjacent via the floating electrode 34 is increased. Reduction in the distance 8 may increase instance of failure, for example, shortcircuit between the Y-electrode YP and the floating electrode 34, or the X-electrode XP and the floating electrode 34 owing to pattern formation failure caused by adhesion of a foreign matter in the process.

When shortcircuit occurs in the floating circuit 34 adjacent to the individual electrode 328 of the Y-electrode YP, earth capacitance corresponding to the single line of the Y-electrode is increased to intensify noise, resulting in failure of deteriorated detection sensitivity. In order to decrease the capacitance which is increased by the shortcircuit, the floating electrode 34 has a tetrameric structure as shown in FIG. 55. If it is divided into more sections, the risk of the shortcircuit may be reduced. However, the area without the transparent conductive film is increased in the subject region to have another concern of the capacitance increase owing to transmission factor, reflection ratio and chromaticity which are different from those of the adjacent electrode. So the floating electrode 34 is formed into the tetrameric structure, and the distance between the electrodes is set to approximately 20 μm that is narrower than 30 μm.

The touch panel 400 shown in FIG. 55 is provided with a separate layer intersection portion 326 at an intersection formed of the thin line portion 327. The touch panel 400 shown in FIG. 55 has the X-electrodes XP and the Y-electrodes YP formed on the same layer. The separate layer intersection 326 intersects with the X-electrodes XP and the Y-electrodes YP on a separate layer.

Figure 56:
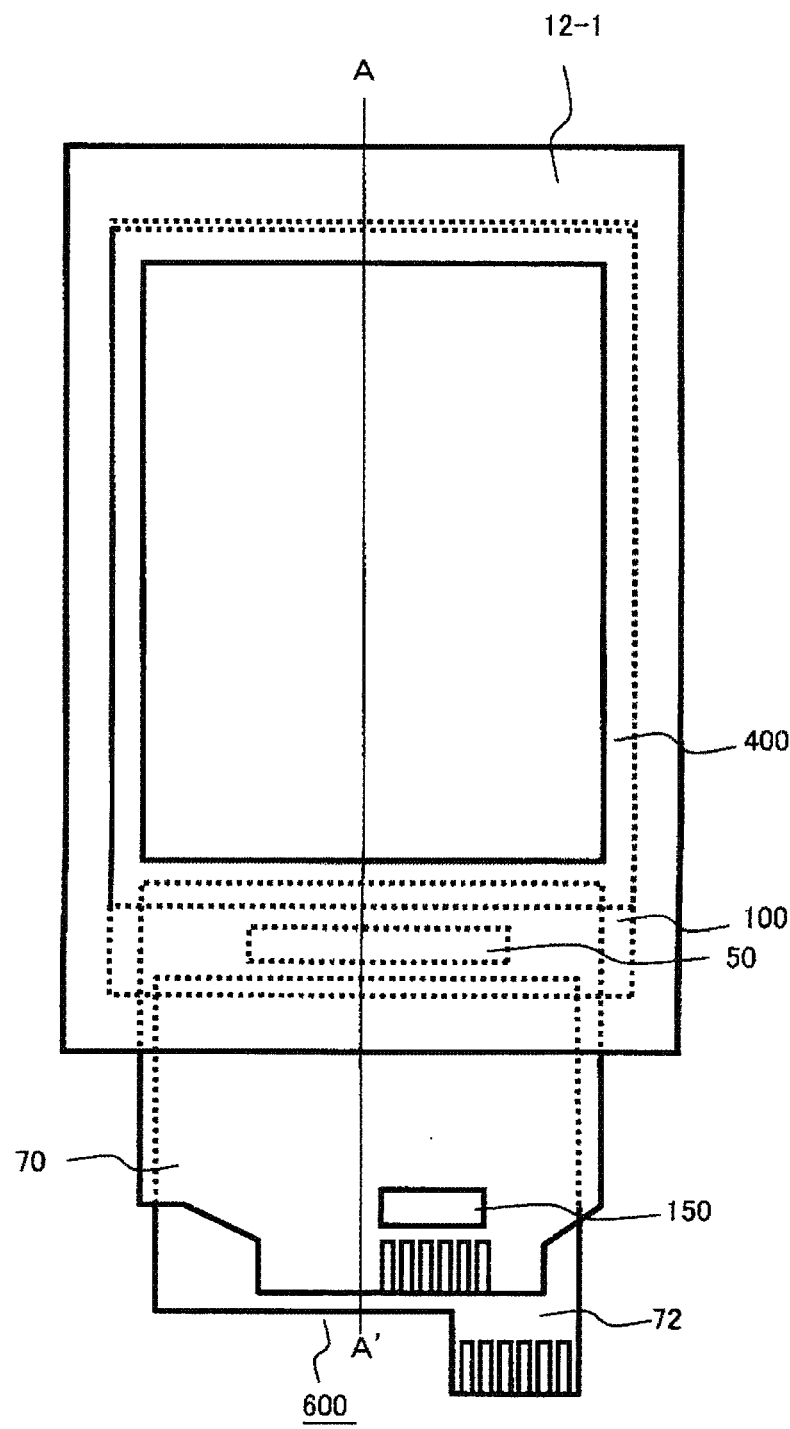
FIG. 56 is a schematic plan view of a liquid crystal display device provided with the input device according to Example 2 of the present invention.
Figure 57:
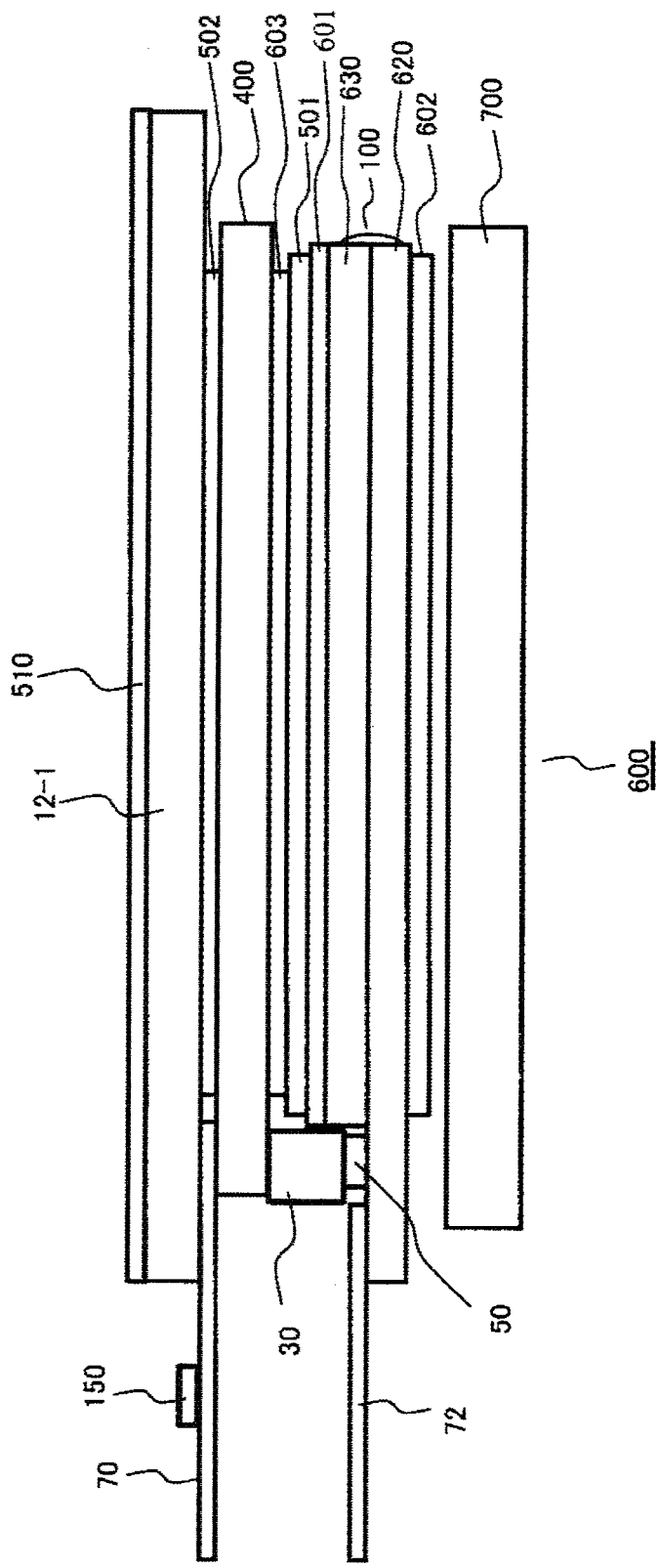
FIG. 57 is a schematic sectional view of the liquid crystal display device provided with the input device according to Example 2 of the present invention.

FIG. 56 is a schematic plan view of an exemplary display device 600 with touch panel formed by attaching the touch panel 400 attached to a liquid crystal display panel 100. FIG. 57 is a schematic sectional view taken along line A-A' of FIG. 56. As the display panel, it is possible to employ not only the liquid crystal display panel but also an organic light-emitting diode element, and an electron emission element of surface conduction type so long as use of the touch panel is allowed.

As FIGS. 56 and 57 show, the display device 600 according to the example includes the liquid crystal display panel 100, the touch panel 400 of capacitance type, which is provided on the surface of the liquid crystal display panel 100 at the observer side, and a backlight 700 provided on the back surface of the liquid crystal display panel 100 at the side opposite the observer side. The liquid crystal display panel of IPS type, TN type, VA type and the like may be employed as the liquid crystal display panel 100.

The liquid crystal display panel 100 is formed by affixing two opposite substrates 62C and 630, and respective outer sides of which are provided with polarizing plates 601, 602, respectively. The liquid crystal display panel 100 and the touch panel 400 are bonded together with a first adhesive material 501 formed of a resin adhesive film. A front protective plate (referred to as a front window or a front panel) 12-1 formed of an acrylic resin is affixed to the outer side of the touch panel 400 with a second adhesive material 502 formed of a resin adhesive film. The front protective plate 12-1 corresponds to the second transparent substrate 12 shown in FIG. 25.

A transparent conductive layer 603 is provided on the touch panel 400 at the liquid crystal display panel side for the purpose of shielding the signal generated by the liquid crystal display panel 100.

A large number of electrodes are provided on the liquid crystal display panel 100, and voltage is applied onto the electrodes at various timings as the signal. Change in the voltage on the liquid crystal display panel 100 turns to noise to the electrodes provided on the touch panel 400 of capacitance type.

As the touch panel 400 has to be electrically shielded from the liquid crystal display panel 100, the transparent conductive layer 603 is provided as the shield electrode. Constant voltage is supplied to the transparent conductive layer 603 from the flexible printed substrate 70 and the like, which is set to ground potential so as to function as the shield electrode.

The flexible printed substrate 70 is connected to the connection terminal 7 (not shown) formed on the surface (hereinafter referred to as the front surface) on which the electrodes of the touch panel 400 are formed, and is provided with the conductive member for supplying voltage at the ground potential to the surface (hereinafter referred to as a back surface) on which the transparent conductive layer 603 is provided.

Preferably, the transparent conductive layer 603 exhibits the sheet resistance value ranging from $1.5 \times 10^2$ to $1.0 \times 10^3 \Omega/\square$, which is at substantially the same level as the electrode formed on the touch panel 400 for the purpose of suppressing influence of noise. It is known that the resistance value of the transparent conductive layer 603 is relevant to size of the crystal grain. It is possible to make the sheet resistance value to be in the range from $1.5 \times 10^2$ to $1.0 \times 10^3 \Omega/\square$ by increasing temperature for heat treatment for forming the transparent conductive layer 603 to 200° C. or higher so as to facilitate crystallization.

It is possible to produce the transparent conductive layer 603 with lower resistance. For example, the sheet resistance value may be set to be in the range from 30 to 40Ω/☐ by increasing the heat treatment temperature to 450° C. to allow sufficient crystallization of the transparent conductive layer 603. The noise suppressing effect may be improved if the transparent conductive layer 603 for shielding has the resistance value at substantially the same as or lower than that of the electrode formed on the touch panel 400.

A drive circuit 150 is mounted on the flexible printed substrate 70, and controls detection of the input position. The electrodes formed on the front surface of the touch panel 400 are electrically coupled with the drive circuit 150 via the flexible printed substrate 70.

Arbitrary voltage such as the ground potential is supplied to the transparent conductive layer 603 formed on the back surface via the flexible printed substrate 70.

The flexible printed substrate 70 is connected to the connection terminal 7 formed on the front surface of the touch panel 400, and is required to be electrically coupled with the transparent conductive layer 603 formed on the back surface by providing wiring from the connection terminal 7. The back surface connecting pad 81 is provided along with the connection terminal 7 so as to be connected to the transparent conductive layer 603 on the back surface using the conductive member.

Referring to FIG. 57, a spacer 30 is inserted between the substrate 620 and the touch panel 400. A hybrid structure formed by combining the liquid crystal display panel 100 with the touch panel 400 and the front protective plate (front window) 12-1 causes the problem of low glass strength of the substrate 620 of the liquid crystal display panel 100.

The substrate 620 has the region on which the liquid crystal drive circuit 50 is mounted, which protrudes further than the other substrate 630 to form the solid plate shape. In the region on which the liquid crystal drive circuit 50 is mounted, the failure may occur to damage the substrate 620.

For this, the spacer 30 is inserted between the substrate 620 and the touch panel 400 to improve the strength. Referring to FIG. 57, the protective sheet 510 is provided on the front surface of the front protective plate 12-1. This may prevent the front protective plate 12-1 from being damaged by the pen 850.

Figure 58:
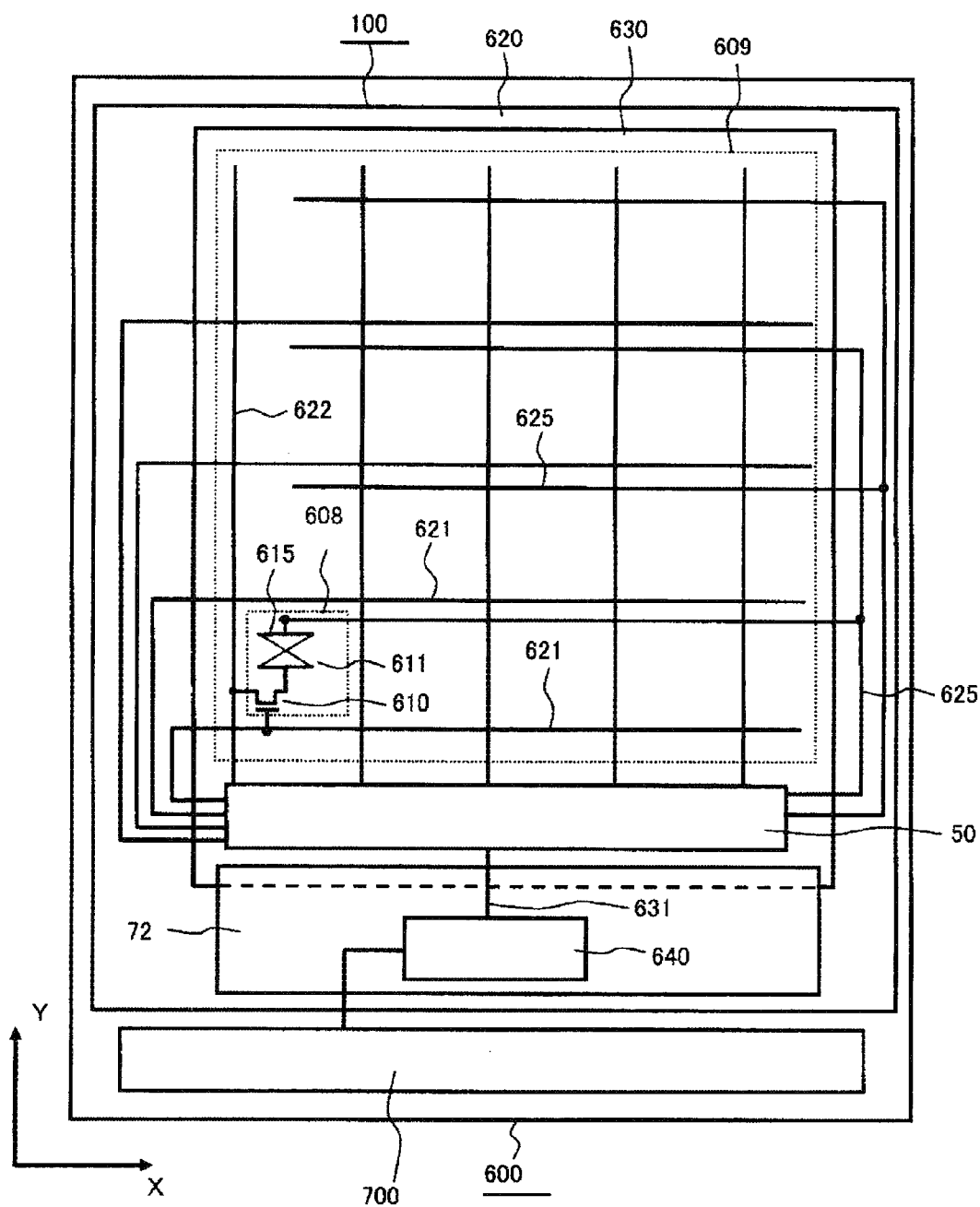
FIG. 58 is a schematic plan view of a liquid crystal display panel according to Example 2 of the present invention.

The liquid crystal display panel 100 will be described referring to FIG. 58. FIG. 58 is a block diagram showing a basic structure of the liquid crystal display panel 100. In order to explain the liquid crystal display panel 100, the touch panel 400 is not shown in the drawing. As described above, the liquid crystal display device includes the liquid crystal display panel 100, the liquid crystal drive circuit 50, a flexible printed substrate 72, and the backlight 700. The liquid crystal drive circuit 50 is provided on one side of the liquid crystal display panel 100 so as to supply various signals thereto. The liquid crystal drive circuit 50 is electrically coupled with the flexible printed substrate 72 so as to supply external signals.

The liquid crystal display panel 100 is formed by laminating the substrate 620 on which a thin film transistor 610, a pixel electrode 611, an opposite electrode (common electrode) 615 are formed (hereinafter referred to as a TFT substrate), and the substrate 630 (hereinafter referred to as filter substrate) on which the color filter is formed at a predetermined interval, affixing those substrates using a seal material (not shown) provided around a surrounding portion like a frame between those substrates, inserting the liquid crystal composition to the inside of the seal material so as to be sealed, attaching polarizing plates 601, 602 (see FIG. 57) to the outside of both substrates, and connecting the flexible printed substrate 72 to the TFT substrate 620.

The structure according to the example is applicable to the liquid crystal display panel of so called in-plane switching type having the opposite electrode 615 formed on the TFT substrate 620, and the liquid crystal display panel of so called longitudinal electric field type having the opposite electrode 615 formed on the filter substrate 630.

FIG. 58 shows scan signal lines (gate signal lines) 621 extending in x-direction and arranged in y-direction, and video signal lines (drain signal lines) 622 extending in y-direction and arranged in x-direction. A pixel 608 is formed in the region defined by the scan signal lines 621 and the drain signal lines 622.

The liquid crystal display panel 100 includes many pixels 608 arranged in matrix. However, FIG. 58 shows only one pixel 608 for clear understanding of the structure. The pixels 608 arranged in matrix form a display region 609. Each of the pixels 608 serves as the pixel of the display image so that the image is displayed on the display region 609.

The thin film transistor 610 for each of the pixels 608 has the source connected to the pixel electrode 611, the drain connected to the video signal line 622, and the gate connected to the scan signal line 621. The thin film transistor 610 functions as a switch for supplying the display voltage (gradation voltage) to the pixel electrode 611.

The correlation between the source and the drain is reversible depending on bias. In this example, the one connected to the video signal line 622 will be called the drain. The pixel electrode 611 and the opposite electrode 615 form the capacitance (liquid crystal capacitance).

The liquid crystal drive circuit 50 is formed on a transparent insulating substrate (glass substrate, resin substrate and the like) that forms the TFT substrate 620, and is connected to the scan signal line 621, the video signal line 622, and an opposite electrode signal line 625.

The flexible printed substrate 72 is connected to the TFT substrate 620, and is provided with a connector 640. The connector 640 is connected to an external signal line through which the signal is externally input. A wiring 631 is provided between the connector 640 and the liquid crystal drive circuit 50 so that the external signal is input to the liquid crystal drive circuit 50.

The flexible printed substrate 72 supplies constant voltage to the backlight 700 that is used as a light source for the liquid crystal display panel 100. The backlight 700 is provided on the back surface or the front surface of the liquid crystal display panel 100. However, FIG. 58 shows the backlight along with the liquid crystal display panel 100 for simplifying the drawing.

The liquid crystal drive circuit 50 outputs the gradation voltage corresponding to the gradation displayed by the pixel to the video signal line 622. When the thin film transistor 610 is turned ON (conduction state), the video signal line 622 supplies the gradation voltage (video signal) to the pixel electrode 611. Thereafter, the thin film transistor 610 is turned OFF so that the pixel electrode 611 holds the gradation voltage based on the video to be displayed by the pixel.

Constant opposite electrode voltage is applied to the opposite electrode 615. The liquid crystal display panel 100 changes orientation direction of the liquid crystal molecules between the pixel electrode 611 and the opposite electrode 615 based on the potential difference therebetween. The image is displayed by changing light transmission rate or reflectance ratio.

As described above, change in the signal for driving the liquid crystal display panel 100 is detected as noise on the touch panel 400, thus requiring measure against the noise. Especially, as the touch panel 400 has the property of encouraging the user to input based on the image displayed on the liquid crystal display panel 100. It is therefore required to be provided while being overlapped with the display unit such as the liquid crystal display panel 100. The touch panel is inevitably exposed to the strong influence of noise generated in the adjacently overlapped display device.

The front protective plate (front window) 12-1 will be described referring to FIG. 59.

Figure 59:
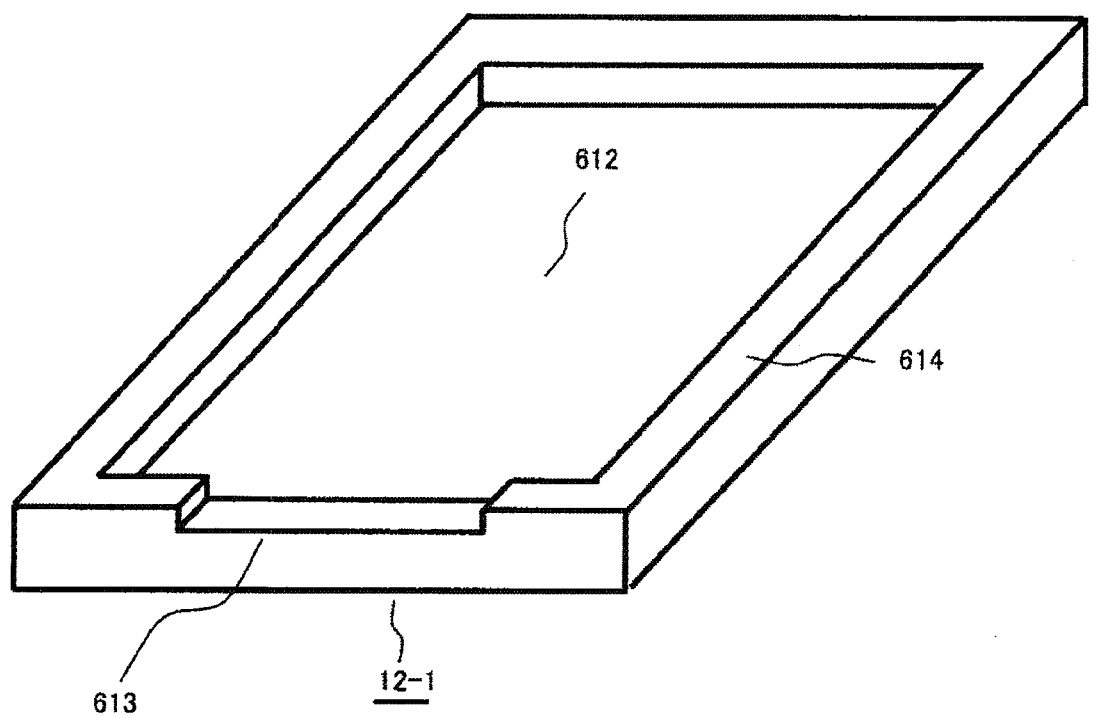
FIG. 59 is a schematic perspective view of a front panel according to Example 2 of the present invention.

FIG. 59 is a schematic perspective view of the front protective plate (front window) 12-1 when seen from the touch panel 400.

The front protective plate (front window) 12-1 has a recess portion 612 for accommodating the touch panel 400. A peripheral portion 614 has a thickness larger than that of the recess portion 612 so as to ensure sufficient strength. The peripheral portion 614 partially has a groove 613 so as to allow the flexible printed substrate 70 to extend outward from the recess portion 612.

The recess portion 612 may be formed by cutting the protective plate (front window) 12-1. By making the peripheral portion 614 of the front protective plate (front window) 12-1 thick, sufficient strength may be ensured to cope with drop of the device. Preferably, the thickness is in the range from 0.7 mm to 1.0 mm for the acrylic material, and from 0.5 mm to 1.0 mm for the glass material.

On the contrary, it is preferable to make the touch panel 400 thin so as to prevent deterioration in sensitivity when it is attached to the operation surface, and touched with finger. Preferably, the thickness of the peripheral portion 614 is set to be equal to 0.5 mm or less for the acrylic material, and equal to 0.8 mm or less for the glass material.

Figure 60:
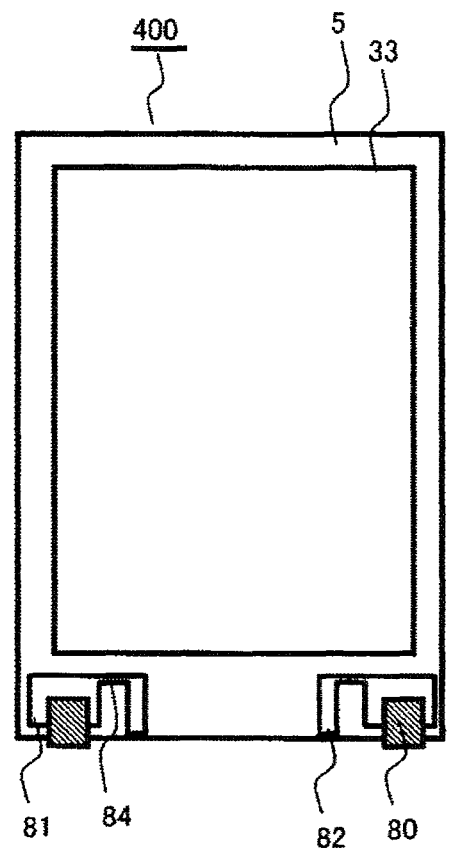
FIG. 60 is a schematic plan view of the input device according to Example 2 of the present invention.
Figure 61:
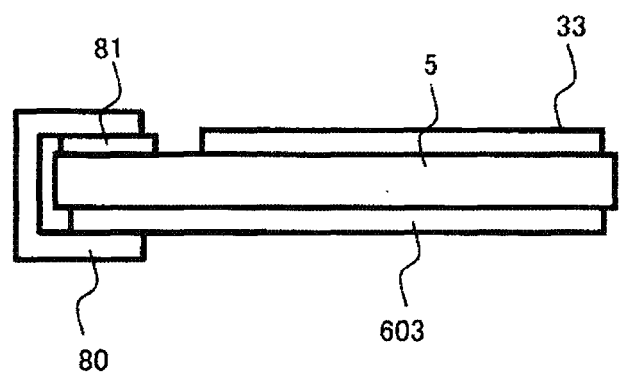
FIG. 61 is a schematic sectional view of the input device according to Example 2 of the present invention.

FIGS. 60 and 61 represent connection between the transparent conductive layer 603 and the back surface connecting pad 81. FIGS. 60 and 61 are schematic plan view and schematic side view of the touch panel 400, respectively. The view shown in FIG. 60 is simplified in order to explain the connection between the transparent conductive layer 603 and the back surface connecting pad 81. The touch panel 400 has an input region 33 formed on the front surface of the first transparent substrate 5.

The back surface connection terminal 82 is formed on the front surface, and connected to the not shown flexible printed substrate 70. The region from the back surface connection terminal 82 to the back surface connecting pad 81 is connected via a wiring 84 which is integrally formed therewith.

The back surface connecting pad 81 is connected to the transparent conductive layer 603 via a conductive tape as the conductive member 80 (the conductive tape will be designated with the code 80 hereinafter). The conductive tape 80 has the copper foil wiring formed on the resin substrate. An anisotropic conductive film which contains conductive beads with particle size of 4 μm is affixed on one surface of the copper foil. The conductive tape 80 has one end affixed to the back surface connecting pad 81, and the other end affixed to the transparent conductive layer 603. After affixing, the conductive tape 80 is subjected to thermocompression process using hot forceps and the like.

Referring to FIG. 60, the conductive tape 80 is connected to two points, that is, left and right sides of the touch panel 400, at which the connection terminal 7 is provided.

Use of the conductive tape 80 that is less expensive than the flexible printed substrate, and the general-purpose tool such as the hot forceps for the thermocompression process may reduce the cost. The work using the hot forceps needs no such work as overturn of the touch panel 400 upon thermocompression on the back surface. This makes it possible to reduce chance of damaging or soiling the electrode surface of the touch panel 400.

According to the example, especially when the touch panel surface is touched with the nonconductive input element, the capacitance change may occur by changing the distance between the X-electrode XP and Y-electrode YP for capacitive detection, and the Z-electrode ZP positioned thereabove. The input coordinate may be detected in the capacitance coupling mode. This makes it possible to cope with use of the resin stylus with low conductivity.

The electrode is configured to calculate the input position between adjacent X-electrodes based on the ratio of the signal indicating capacitance change derived from the two adjacent X-electrodes so as to reduce the number of the X-electrodes. The number of the Y-electrodes may be reduced by modifying arrangement of the Z-electrodes. The width of the frame required for routing wiring from the detection electrode to the input processing portion may be reduced so as to improve likelihood for design property. Increase in the number of terminals of the input processing portion may also be suppressed, and accordingly, the touch panel of capacitance coupling type is realized, which is capable of detecting the input position at lower costs with high accuracy. The input coordinate may be detected with high accuracy when using the input element with small contact surface such as the stylus. This makes it possible to apply the structure into the operation for inputting characters.

The pulse signals are sequentially applied to any one of the X-electrode XP and the Y-electrode YP to preliminarily determine as to which electrode supplies the signal. This makes it possible to achieve accurate detection in spite of the contact at two points.

The method of detecting the coordinate position according to Example 1 is employed through detection of the signal having the polarity that varies depending on the finger and the pen (for example, resin stylus). The signal processing is performed based on the obtained measurement data so as to ensure detection of the touch type whether the finger 860 or the insulating pen (for example, resin stylus) 850.

The present invention has been described with respect to the examples. It is clearly understood that the present invention is not limited to those examples, and may be arbitrarily modified so long as it does not deviate from scope of the present invention.

What is claimed is:

1. A display device provided with a touch panel of capacitance type, wherein:
   the touch panel of capacitance type includes a plurality of X-electrodes and a plurality of Y-electrodes;
   the X-electrode and the Y-electrode intersecting with each other via a first insulating layer, each of which is formed to have a pad portion and a thin line portion alternately arranged in an extending direction, and the pad portion of the X-electrode and the pad portion of the Y-electrode are arranged without being overlapped in a planar view; and
   the display device comprises:

a measurement circuit, the measurement circuit being configured to measure an interelectrode capacitance at each intersection between the plurality of X-electrodes and the plurality of Y-electrodes by applying a pulse signal sequentially to one of the X-electrode and the Y-electrode, and detecting a signal from the other electrode;

a data storage circuit, the data storage circuit having a two-dimensionally arranged data table that stores an interelectrode capacitance value measured by the measurement circuit at each of the intersections between the plurality of X-electrodes and the plurality of Y-electrodes; and a control circuit, the control circuit being configured to calculate a touched position on the touch panel of capacitance type based on a local minimal point as an intersection with the interelectrode capacitance value that is equal to or smaller than each of the interelectrode capacitance values of adjacently surrounding four peripheral intersections among those at the respective intersections stored in the two-dimensionally arranged data table of the data storage circuit, and a local maximal point as an intersection with the interelectrode capacitance value that is equal to or larger than each of the interelectrode capacitance values of four adjacent peripheral intersections among those at the respective intersections stored in the two-dimensionally arranged data table of the data storage circuit, and determines that the touch panel of capacitance type is touched with a human finger or a conductive pen when the touched position is calculated based on the local minimal point, and determines that the touch panel of capacitance type is touched with an insulating pen when the touched position is calculated based on the local maximal point.

2. The display device according to claim 1, wherein:

the data storage circuit includes a touched state management table which manages a touched position and a touch type; and the control circuit being configured to determine that the touch panel of capacitance type is touched with the human finger or the conductive pen when the touched position calculated based on the local maximal point is stored in the touched state management table, and the touch type stored in the touched state management table is set to the human finger or the conductive pen even if the touched position is calculated based on the local maximal point.

3. The display device according to claim 1, wherein:

the control circuit being configured to search the intersections adjacent to the local maximal point as a start point in four directions sequentially among the interelectrode capacitance values at the respective intersections stored in the data storage circuit;

when the searched intersection has the interelectrode capacitance value that is equal to or smaller than the interelectrode capacitance value at a present intersection by a predetermined threshold value or smaller, the searched data are added to a touched region to be extracted; and the touched position on the touch panel of capacitance type is calculated based on the interelectrode capacitance value in the touched region.

4. The display device according to claim 3, wherein:

the data storage circuit being configured to store a signal value;

the control circuit being configured to calculate a difference value between the interelectrode capacitance value in the touched region and the interelectrode capacitance value at each of the intersections around the touched region as a reference value after extracting the touched region to store the difference value in the data storage circuit as the signal value; and when a maximum value of the signal value at the intersection in the touched region is equal to or larger than the threshold value, it is determined that the "touched state is established", and the touched position on the touch panel of capacitance type is calculated.

* * * * *

UNITED STATES PATENT AND TRADEMARK OFFICE
CERTIFICATE OF CORRECTION

PATENT NO. : 9,569,038 B2  
APPLICATION NO. : 13/240170  
DATED : February 14, 2017  
INVENTOR(S) : Koji Doi et al.

It is certified that error appears in the above-identified patent and that said Letters Patent is hereby corrected as shown below:

In the Specification

Column 7, Line 23, change "68" to --6B--;
Column 8, Line 60, change "105" to --10E--;
Column 12, Line 62, change "four. X-electrodes" to --four X-electrodes--;
Column 14, Line 16, change "X22" to --XP2--;
Column 20, Line 38, change "X2" to --XP--;
Column 25, Line 38, change "it, is" to --it is--; and
Column 26, Line 22, change "62C" to --620--.

Signed and Sealed this
Twenty-third Day of May, 2017

Michelle K. Lee
*Director of the United States Patent and Trademark Office*